(12) United States Patent
Caveney et al.

(10) Patent No.: US 8,502,071 B2
(45) Date of Patent: Aug. 6, 2013

(54) CABLE DROP SYSTEM

(75) Inventors: Jack E. Caveney, North Palm Beach, FL (US); Scott M. Lesniak, Lockport, IL (US); Robert Nicoli, Glenwood, IL (US)

(73) Assignee: Panduit Corp., Tinley Park, IL (US)

( * ) Notice: Subject to any disclaimer, the term of this patent is extended or adjusted under 35 U.S.C. 154(b) by 308 days.

(21) Appl. No.: 12/993,419

(22) PCT Filed: Apr. 30, 2009

(86) PCT No.: PCT/US2009/042308
§ 371 (c)(1),
(2), (4) Date: Nov. 18, 2010

(87) PCT Pub. No.: WO2009/142885
PCT Pub. Date: Nov. 26, 2009

(65) Prior Publication Data
US 2011/0074117 A1   Mar. 31, 2011

Related U.S. Application Data

(60) Provisional application No. 61/054,621, filed on May 20, 2008, provisional application No. 61/082,616, filed on Jul. 22, 2008, provisional application No. 61/086,030, filed on Aug. 4, 2008, provisional application No. 61/112,225, filed on Nov. 7, 2008.

(51) Int. Cl.
*H02G 3/04* (2006.01)
(52) U.S. Cl.
USPC ........ 174/68.3; 174/68.1; 174/72 A; 174/100; 277/607

(58) Field of Classification Search
USPC ................ 174/68.1, 68.3, 72 A, 72 C, 81, 82, 174/88 R, 93, 70 C, 95, 100, 650, 564, 153 G, 174/152 G, 50; 277/607, 637, 602, 501; 439/587, 471; 385/134, 135
See application file for complete search history.

(56) References Cited

U.S. PATENT DOCUMENTS

| | | | | |
|---|---|---|---|---|
| 4,731,501 A | * | 3/1988 | Clark et al. | 174/153 G |
| 6,017,228 A | * | 1/2000 | Verbeek et al. | 439/501 |
| 7,385,137 B2 | * | 6/2008 | Burke et al. | 174/50 |
| 7,723,622 B2 | | 5/2010 | Dukes et al. | |
| 8,249,411 B2 | * | 8/2012 | Burke | 385/135 |
| 2009/0090073 A1 | | 4/2009 | Bravo et al. | |

FOREIGN PATENT DOCUMENTS

| | | |
|---|---|---|
| DE | 202007016555 U1 | 2/2008 |
| WO | 0231936 A2 | 4/2002 |

* cited by examiner

*Primary Examiner* — Angel R Estrada
(74) *Attorney, Agent, or Firm* — Christopher S. Clancy; Aimee E. McVady

(57) ABSTRACT

The present invention is directed toward a sealing assembly in a cable drop system. The sealing assembly includes a base mounted to a network cabinet and a cover hingedly connected to the base. The sealing assembly also includes a lower sleeve and an upper sleeve. The lower sleeve and the upper sleeve wrap around the cables passing through an opening in the cable drop system. The lower sleeve includes a top portion and a bottom portion. The bottom portion of the lower sleeve is connected to the base and the upper sleeve is positioned around the top portion of the lower sleeve to form the sealing assembly.

20 Claims, 76 Drawing Sheets

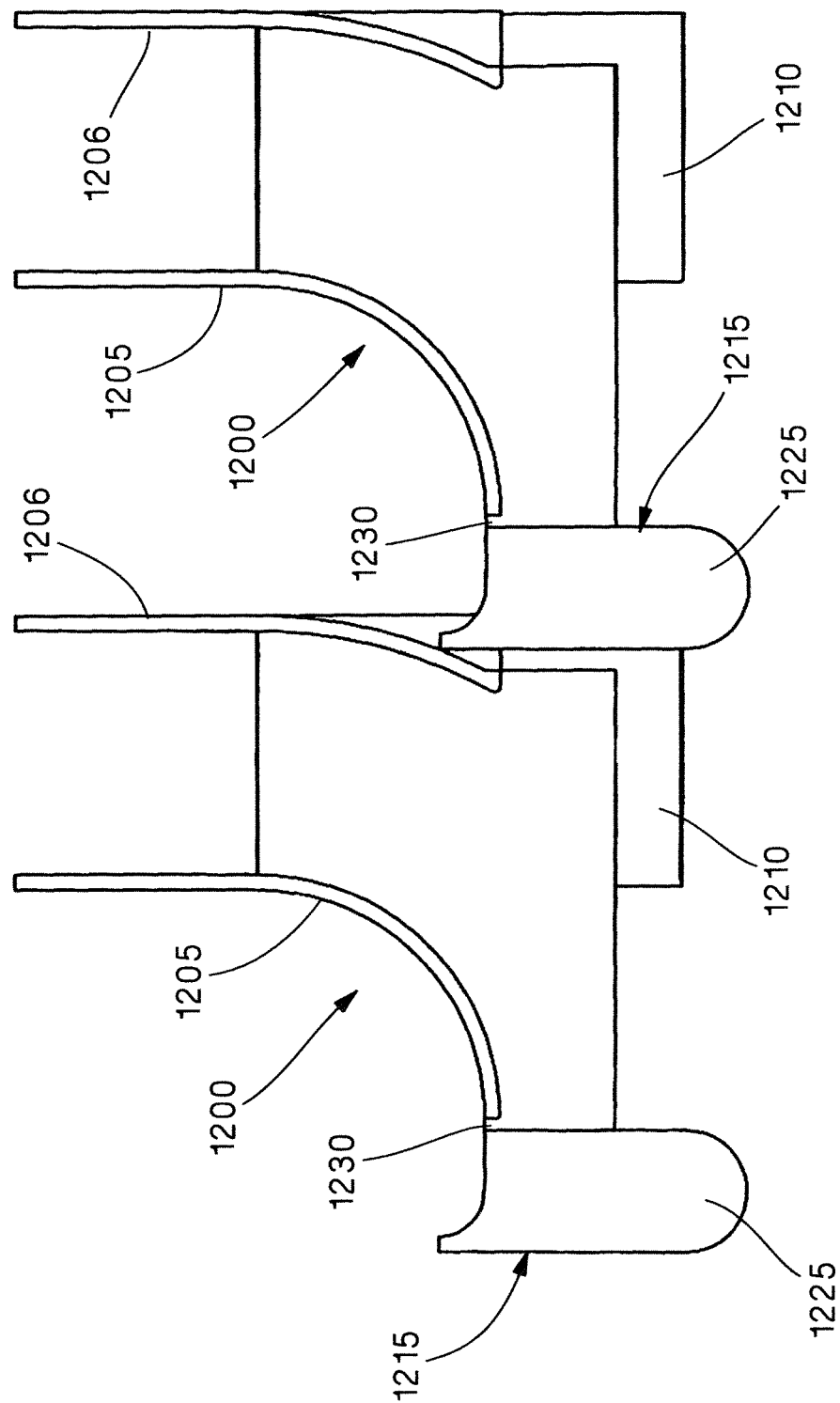

CABLE DROP SYSTEM

CROSS-REFERENCE TO RELATED APPLICATIONS

This application claims priority to U.S. Provisional Application No. 61/112,225, filed Nov. 7, 2008; U.S. Provisional Application No. 61/086,030, filed Aug. 4, 2008; U.S. Provisional Application No. 61/082,616, filed Jul. 22, 2008; and U.S. Provisional Application No. 61/054,621, filed May 20, 2008.

FIELD OF INVENTION

This invention relates generally to cable management and, more particularly, to a cable drop system for use in applications, such as installations routing cables from troughs down into cabinets in a data center.

SUMMARY OF THE INVENTION

The invention is directed toward a sealing assembly for protecting cables in a cable drop system. The sealing assembly includes a base mounted to a network cabinet and a cover hingedly connected to the base. The sealing assembly also includes a lower sleeve and an upper sleeve. The lower sleeve includes a top portion and a bottom portion. The bottom portion of the lower sleeve is connected to the base. The upper sleeve includes a top edge, a bottom edge, a first edge and a second edge. The upper sleeve is positioned around the top portion of the lower sleeve and the cables passing through an opening in the cable drop system.

BRIEF DESCRIPTION OF THE DRAWINGS

Certain embodiments of the present invention are illustrated by the accompanying figures. It should be understood that the figures are not necessarily to scale and that details that are not necessary for an understanding of the invention or that render other details difficult to perceive may be omitted. It should be understood, of course, that the invention is not necessarily limited to the particular embodiments illustrated herein.

FIG. 55D is a front elevational view of two spillovers of FIG. 55A positioned side by side;

DETAILED DESCRIPTION

Figure 1:
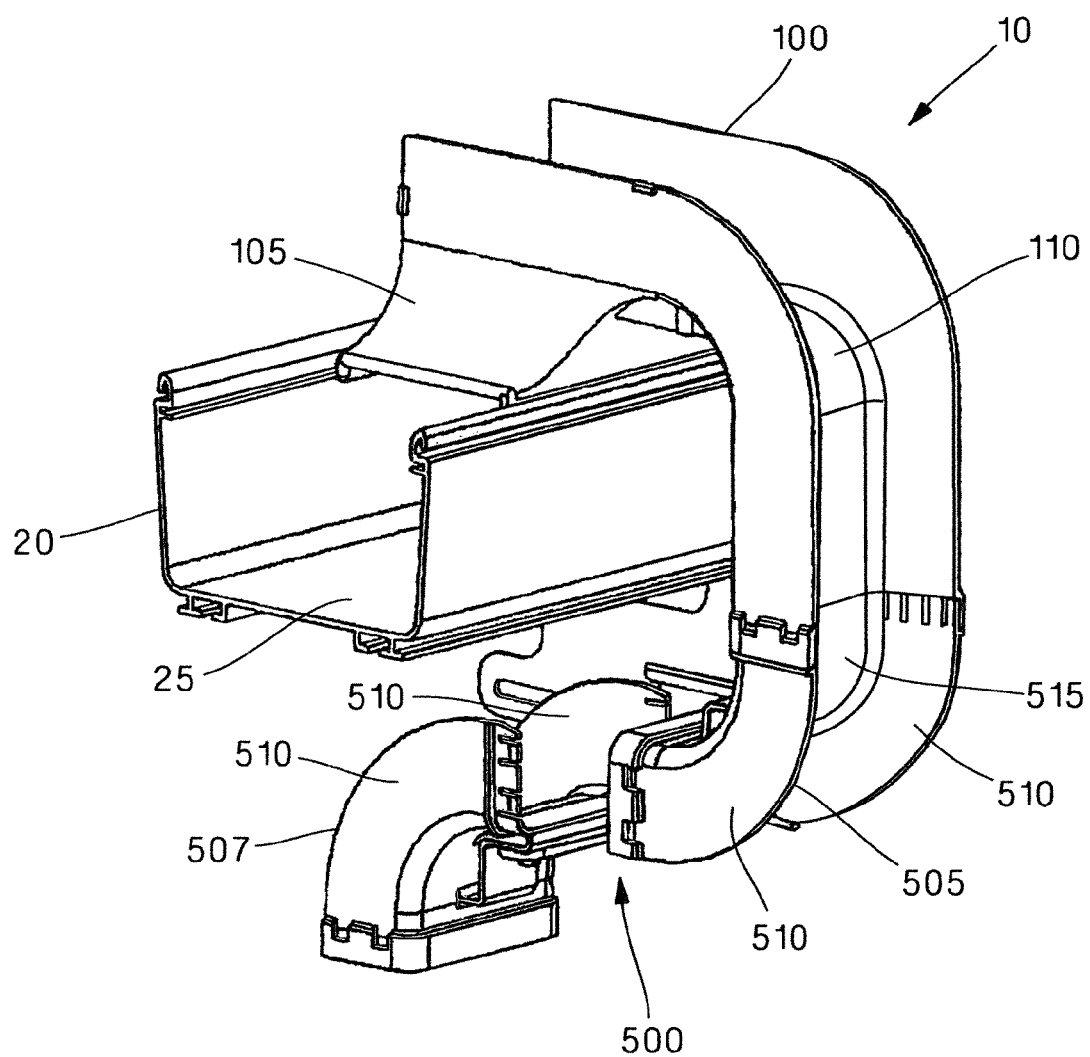
FIG. 1 is a perspective view of a portion of a cable drop system in accordance with the present invention.
Figure 2:
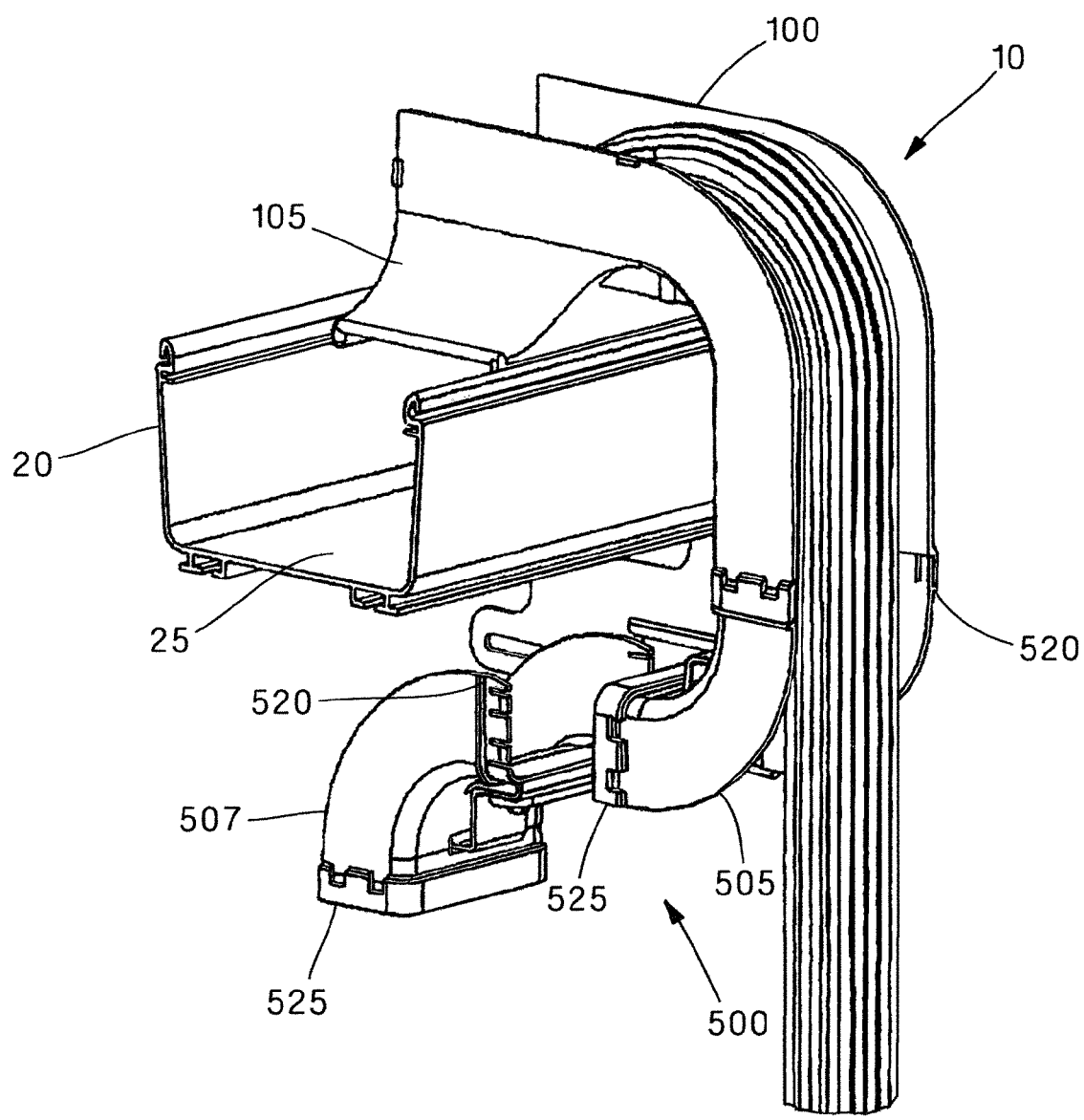
FIG. 2 is a perspective view of the cable drop system of FIG. 1 showing cables being routed out of a lateral trough.
Figure 3:
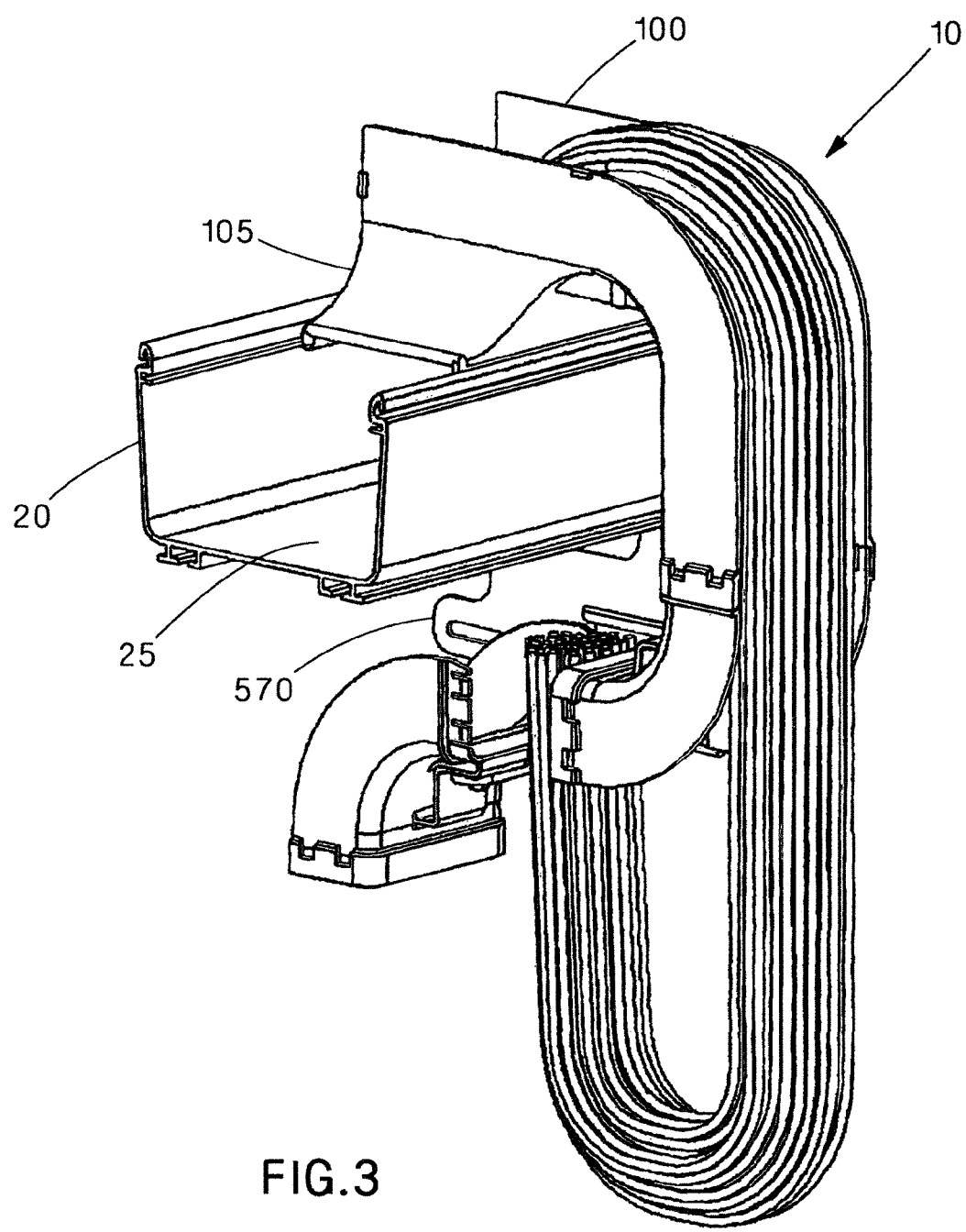
FIG. 3 is a perspective view of the cable drop system of FIG. 1 showing the cables being further routed through a cable guide assembly.
Figure 4:
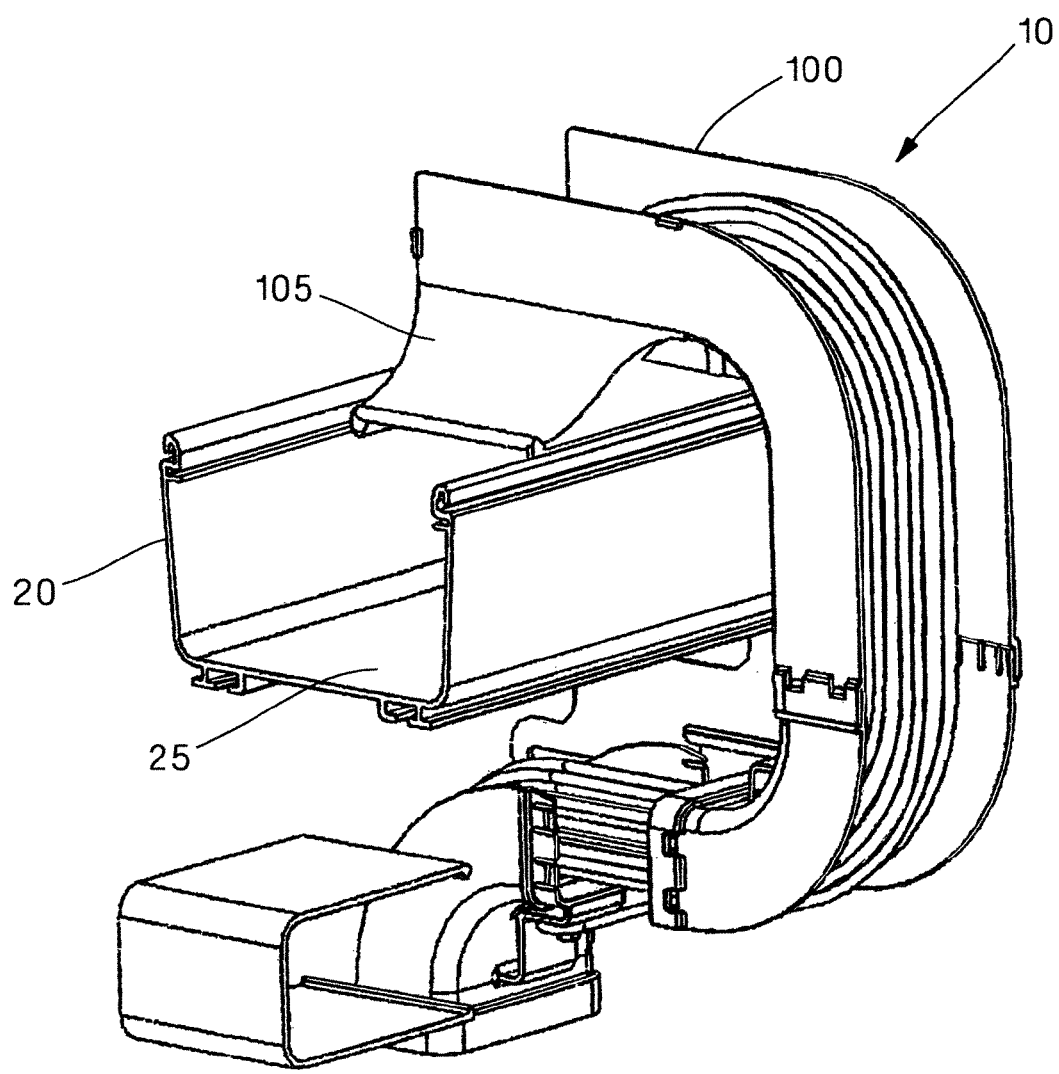
FIG. 4 is an exploded perspective view of the cable drop system of FIG. 3 showing the cables routed through the cable guide assembly.
Figure 5:
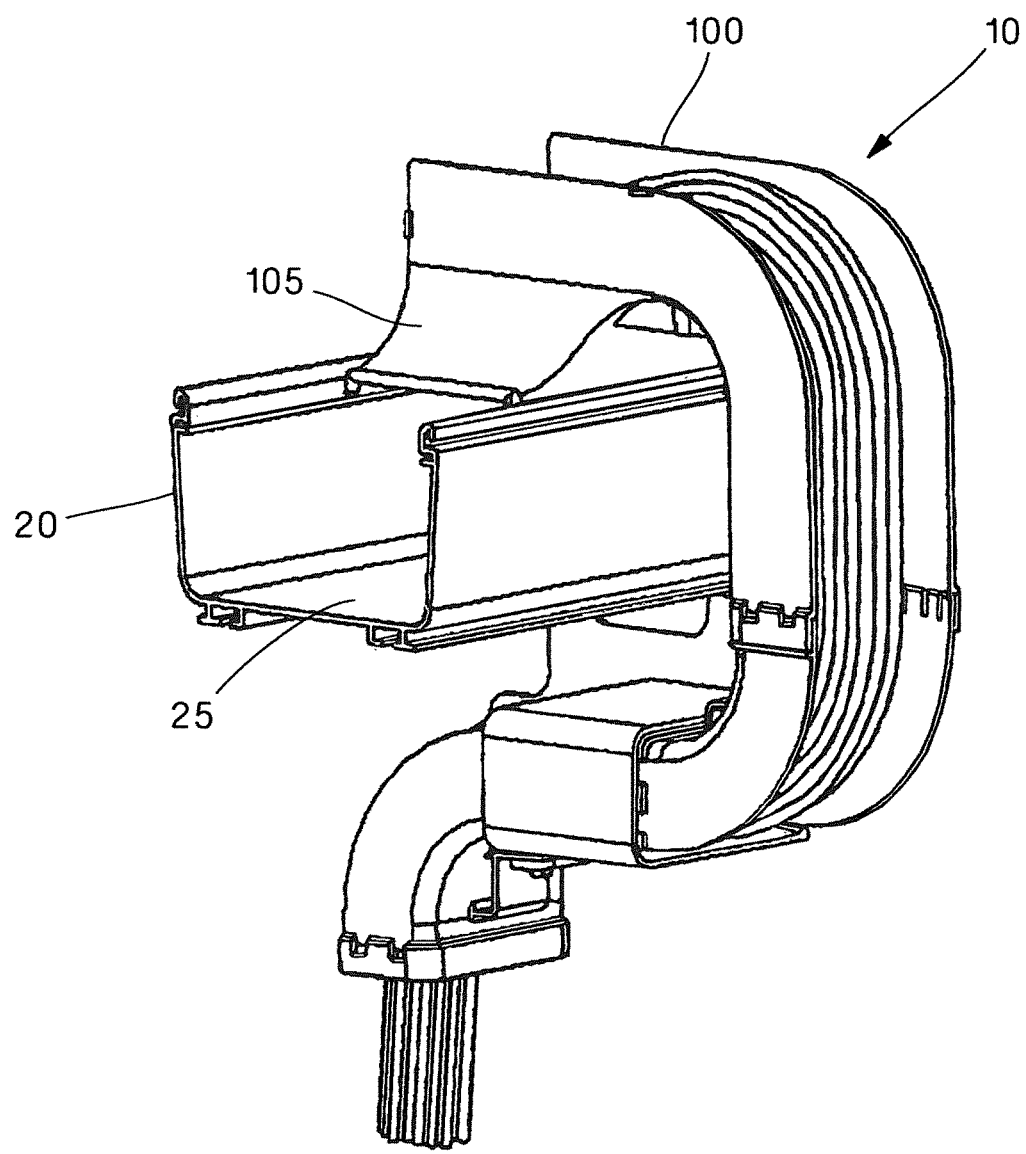
FIG. 5 is a perspective view of the cable drop system of FIG. 4 with a cover in place.
Figure 6:
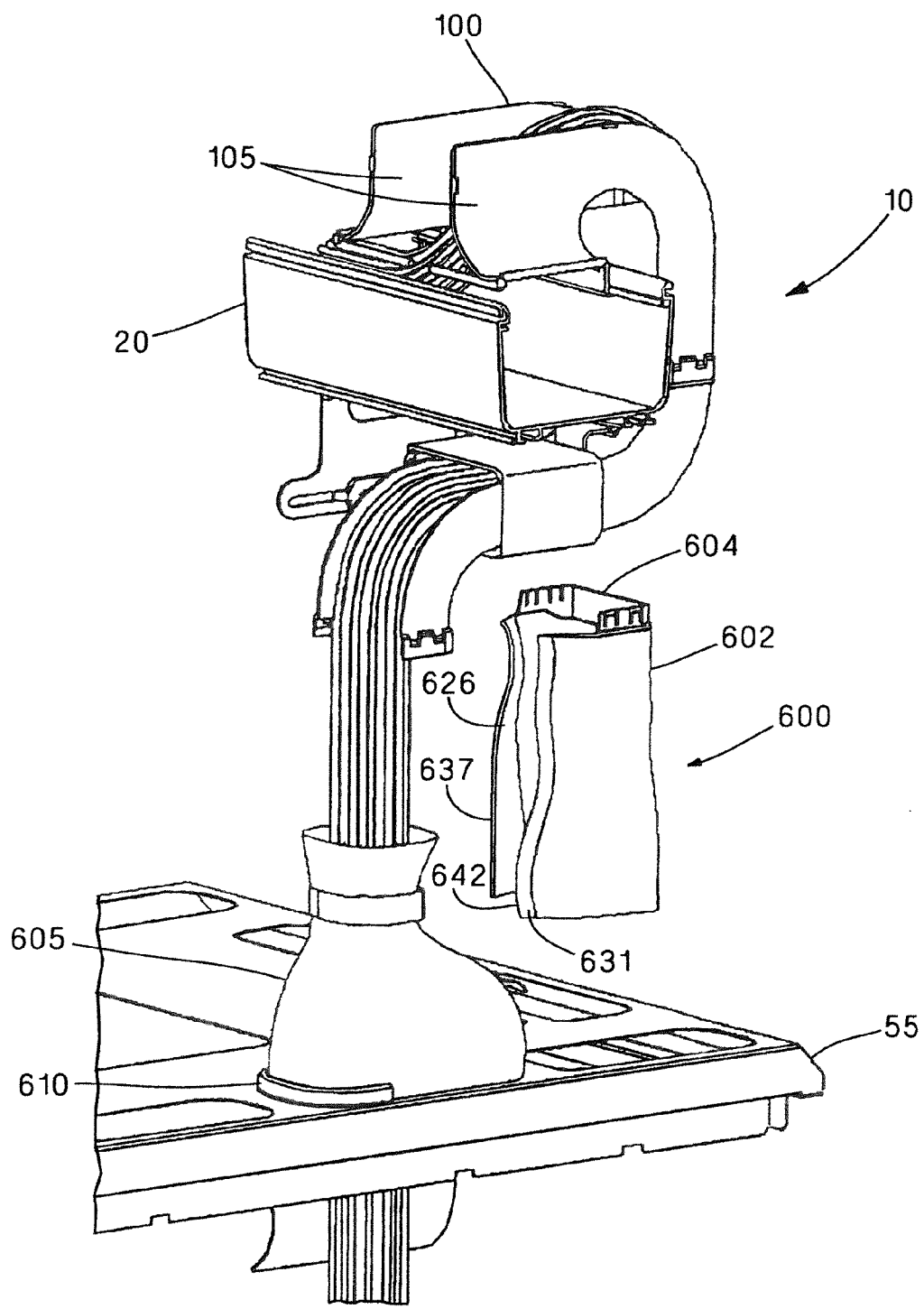
FIG. 6 is a partially exploded front perspective view of a cable drop system of FIG. 5 with a lower sleeve positioned around the cables.
Figure 7:
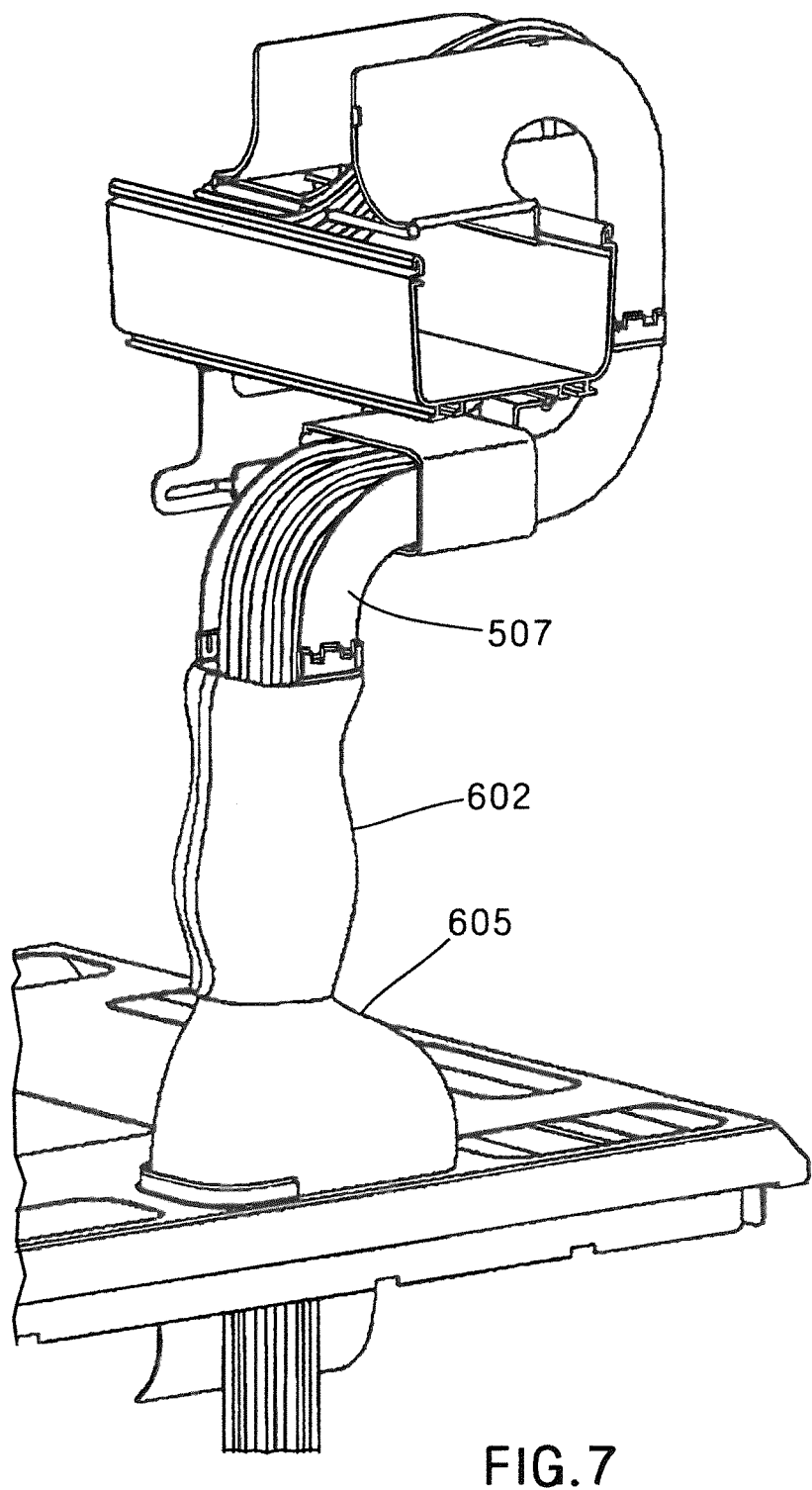
FIG. 7 is a front perspective view of the cable drop system of FIG. 6, with the upper sleeve positioned around the cables.
Figure 8:
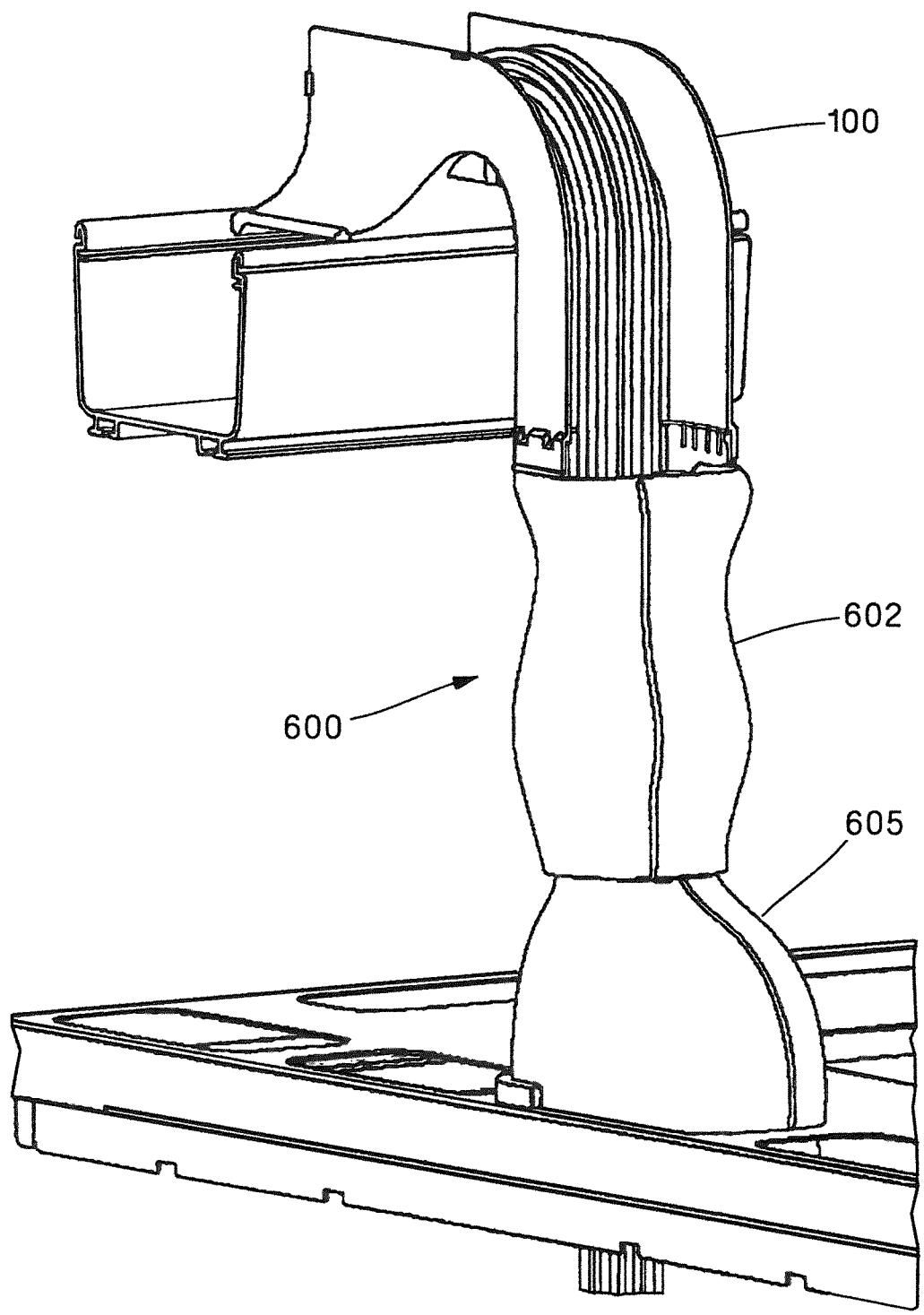
FIG. 8 is a rear perspective view of the cable drop system of FIG. 7.

Lateral troughs 20 are often suspended above one or more network cabinets or racks in a data center and carry cables or wires which need to be routed down into an opening in the top of a network cabinet. Referring to FIGS. 1-5, an upper portion of a cable drop system 10 is shown connected to a lateral trough section of a cable routing system. In the example shown, the cable drop system 10 generally includes a spillover 100 and a cable guide assembly 500. As can be seen in FIGS. 6-8, the cable drop system 10 may also include a sealing assembly 600. Sealing assembly 600 may be used to protect cables or wires passing through the opening in the network cabinet from rough edges, and also to seal around the cables or wires to minimize air loss through the opening.

FIGS. 9A-9D illustrate one embodiment of a spillover 100 that can be utilized with a cable drop system of FIGS. 1-8. Spillover 100 has two walls 105 and a floor 110 that define an exit path for cables routed from the lateral trough 20 in either direction. Each wall 105 includes a curved portion disposed over the lateral trough 20 that may provide control for any cables that are routed out of the lateral trough 20. The curved portions of walls 105 do not extend below the top of the side wall of the trough section 20.

Figure 9A:
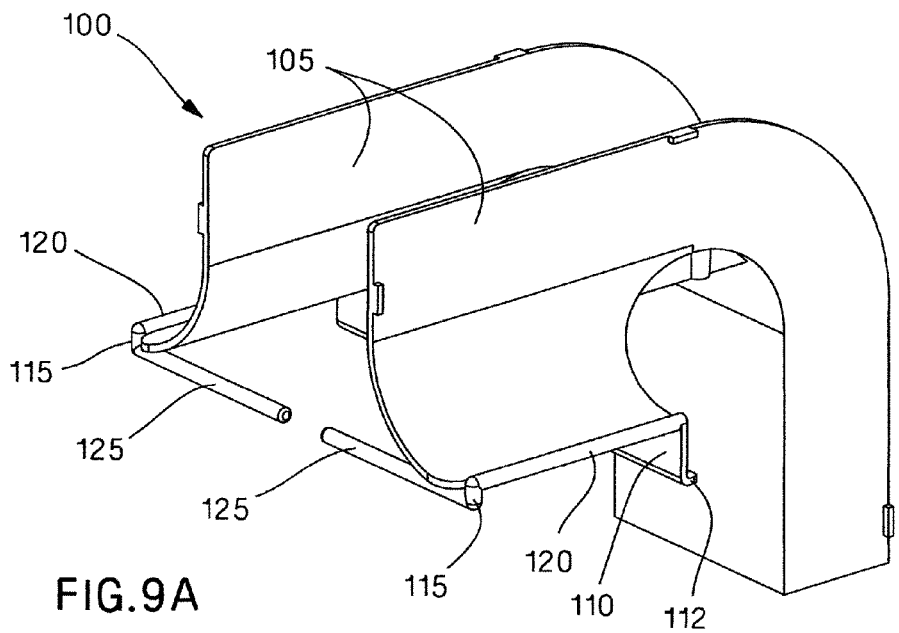
FIG. 9A is a front perspective view of a spillover in accordance with the present invention.
Figure 9B:
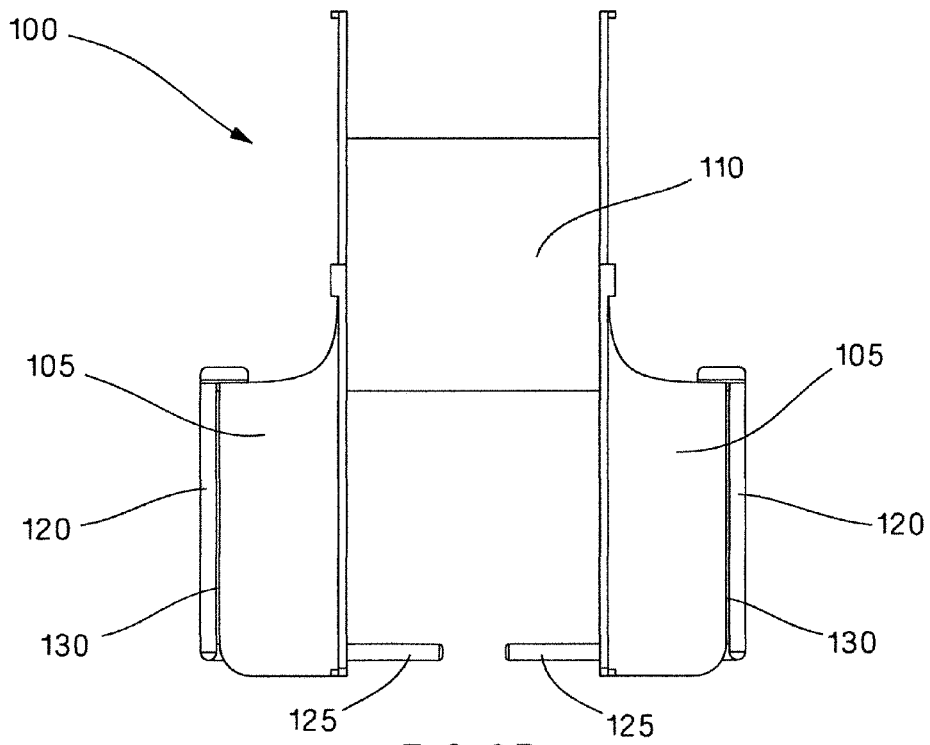
FIG. 9B is a top plan view of the spillover of FIG. 9A.
Figure 9C:
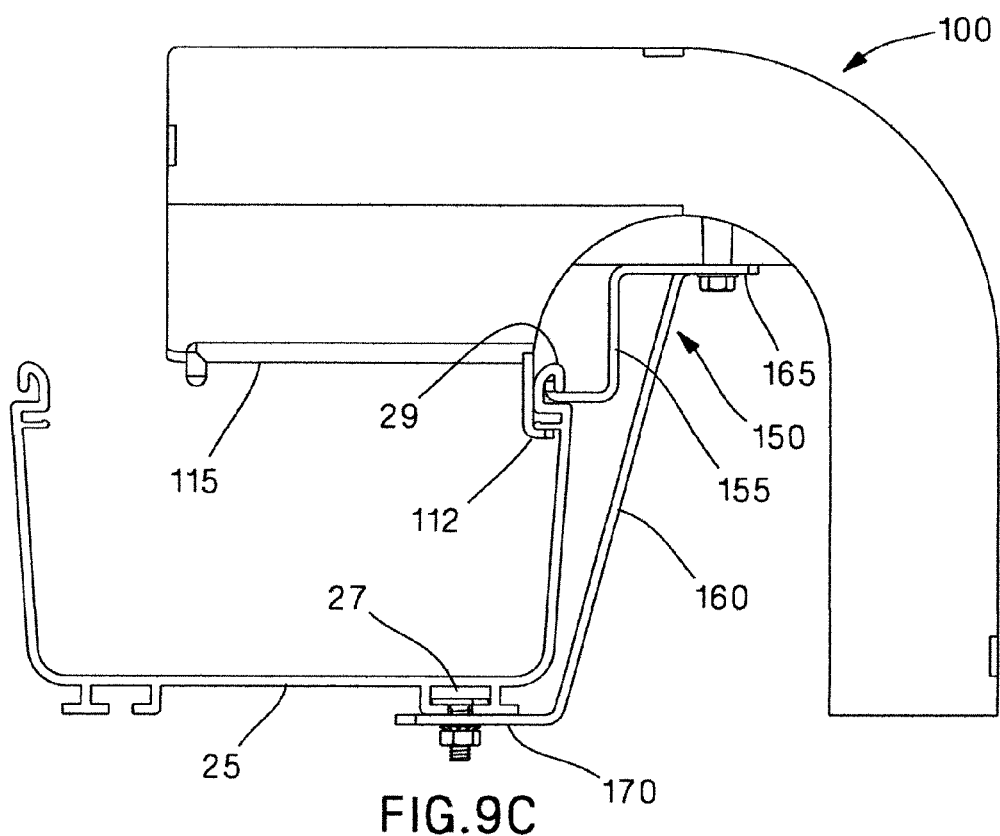
FIG. 9C is a side elevational view of the spillover of FIG. 9A, including a mounting bracket positioned for mounting to a lateral trough section.
Figure 9D:
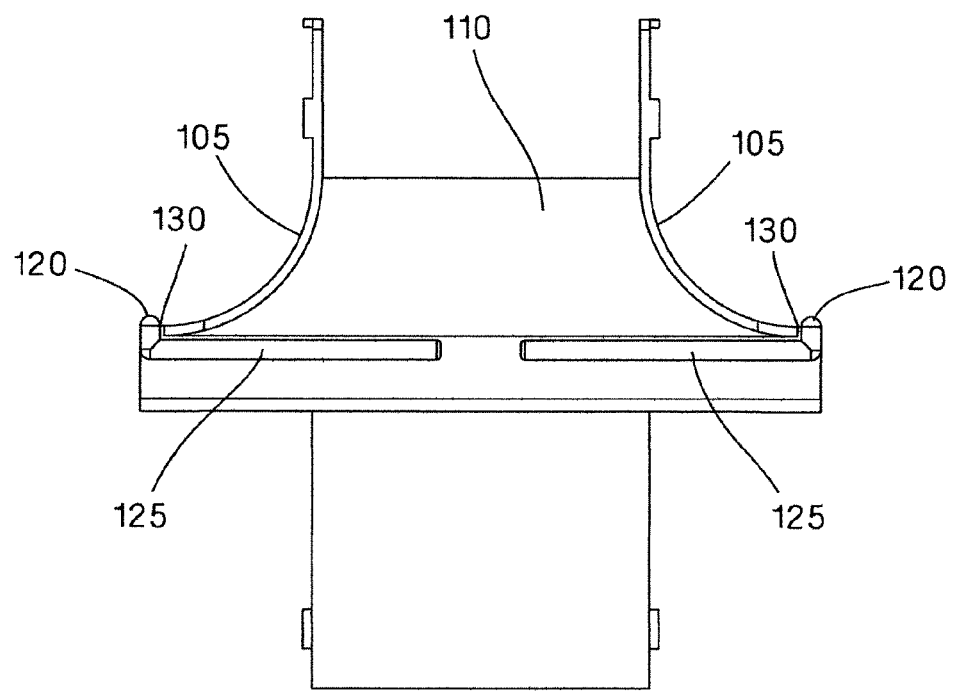
FIG. 9D is a front elevational view of the spillover of FIG. 9A.
Figure 10A:
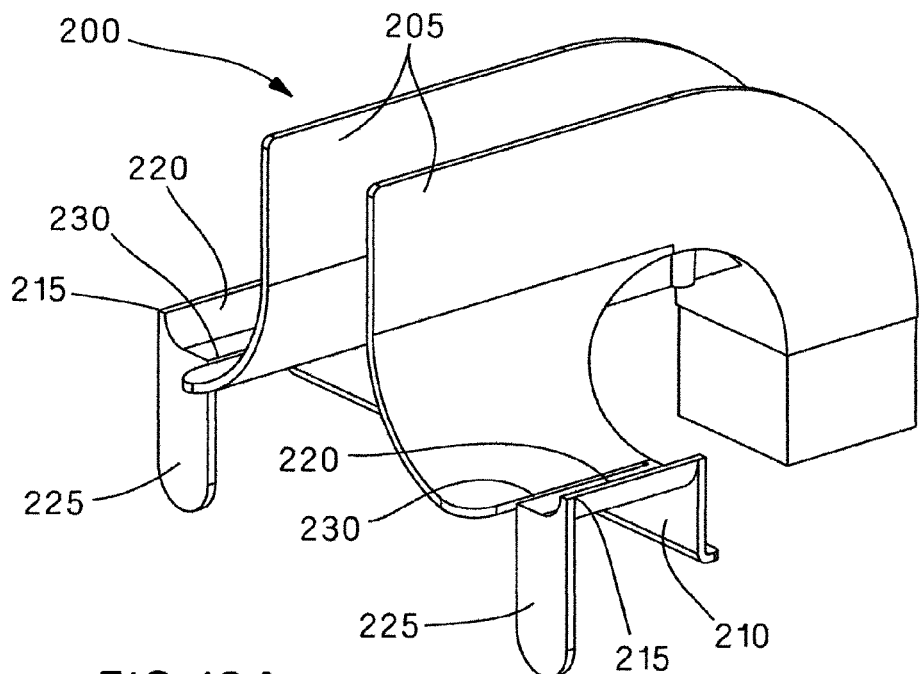
FIG. 10A is a front perspective view of an alternate embodiment of a spillover in accordance with the present invention.
Figure 10B:
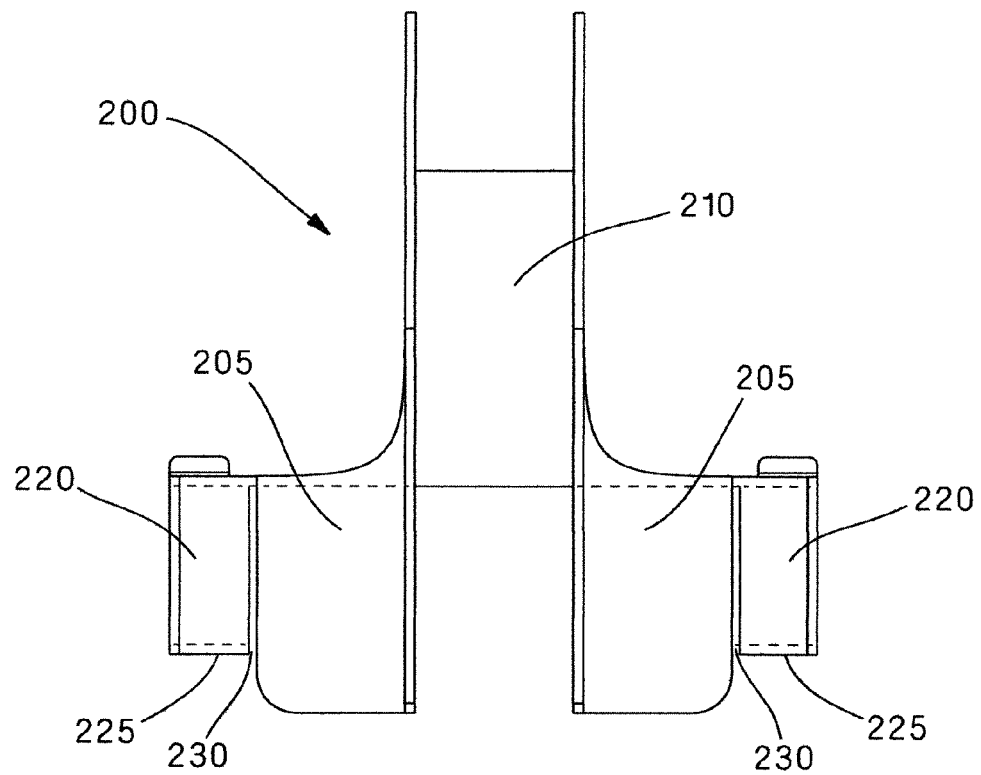
FIG. 10B is a top plan view of the spillover of FIG. 10A.
Figure 10C:
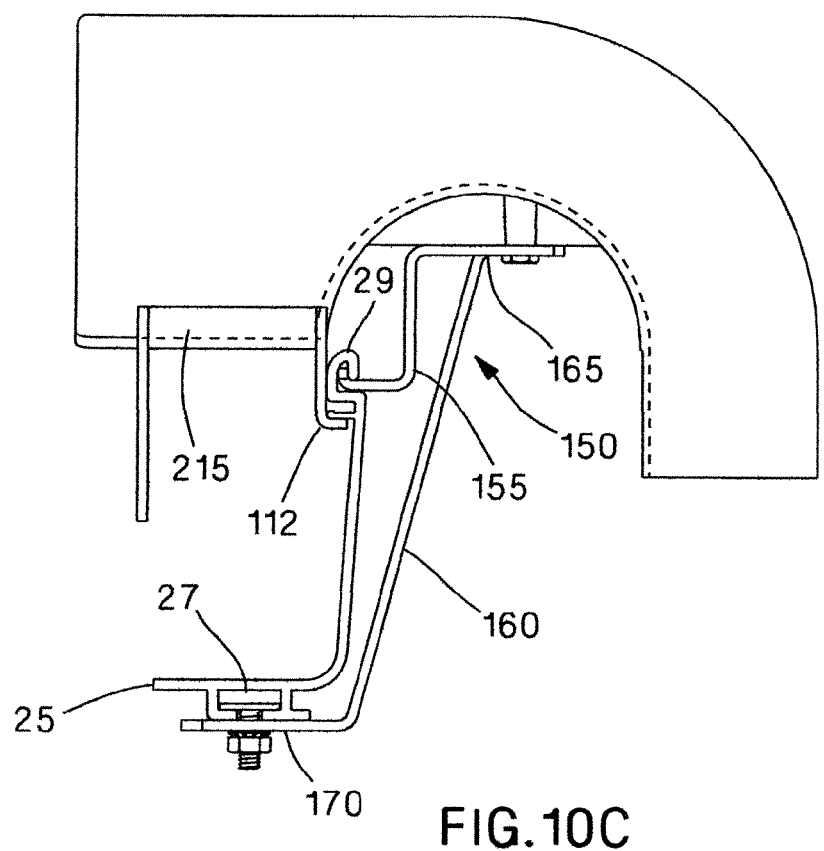
FIG. 10C is a side elevational view of the spillover of FIG. 10A, including a mounting bracket positioned for mounting to a lateral trough section.
Figure 10D:
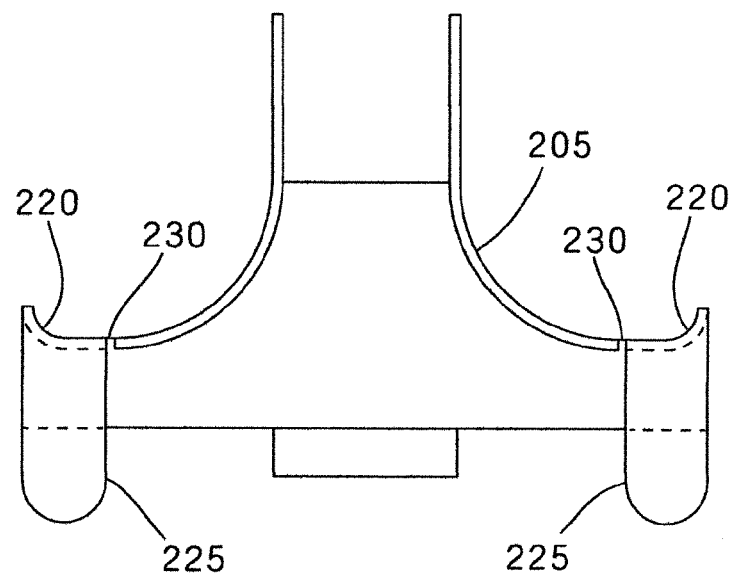
FIG. 10D is a front elevational view of the spillover of FIG. 10A.

As can also be seen in FIGS. 9A-9D, the spillover 100 includes two containment members 115, which are generally cylindrical and have a first portion 120 and a second portion 125. The containment members 115 are formed integrally with the spillover 100, but it is understood that they can also be formed separately from the spillover 100 and connected by appropriate means as shown in FIGS. 28A-28F. The first portion 120 extends along, and in line with, an edge of the wall 105 and forms a gap 130 between the containment member 115 and the wall 105 as best seen in FIGS. 9B and 9D. The second portion 125 is generally perpendicular to the first portion 120 and projects inward from the first portion 120 under the wall 105. The containment members 115 are made from a flexible yet resilient material such as plastic and can be moved to allow cables to be routed out of the lateral trough 20 and into the spillover 100 with ease, and then return to their original position, thereby helping to contain the cables within the spillover 100.

As best seen in FIGS. 9A and 9C, the floor 110 has a lip 112 at one end that extends toward the inner wall of trough 20. The lip 112 helps to prevent cables from getting caught up behind floor 110. The spillover 100 is connected to the lateral trough by a support bracket 150.

FIGS. 10A-10D disclose another embodiment of a spillover 200. Spillover 200 is the same as spillover 100 except for the configuration of the containment members 215. In this embodiment, the first portion 220 of the containment members 215 that extends from floor 210 is a horizontally disposed arm with an outer upwardly curving portion. The second portion 225 is a generally flat arm and extends perpendicularly downward from the end of first portion 220.

Figure 11A:
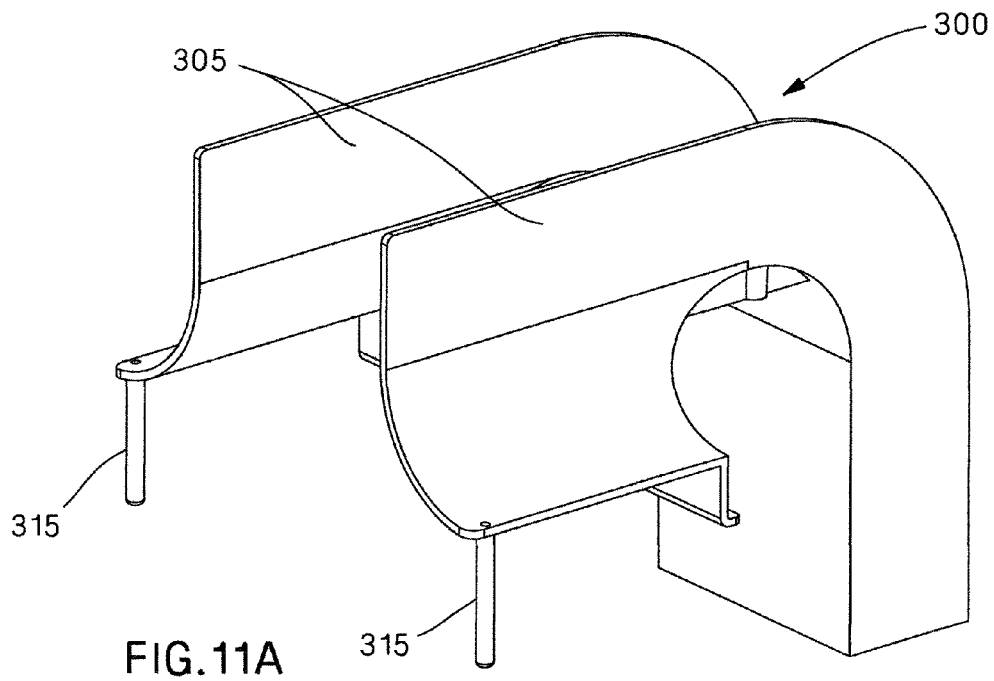
FIG. 11A is a front perspective view of another alternate embodiment of a spillover in accordance with the present invention.
Figure 11B:
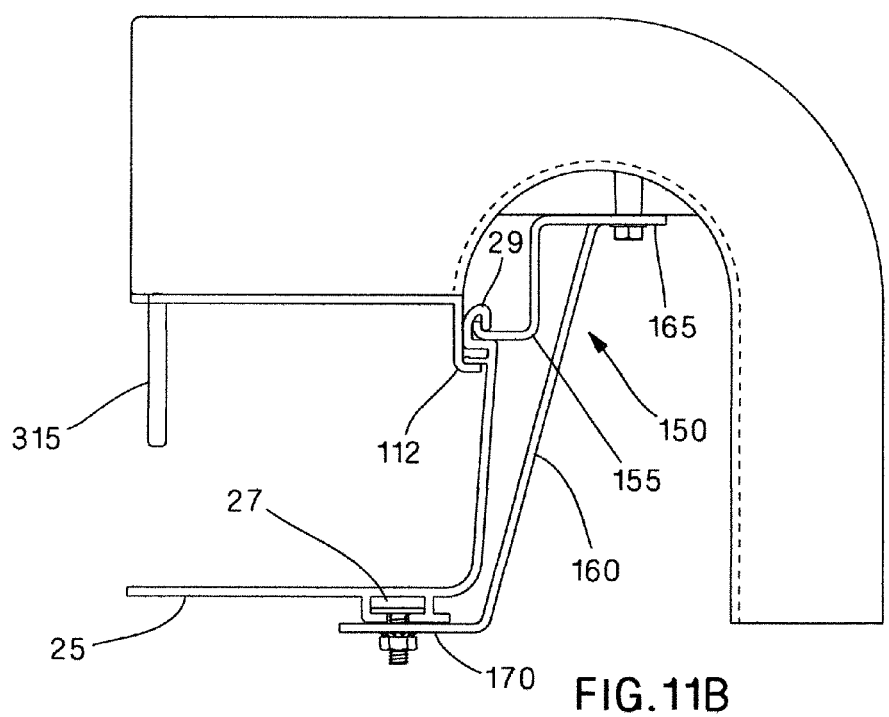
FIG. 11B is a side elevational view of the spillover of FIG. 11A, including a mounting bracket positioned for mounting to a lateral trough section.

FIGS. 11A and 11B disclose another embodiment of a spillover 300. Spillover 300 is the same as spillover 100 except for the containment members 315. In this embodiment, the containment members 315 are generally cylindrical posts which extend downwardly from the walls 305 near the end that is disposed over the lateral trough 20.

Figure 12A:
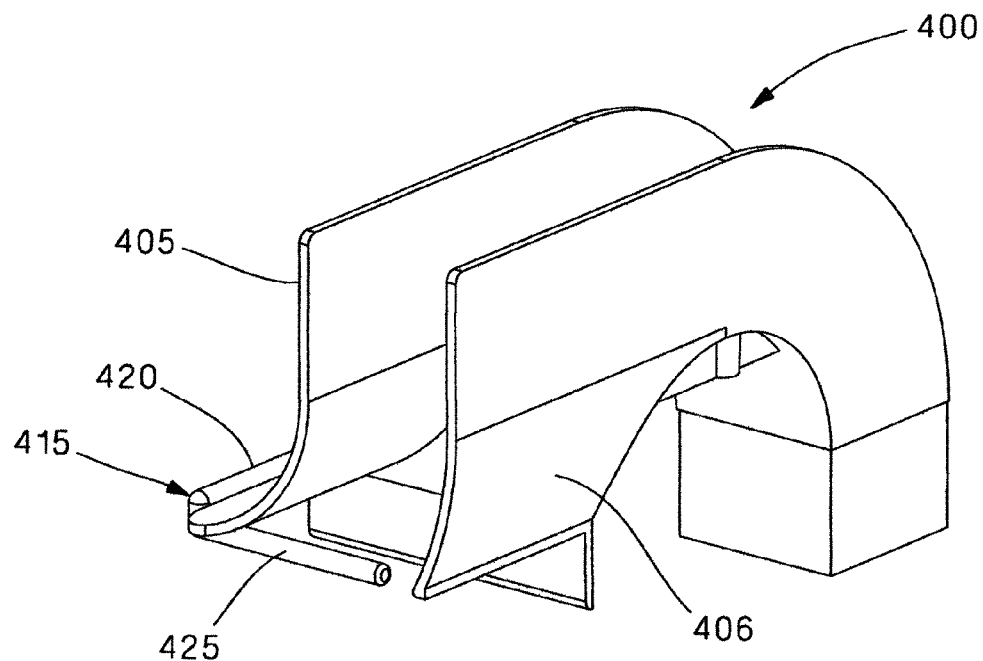
FIG. 12A is a right front perspective view of another alternate embodiment of a spillover in accordance with the present invention.
Figure 12B:
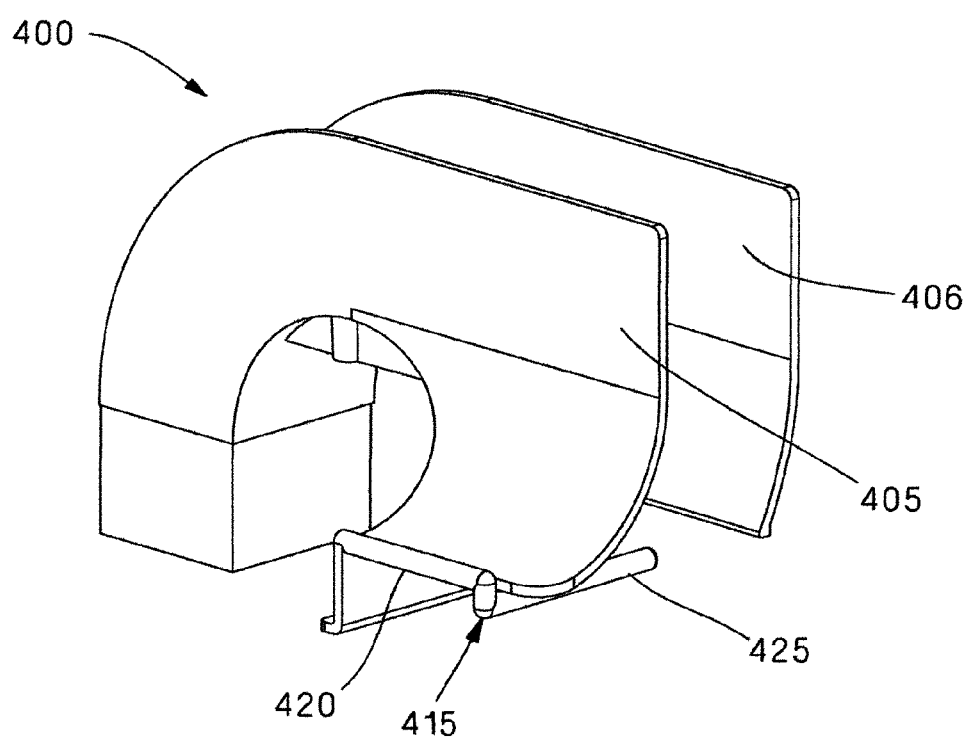
FIG. 12B is a left front perspective view of the spillover of FIG. 12A.
Figure 12C:
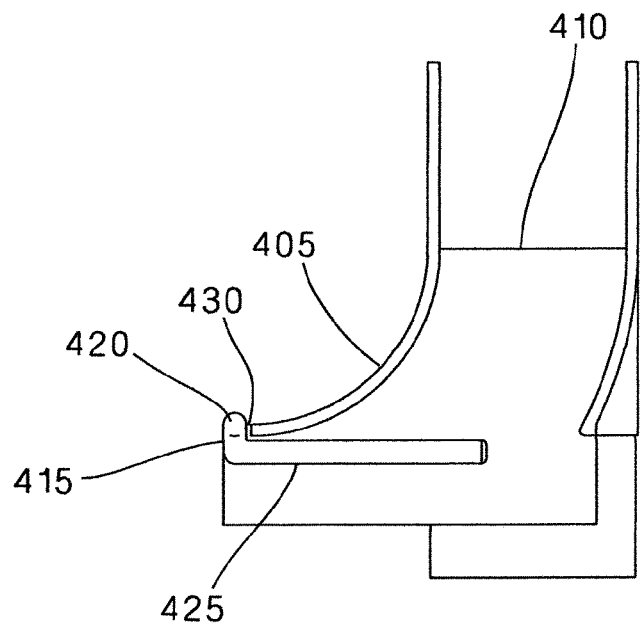
FIG. 12C is a front elevational view of the spillover of FIG. 12A.
Figure 12D:
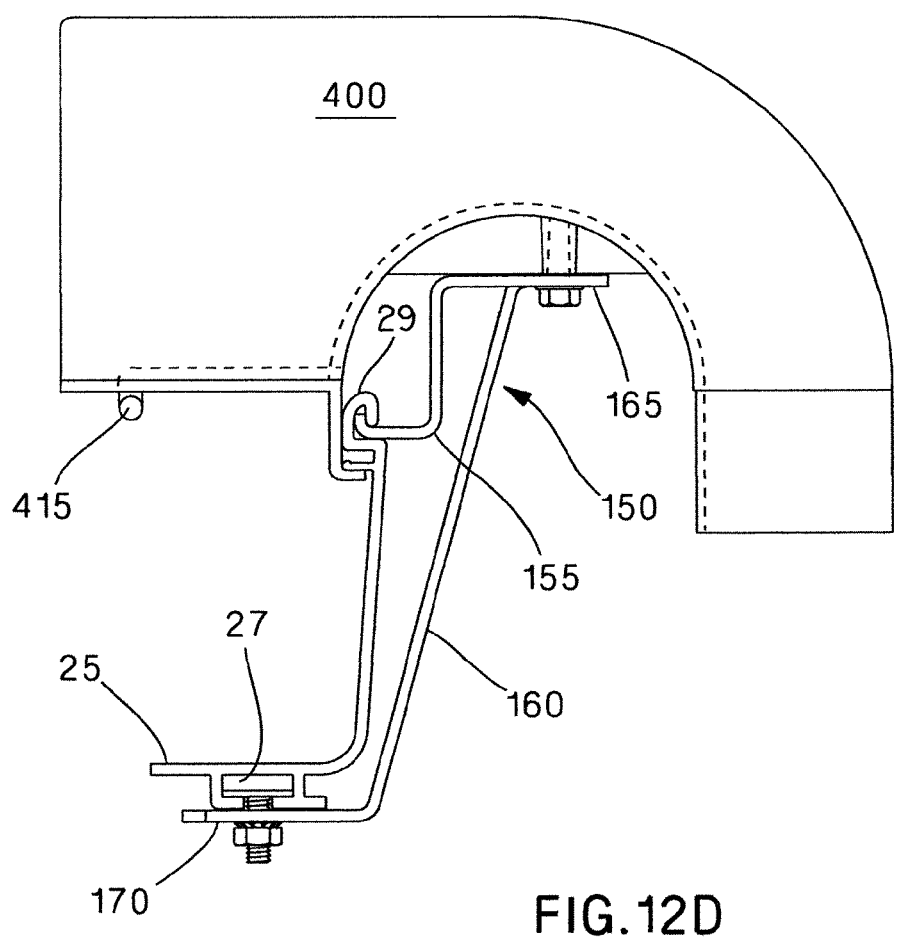
FIG. 12D is a side elevational view of the spillover of FIG. 12A, including a mounting bracket positioned for mounting to a lateral trough section.
Figure 12E:
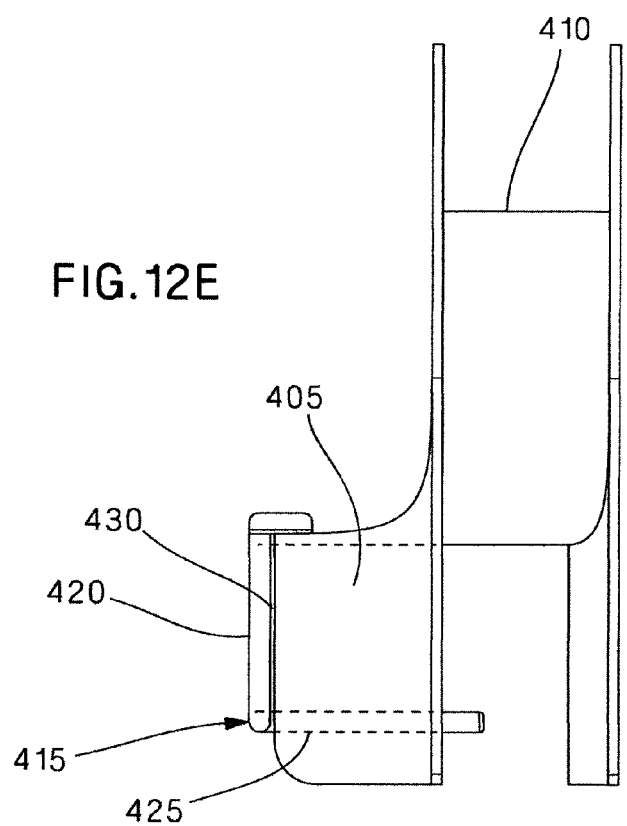
FIG. 12E is a top plan view of the spillover of FIG. 12A.
Figure 12F:
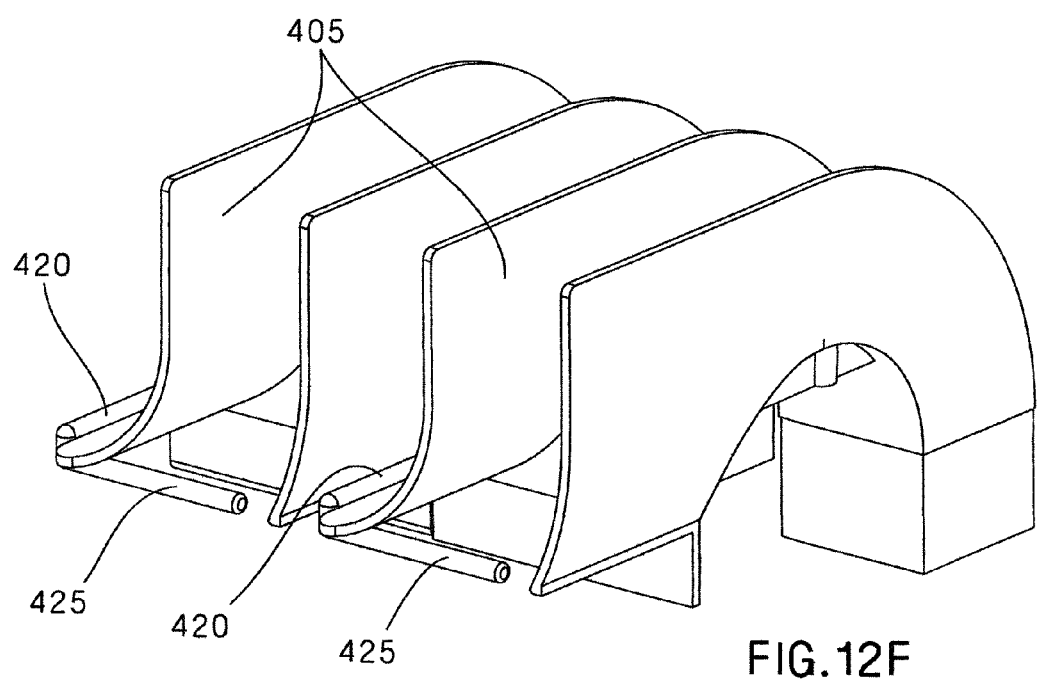
FIG. 12F is a right front perspective view of two spillovers of FIG. 12A positioned side by side.
Figure 12G:
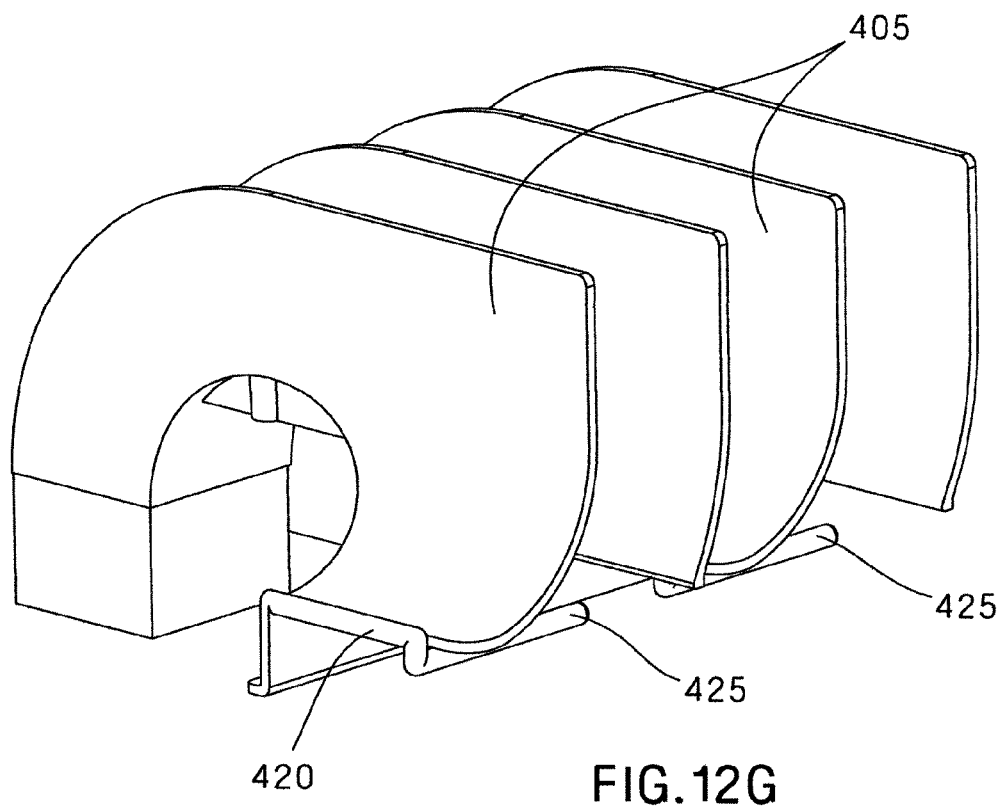
FIG. 12G is a left front perspective view of FIG. 12F.
Figure 12H:
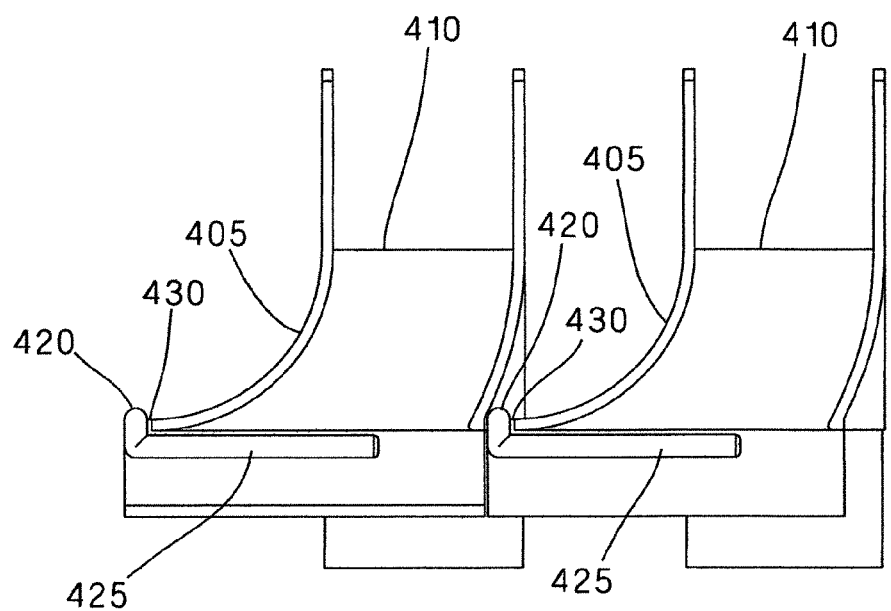
FIG. 12H is a front elevational view of FIG. 12F.

FIGS. 12A-12H disclose another embodiment of a spillover 400. Spillover 400 has a first wall 405 and a second wall 406. The spillover 400 is constructed similarly to spillover 100 except that, because second wall 406 does not include a curved extension portion oppositely directed to wall 405, spillover 400 provides a single directional exit path as opposed to the dual directional exit paths provided by spillover 100. The single directional design of spillover 400 allows for a smaller overall footprint as well as the ability to attach two spillovers 400 to the lateral trough 20 side by side as seen in FIGS. 12F-12H thus minimizing the distance between spillovers 400. Also, the spillover 400 includes only one containment member 415. While the single directional spillover 400 is described herein with similar containment means as spillover 100, it is understood that a single directional spillover can utilize similar containment means as those described with regard to spillovers 200 and 300.

Figure 13A:
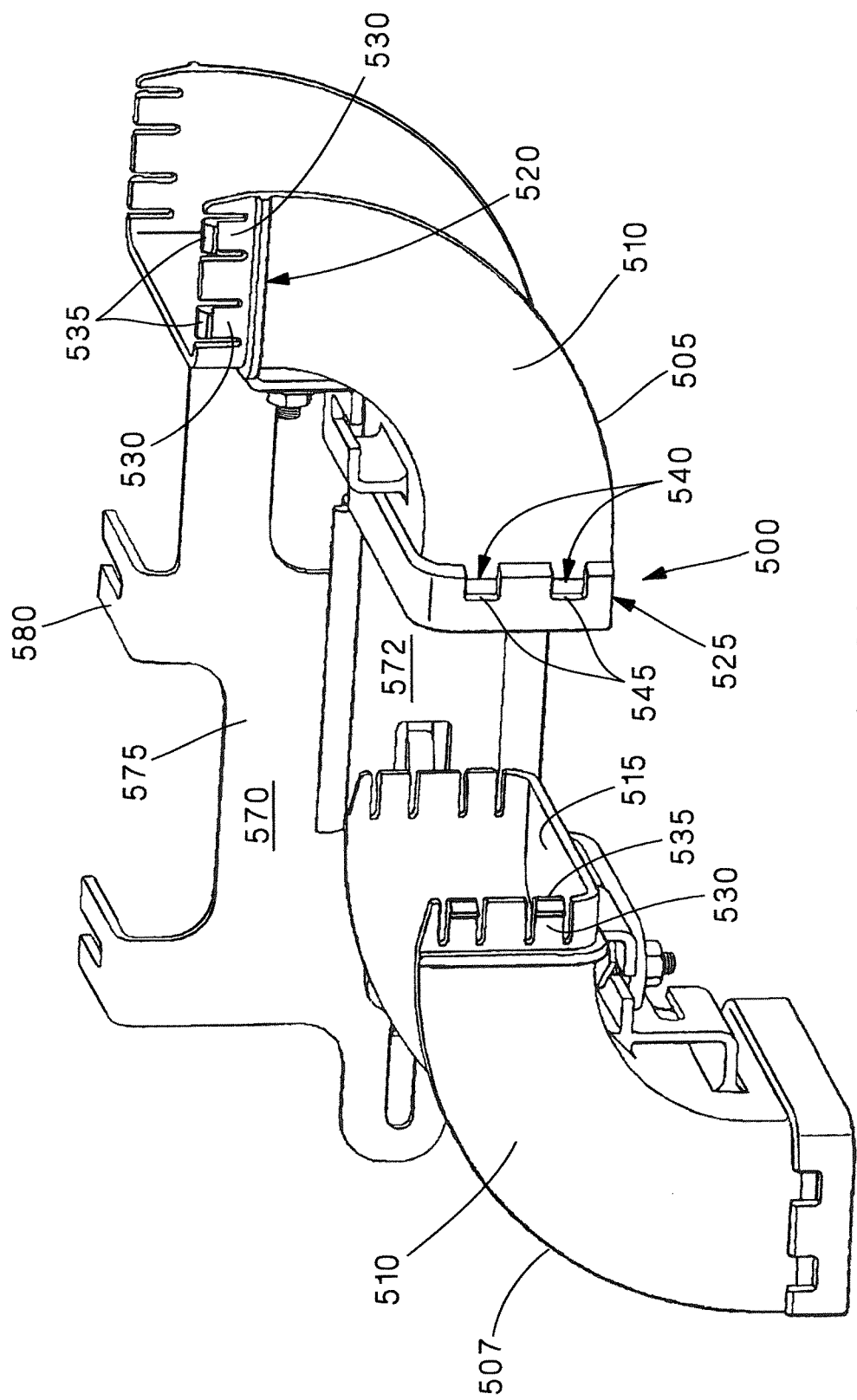
FIG. 13A is a perspective view of a cable guide assembly in accordance with the present invention.

As seen in FIG. 13A, cable guide assembly 500 includes first and second curved fittings 505, 507, which each include two sidewalls 510 and a curved surface 515 positioned between and connected to sidewalls 510 defining a channel. The first and second curved fittings 505, 507 each have a first connecting portion 520 at one end and a second connecting portion 525 at the other end. The first connecting portion 520 includes two tabs 530 having latches 535, and the second connecting portion 525 provides two corresponding apertures 540 defining ridges 545 therein. The apertures 540 of the second connecting portion 525 are adapted to receive the tabs 530 of the first connecting portion 520 therein such that the latches 535 engage the ridges 545 in a latching engagement. An identical second connecting portion is provided at the base of the spillover 100 such that the first connecting portion 520 of the first curved fitting 505 can be received therein, thereby connecting the first curved fitting 505 to the spillover 100. While this example includes latching-type connecting means as described above, it is understood that any conventional connecting means may be used.

Figure 13B:
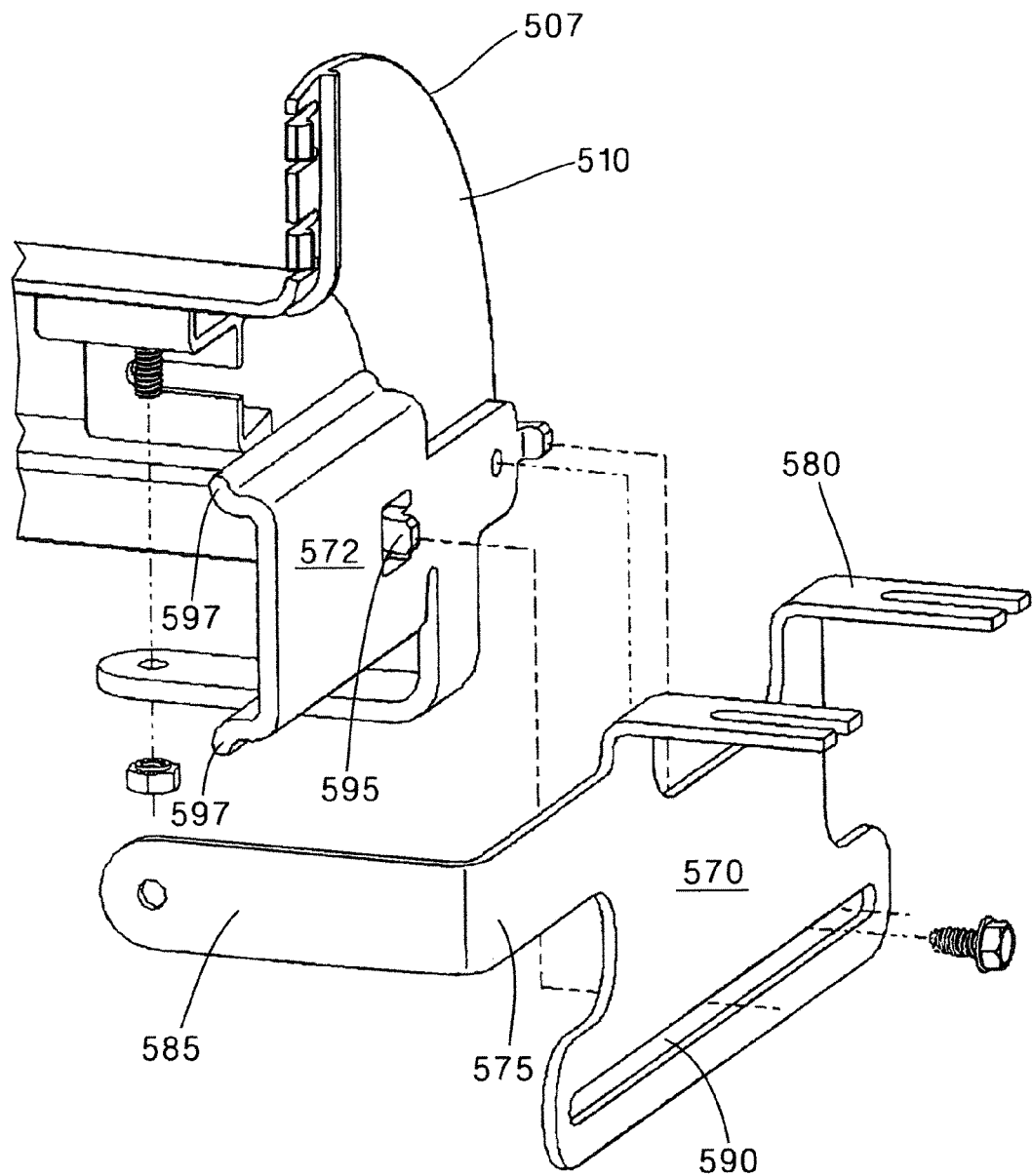
FIG. 13B is a partially exploded perspective view of a portion of the cable guide assembly of FIG. 13A.
Figure 13C:
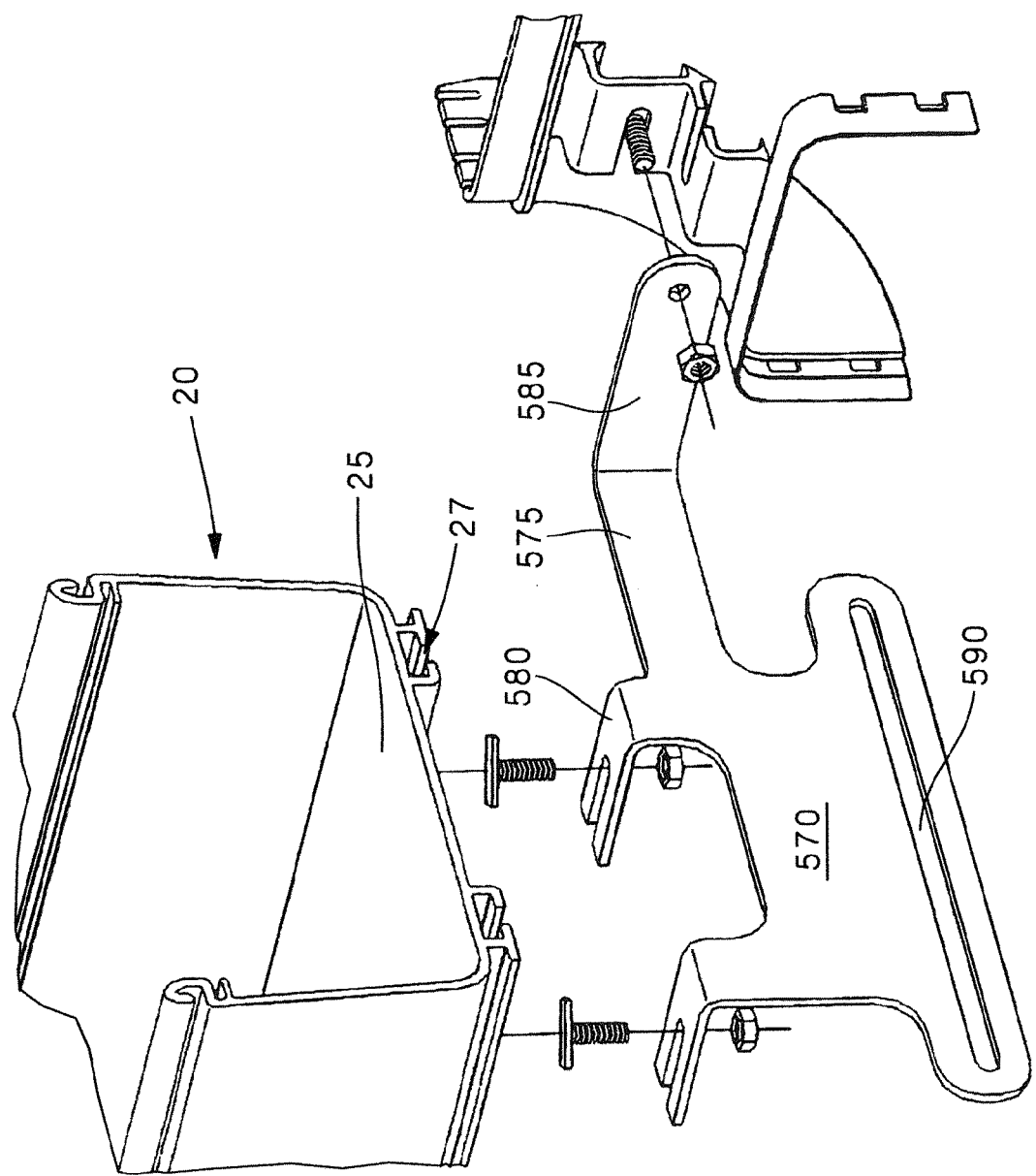
FIG. 13C is a partially exploded perspective view of a portion of the cable guide assembly of FIG. 13A.

As seen in FIG. 13B, cable guide assembly 500 also includes a first support bracket 570 and second support bracket 572. The first support bracket 570 has a vertical portion 575, a first horizontal portion 580, and a second horizontal portion 585. The vertical portion 575 has an elongated slot 590 therein. The second support bracket 572 includes a horizontal slide arm 595 that is slidingly engaged with the elongated slot 590 of the first support bracket 570 such that the slide arm 595 can move horizontally within the elongated slot 590. As seen in FIG. 13C, the first horizontal portion 580 is generally flat and parallel with the base 25 of the lateral trough 20 and is connected to the receiving channel 27 on the underside of the lateral trough 20 via screws or similar means thereby fixing the first support bracket 570 to the lateral trough 20.

Figure 14:
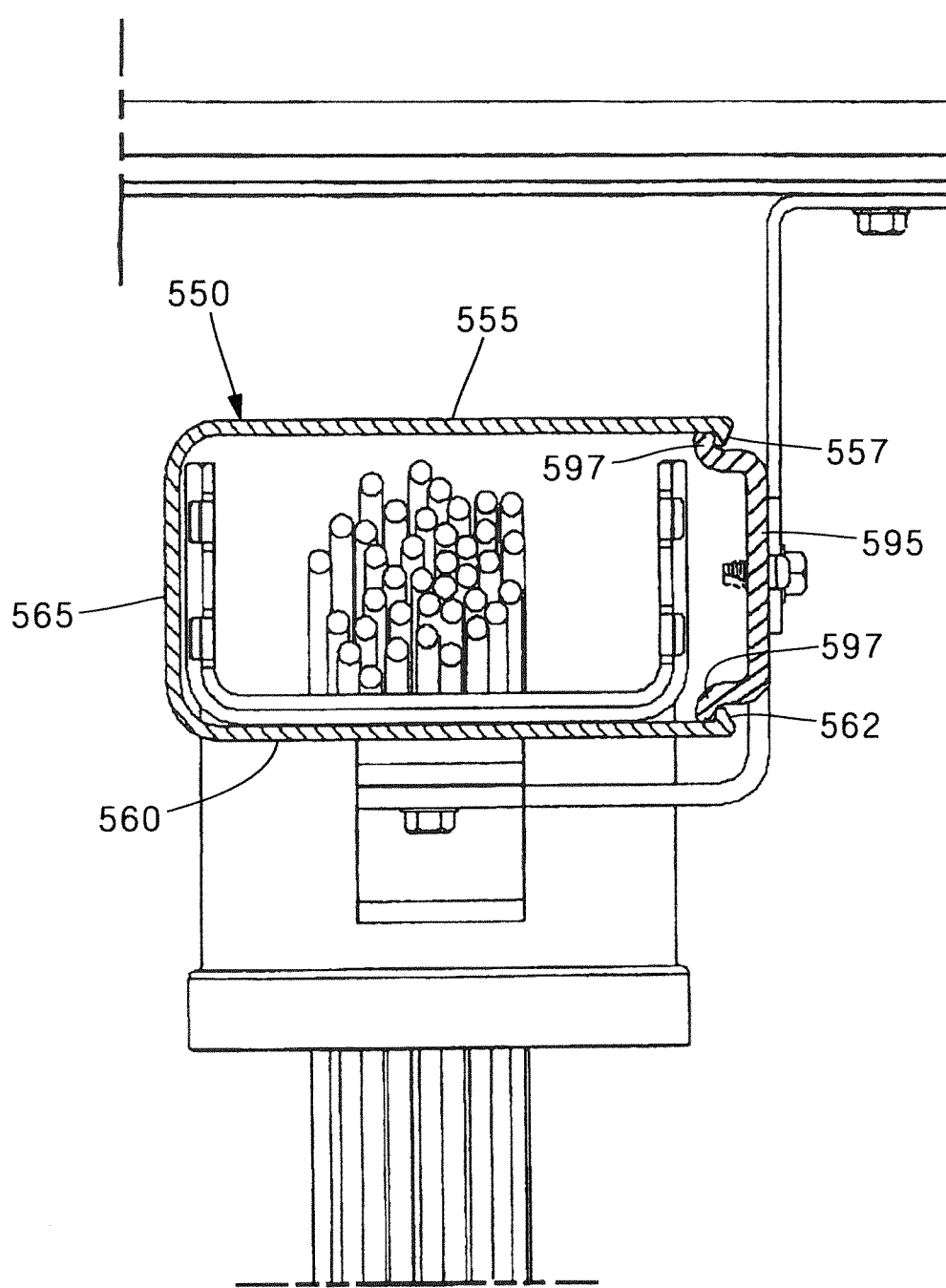
FIG. 14 is an enlarged partial cut away view of the cable guide assembly of FIG. 5.
Figure 15:
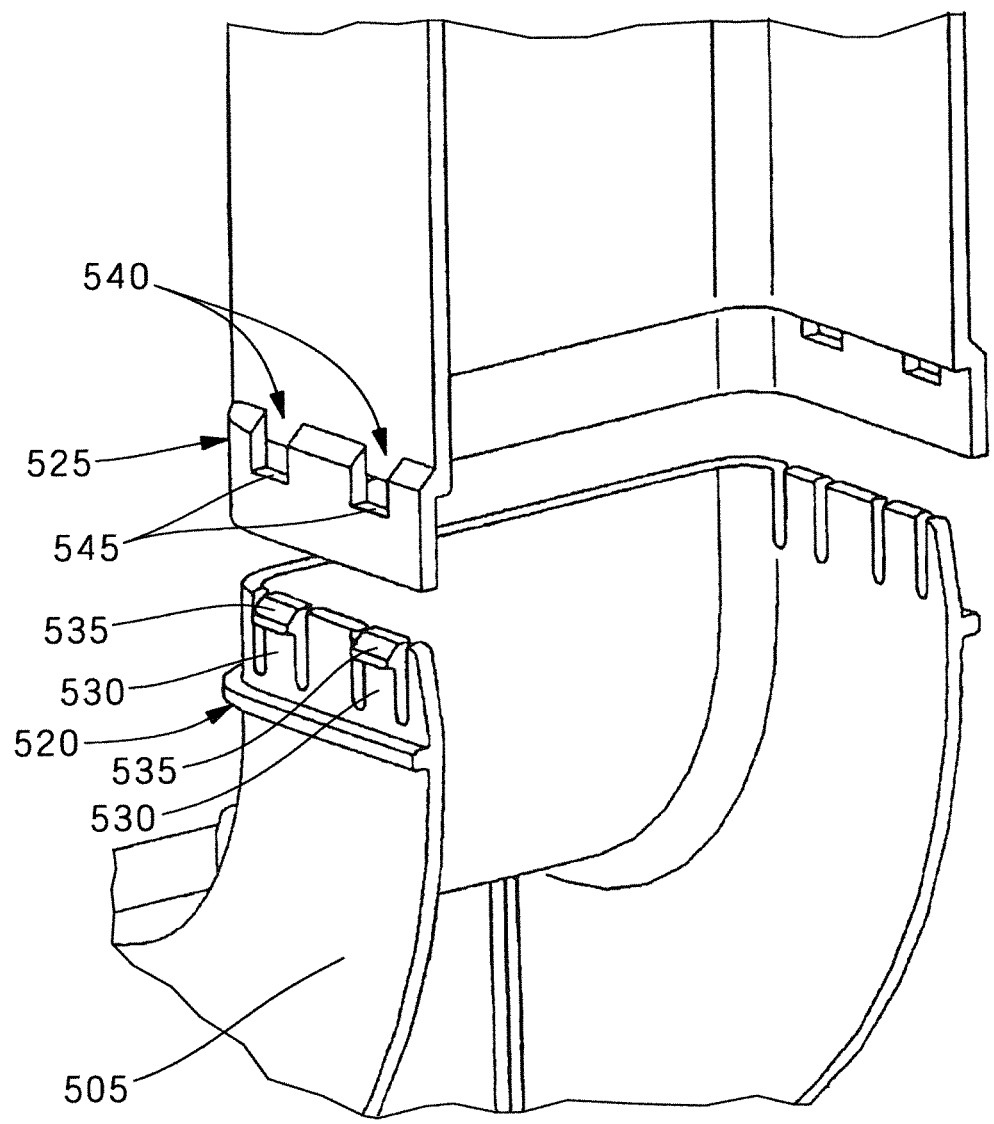
FIG. 15 is an enlarged partial exploded view of the connection between the spillover and the cable guide assembly of FIG. 1.
Figure 16:
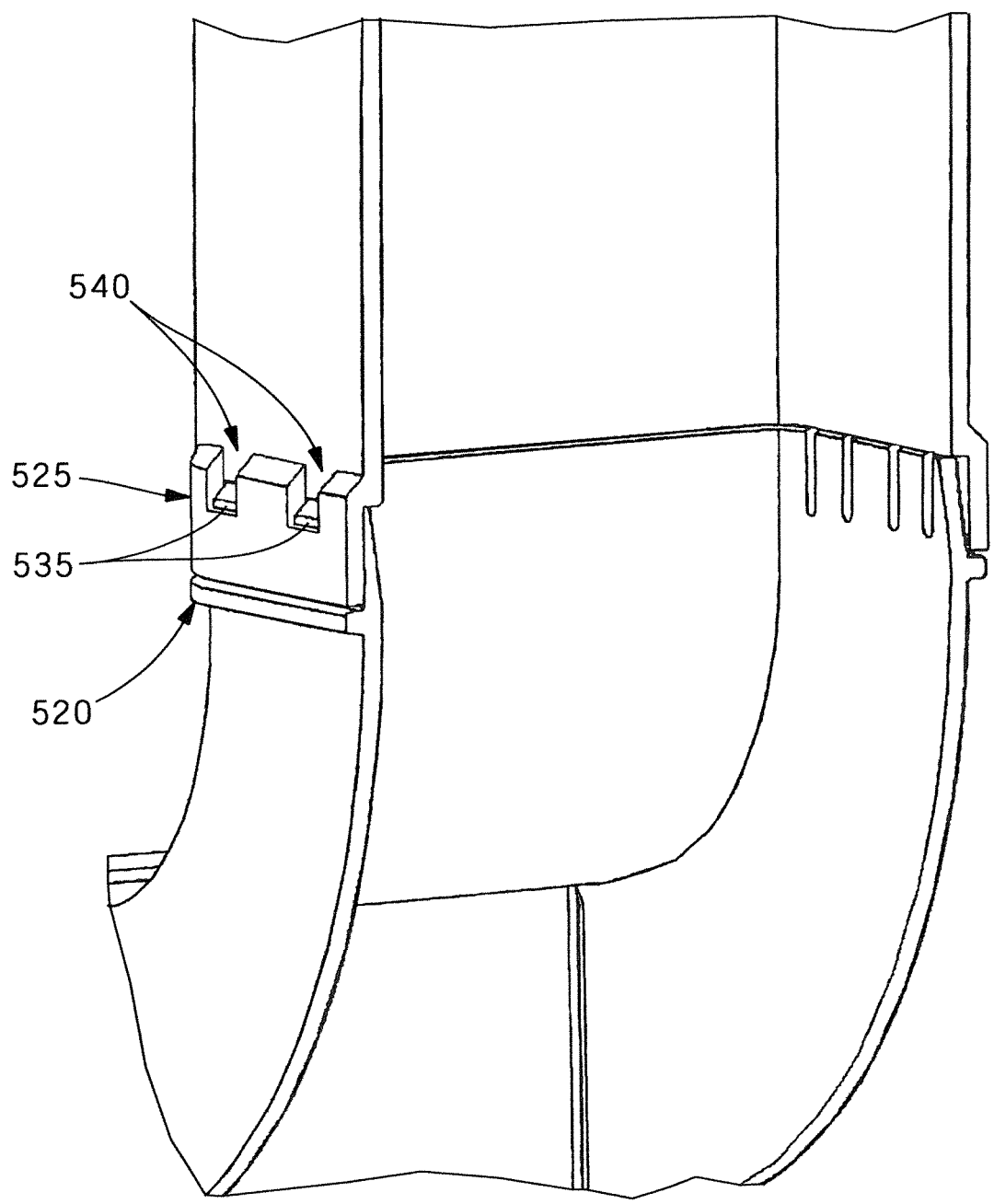
FIG. 16 is an enlarged partial perspective view of FIG. 15, after the spillover and the cable guide assembly have been connected.
Figure 17:
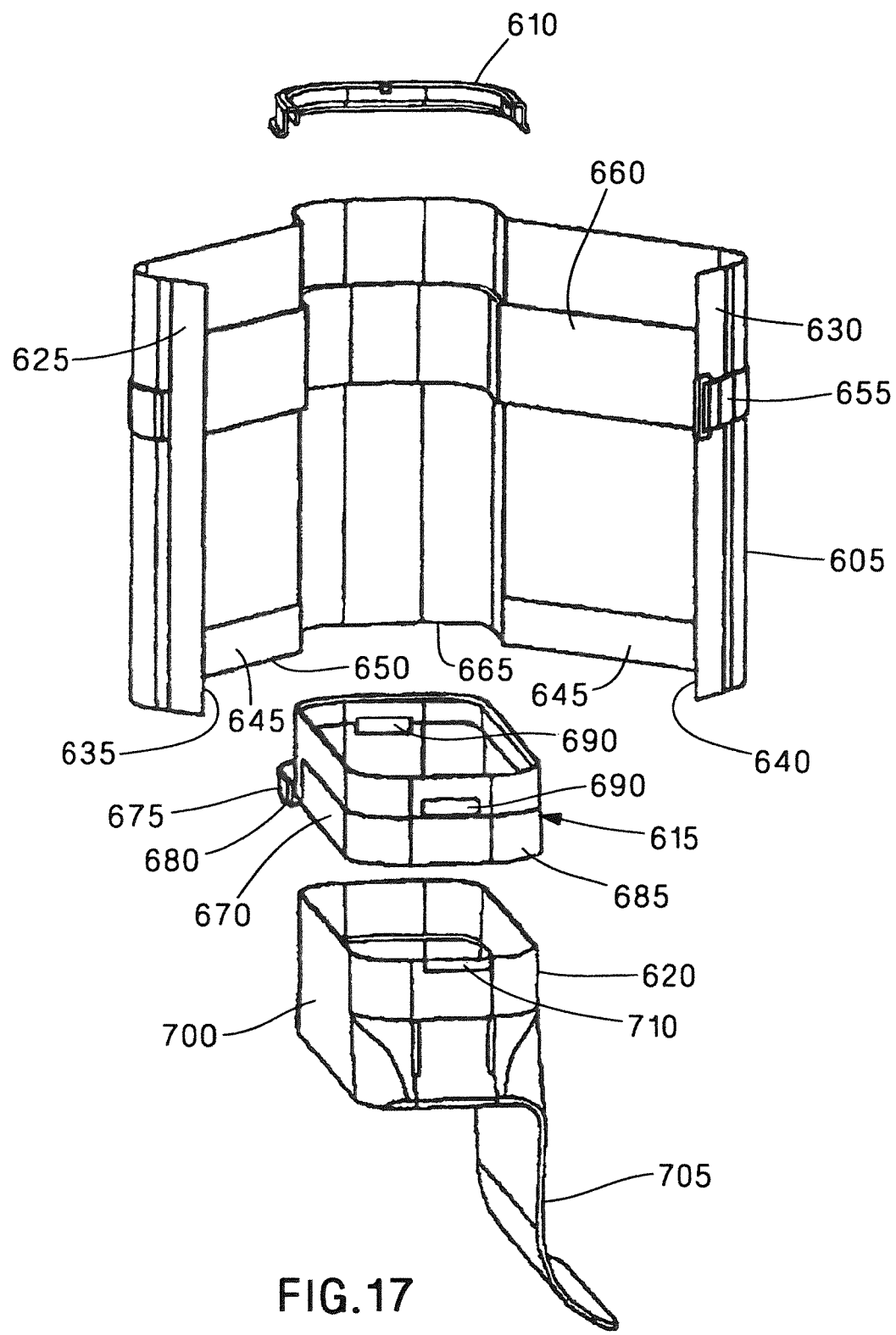
FIG. 17 is an exploded view of a portion of the sealing assembly of FIG. 8.
Figure 18A:
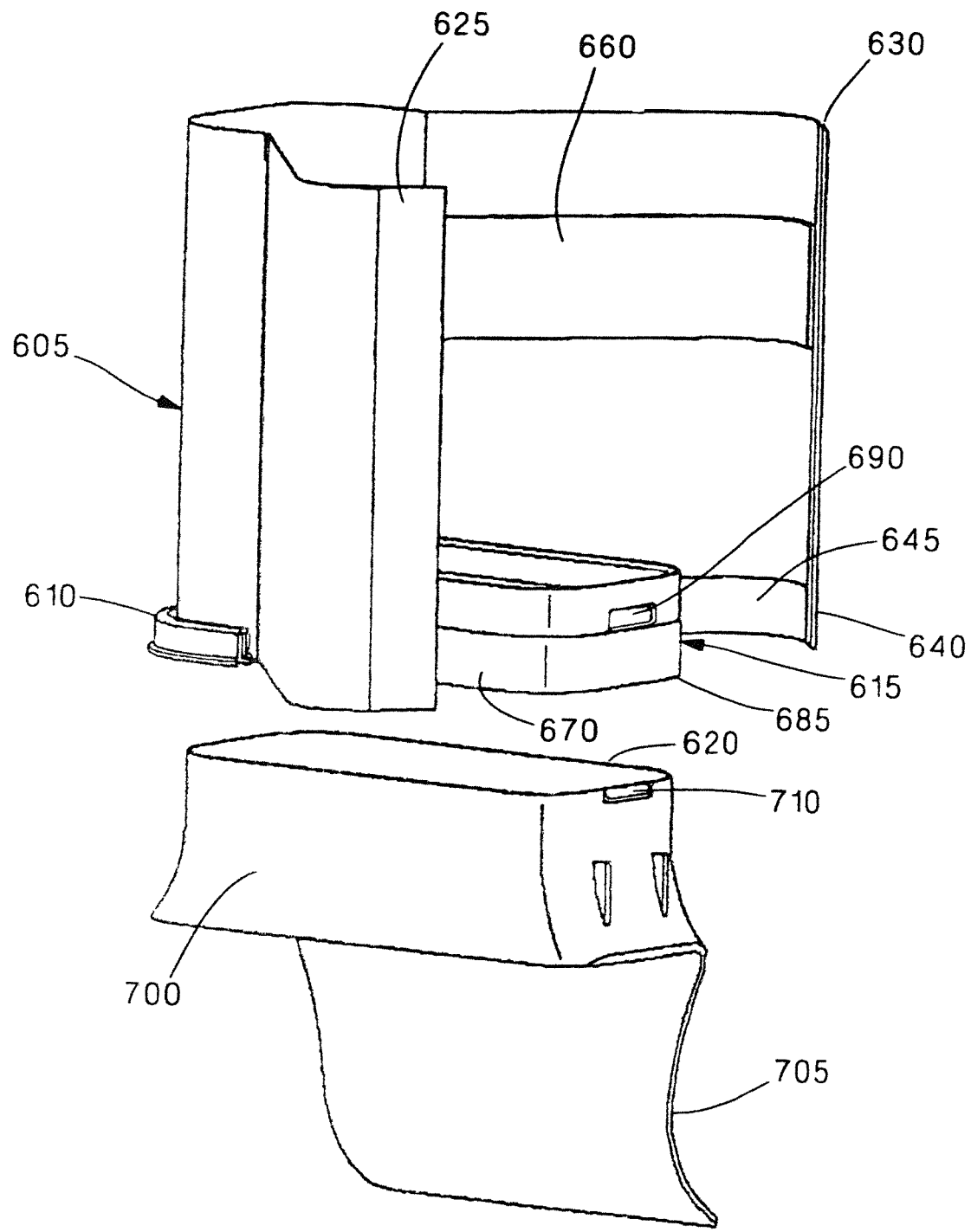
FIG. 18A is a partially assembled view of the portion of the sealing assembly of FIG. 17.
Figure 18B:
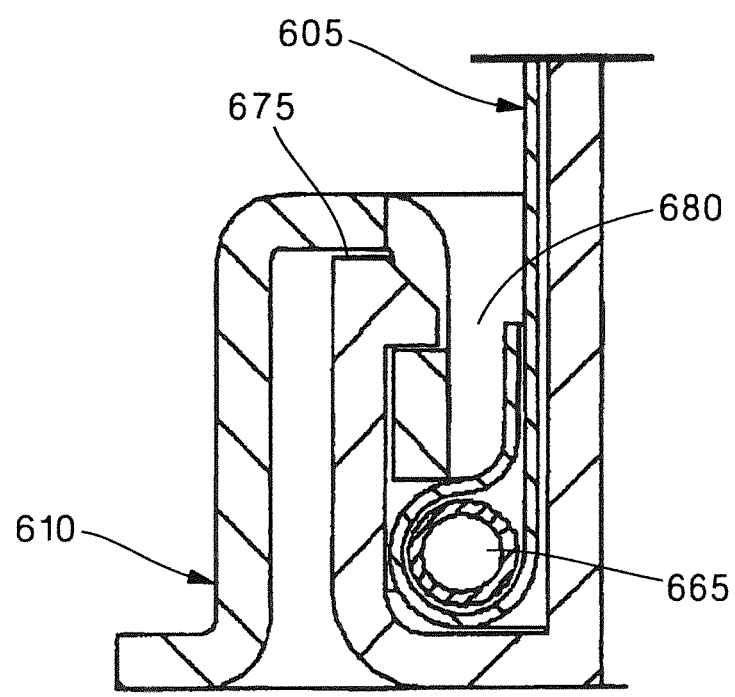
FIG. 18B is a cross-sectional view of a portion of the sealing assembly of FIG. 18A.

The first curved fitting 505 is attached to the second horizontal portion 585 of the first support bracket 570. As best seen in FIG. 13A, the second curved fitting 507 is connected to the second support bracket 572 spaced apart from the first curved fitting 505 defining a space between the first and second curved fittings 505, 507. Due to the sliding engagement between the first support bracket 570 and the slide arm 595 of the second support bracket 572, the size of the space between the first and second curved fittings 505, 507 can be adjusted by sliding the second curved fitting 507 either closer to or further from the first curved fitting 505. As seen in FIG. 14, cable guide assembly 500 may also include a cover 550 to enclose the space between the first and second curved fittings 505, 507. Cover 550 includes a top member 555 and a bottom member 560 which are connected by a side member 565 to form a C-shape. Top and bottom members 555, 560 have inwardly extending flanges 557, 562 respectively at their free ends. The cover 550 is placed over the space defined between first and second curved fittings 505, 507 to enclose the cable or wiring that passes therethrough. The inwardly extending flanges 557, 562 engage latches 597 on the second support bracket 572 thereby connecting the cover 550 to the second support bracket 572 and covering the cables or wiring.

With the increasing density of equipment housed within cabinets, it has also become increasingly important to control the temperature environment within and outside of the cabinets. It is thus important to provide a sealing means to prevent hot air from the cabinet, which is intended to be exhausted into a cooling plenum, from escaping into the troughing systems. It is also beneficial to have a sealing assembly that protects cables passing through the aperture from any edges that could cause damage.

As can be seen in FIGS. 6-8 and 17-21, a cable drop system can further include a sealing and cover assembly 600 installed around cable or wiring passing through an opening 50 in a top surface of a network cabinet 55. However, it will be understood that the examples disclosed herein could be installed and used with any desired surface having an aperture therethrough. Sealing and cover assembly 600 generally has an upper sleeve 602, a lower sleeve 605, a locking flange 610, a grommet member 615 and a bend radius insert member 620.

FIGS. 17-21 disclose a lower sleeve 605 that is constructed of a sheet of flexible material that can be wrapped around cable or wiring during installation. Lower sleeve 605 is substantially similar to the sealing assembly which is the subject of U.S. patent application Ser. No. 11/751,716, which is incorporated by reference in its entirety herein. Strips of hook and loop type fastener 625, 630 are attached to first and second side edges 635, 640 of lower sleeve 605 such that the ends can be engaged to secure lower sleeve 605 around cable or wiring. It is understood that any well known method could be used to connect first and second side edges 635, 640 of lower sleeve 605, such as zippers, double sided tape, Husky storage bag closure, etc.

Figure 21:
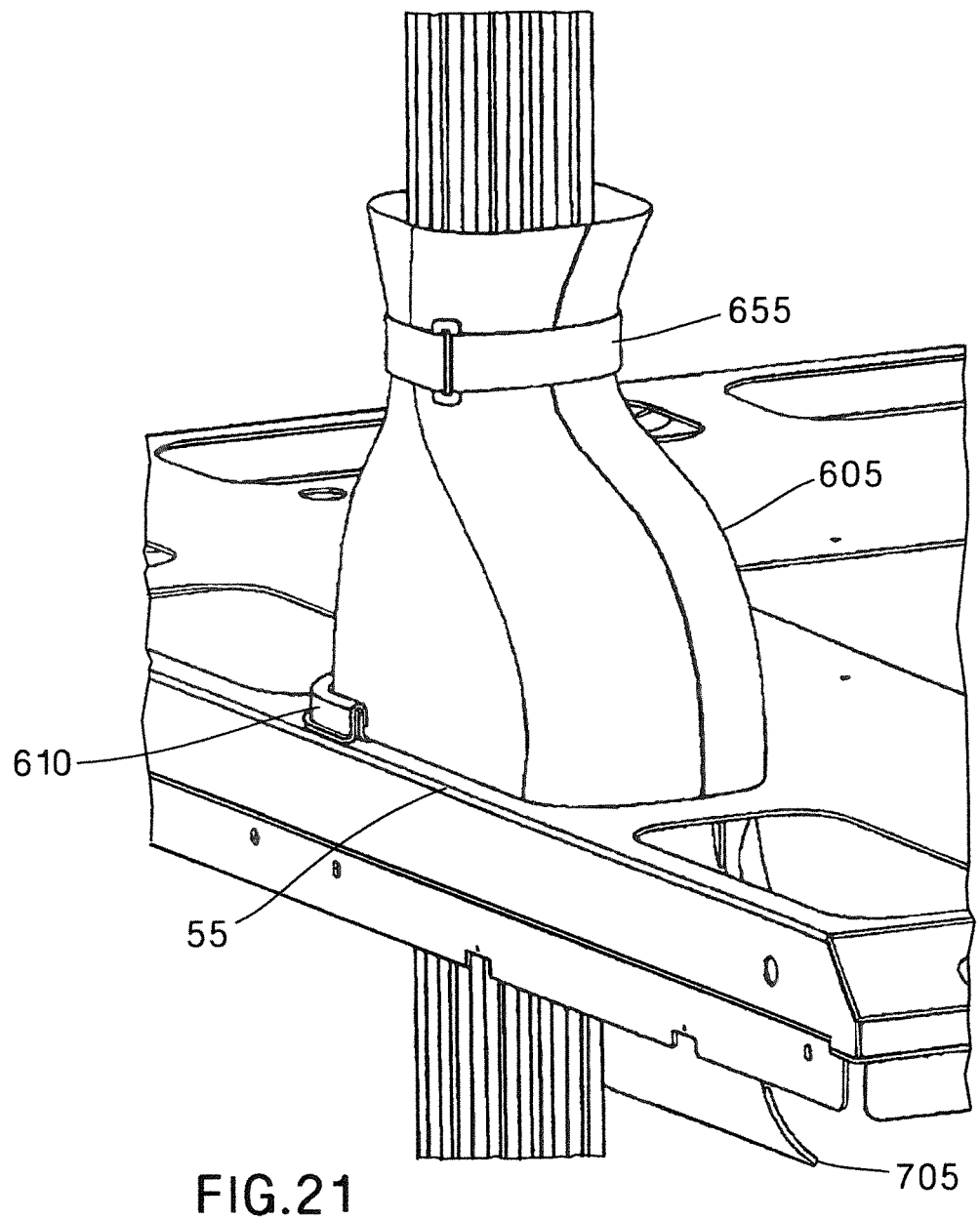
FIG. 21 is a perspective view of the portion of the sealing assembly of FIG. 17, shown after being connected to the network cabinet.

Referring generally to FIGS. 17-21, and specifically to FIG. 18B, the bottom portion of lower sleeve 605 is folded back over a cylindrical rod to form a protuberance 665 which allows the bottom portion of lower sleeve 605 to be secured to the grommet member 615 with the locking flange 610 as described in more detail below. In an alternate embodiment, a bottom portion of sleeve 605 is secured to the grommet member 615 with adhesive. The bend radius insert 620 is generally rectangular and is formed by wall 700. One side of wall 700 has a curved arm 705 extending downwardly therefrom to provide bend radius control for cables inside the cabinet. The remaining three sides of wall 700 have flared lower portions to provide protection to the cables. Grommet member 615 is generally rectangular and is formed by wall 670. One side of wall 670 has a generally U-shaped extension 675 at its base, forming channel 680, which is configured to receive protuberance 665 of lower sleeve 605 and to receive the inside wall of locking flange 610, as can be seen in FIGS. 18A, 18B and 21.

Figure 19:
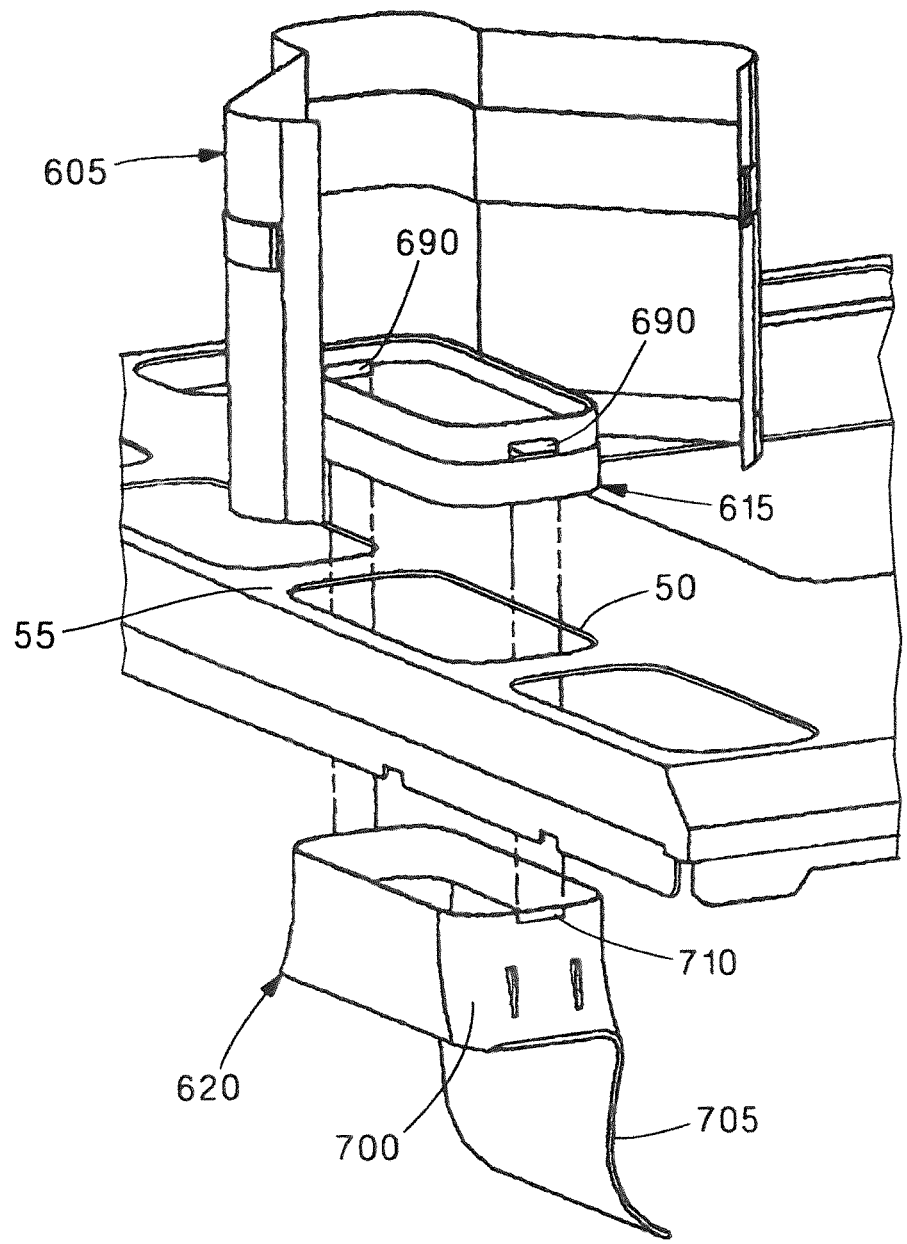
FIG. 19 is an exploded view of a portion of the sealing assembly of FIG. 17, shown being connected to a network cabinet.
Figure 20:
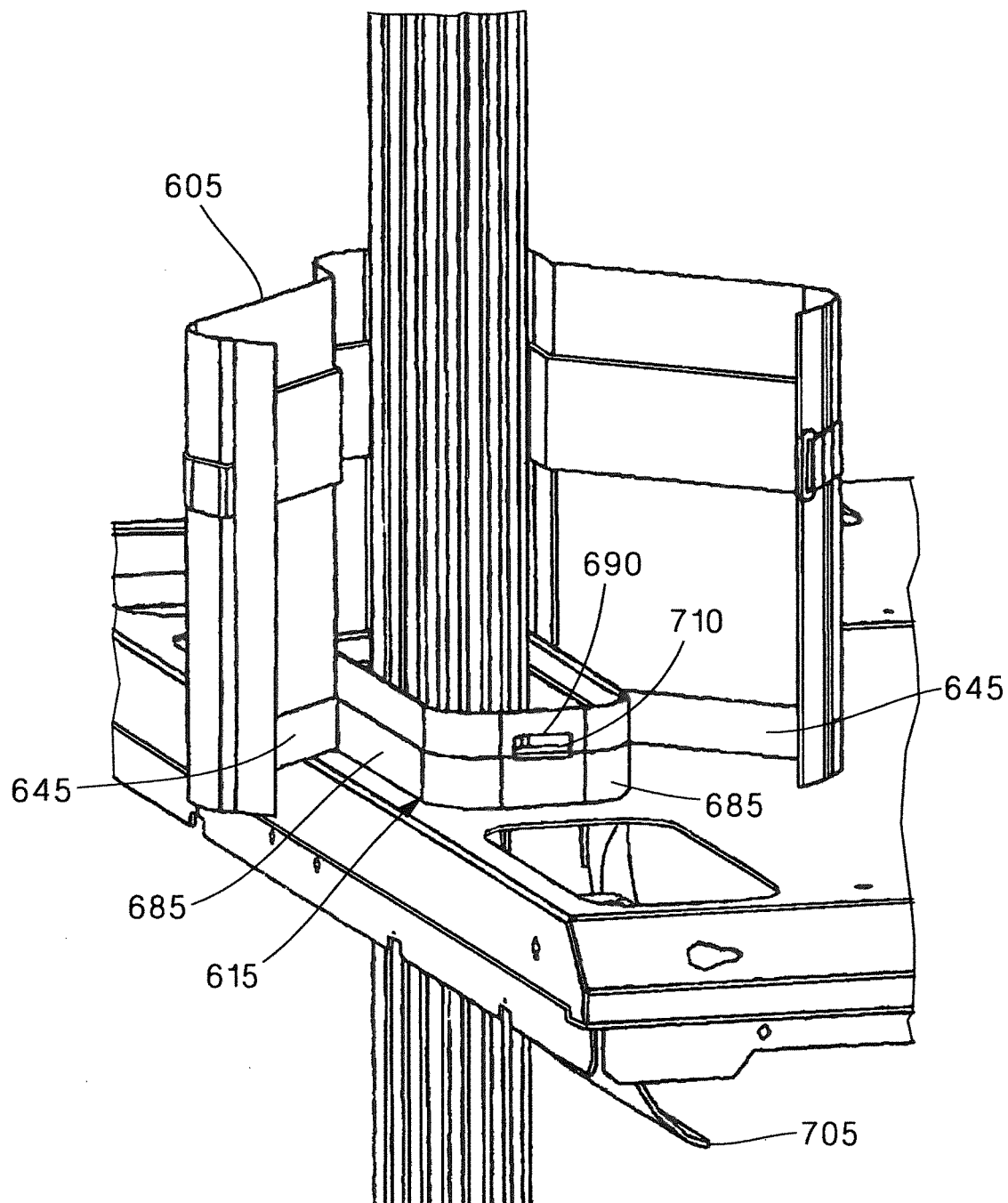
FIG. 20 is a perspective view of the portion of the sealing assembly of FIG. 17, shown being connected to the network cabinet.

The wall 700 also has protrusions 710 extending from a top portion thereof that are positioned and configured to be received in the apertures 690 in wall 670 of the grommet member 615. As seen in FIG. 19, the bend radius insert 620 is sized and shaped to be inserted from the inside of the network cabinet 55 through opening 50. The grommet member 615 is sized and shaped to then fit over the bend radius insert 620 from above the network cabinet. The protrusions 710 on the wall 700 of the bend radius insert 620 engage the apertures 690 in the wall 670 of the grommet member 615 thereby locking the members 615, 620 together and securing them to the network cabinet.

To engage the lower sleeve 605 with the locking flange 610, the protuberance 665 is first positioned within channel 680. Then the inside wall of locking flange 610 is inserted into channel 680, trapping protuberance 665 between grommet member 615 and locking flange 610. In addition, strips of hook material 685 are provided around the remaining three sides of the grommet member 615 and engage with strips of loop material 645 attached along an inside portion of the bottom edge 650 of the lower sleeve 605 to help secure the lower sleeve 605 to the grommet member 615. In an alternate embodiment, strips of hook and loop material are provided on all four sides.

Cinch strap 655 is attached toward the top portion of lower sleeve 605 and extends through a passageway or holes formed in lower sleeve 605. Cinch strap 655 is used to cinch the top portion of lower sleeve 605 around cable or wiring and any similar cinching mechanism could also be used. A strip of foam material 660 is positioned on the interior of the lower sleeve 605 opposing the cinch strap 655 and extends across substantially the entire lower sleeve 605 such that when the cinch strap 655 is tightened, the strip of foam material 660 fills voids between outer cables of a cable bundle or multiple cable bundles in order to provide a more complete seal.

Referring generally to FIGS. 6-8, the upper sleeve 602 is constructed of a sheet of flexible material that can be wrapped around cable or wiring during installation. The upper sleeve 602 is also configured to connect at its top edge to a coupler 604 in a similar fashion as described above for the connection of the lower sleeve 605 with the grommet member 615. In an alternate embodiment, upper sleeve 602 of sealing and cover assembly 600 may be connected directly to any form of spillover as seen in FIG. 8. This simplifies the installation of upper sleeve 602 and allows for installation of upper sleeve 602 around existing cables or wiring, and lower sleeve 605 that are already installed. In the example shown, strips of hook and loop type fastener 626, 631 are attached to first and second side edges 637, 642 of upper sleeve 602. Strips 626, 631 engage each other to connect first and second side edges 637, 642 and position upper sleeve 602 around cable or wiring and lower sleeve 605. In alternate embodiments, any well known method could be used to connect first and second side edges 637, 642 of upper sleeve 602, such as zippers, double sided tape, Husky storage bag closure, etc.

Figure 22:
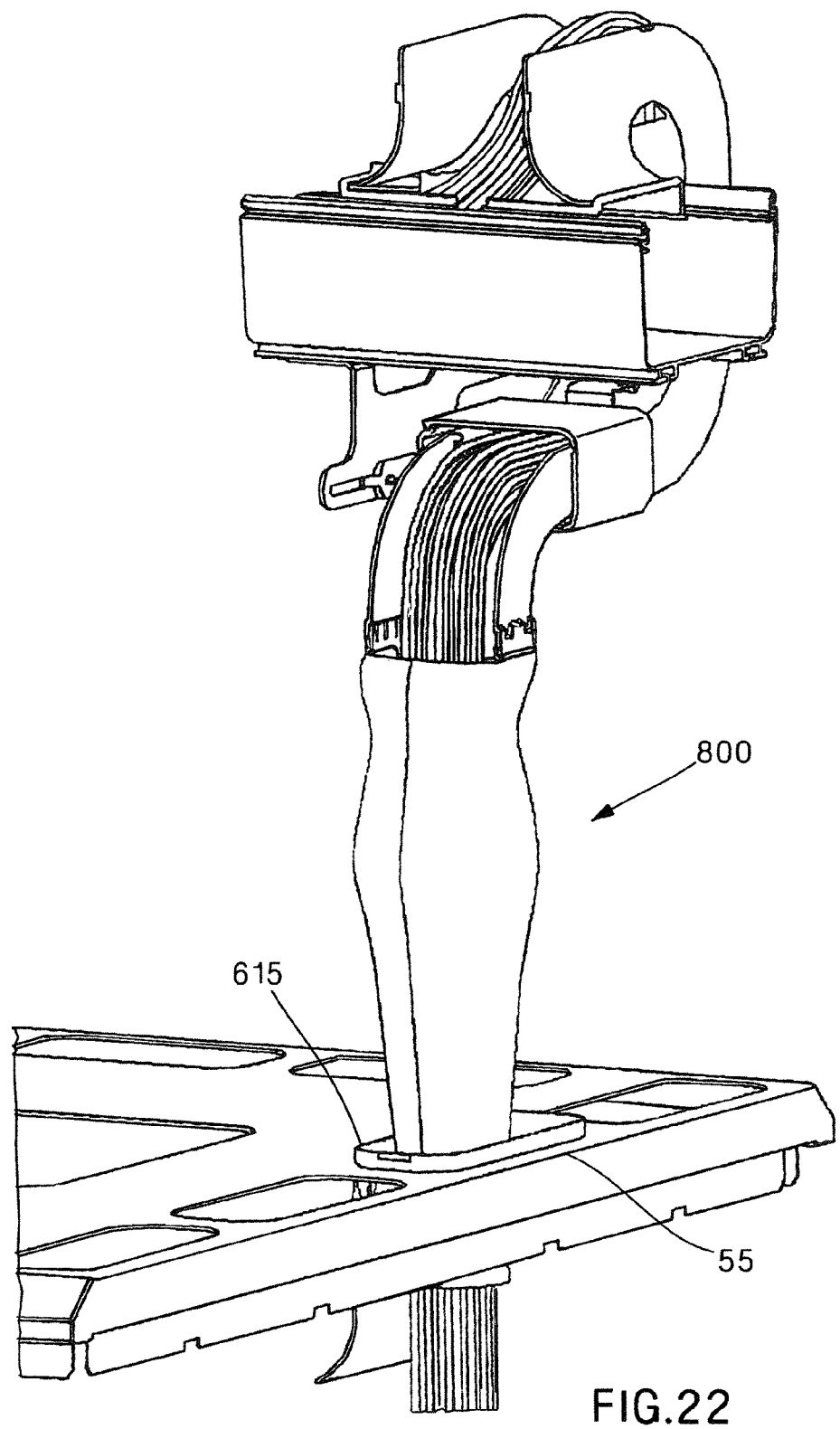
FIG. 22 is an assembled front perspective view of the cable drop system in accordance with another embodiment of the present invention.
Figure 23:
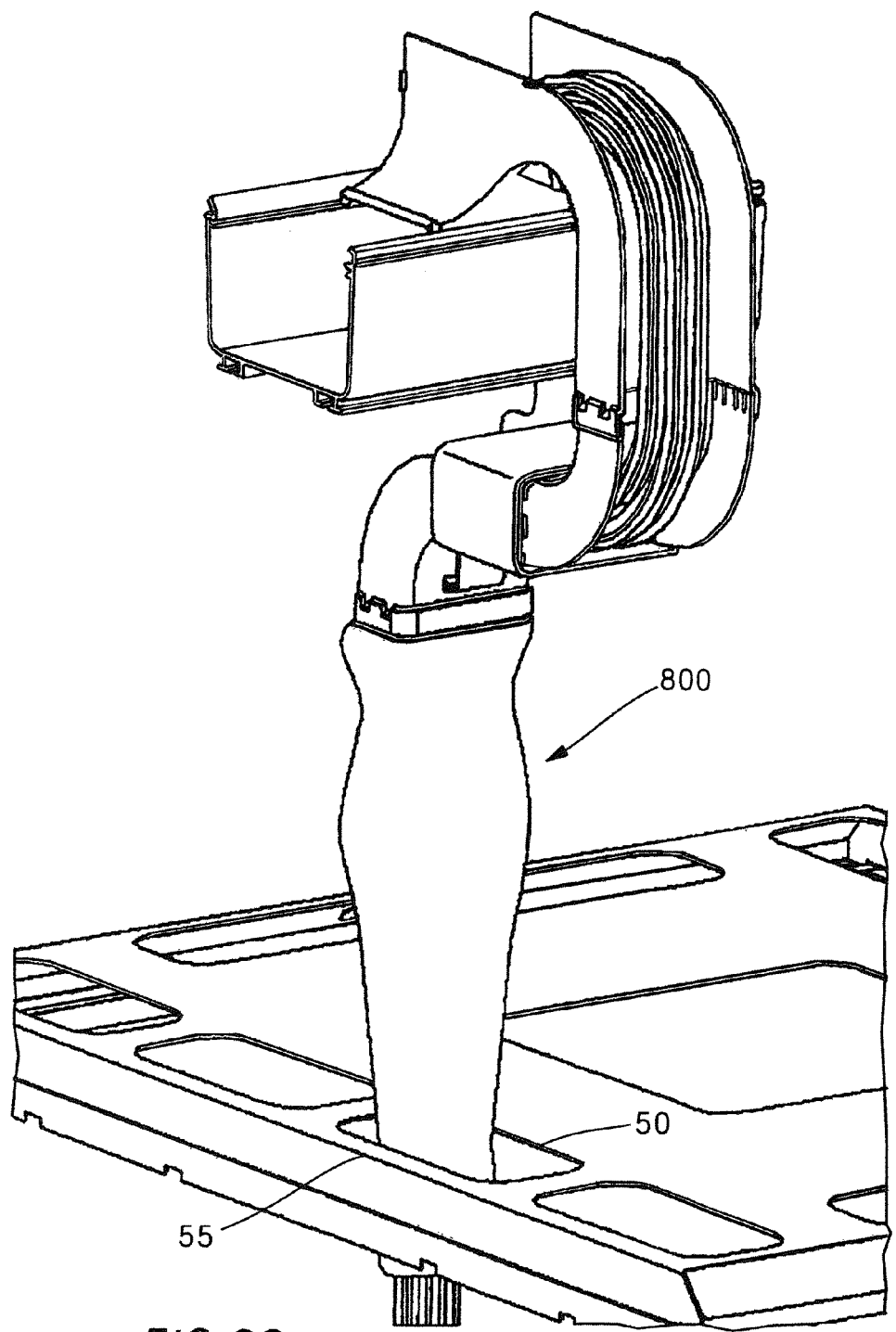
FIG. 23 is a rear perspective view of the cable drop system of FIG. 22 shown without the bend radius insert.

FIGS. 22-23 show an embodiment of a cover assembly 800. The cover assembly 800 extends into the network cabinet 55 through opening 50, rather than connecting to the network cabinet 55 and does not provide a seal. FIG. 22 shows the bend radius insert provided in the cabinet opening while FIG. 23 shows the opening without the bend radius insert.

Figure 24:
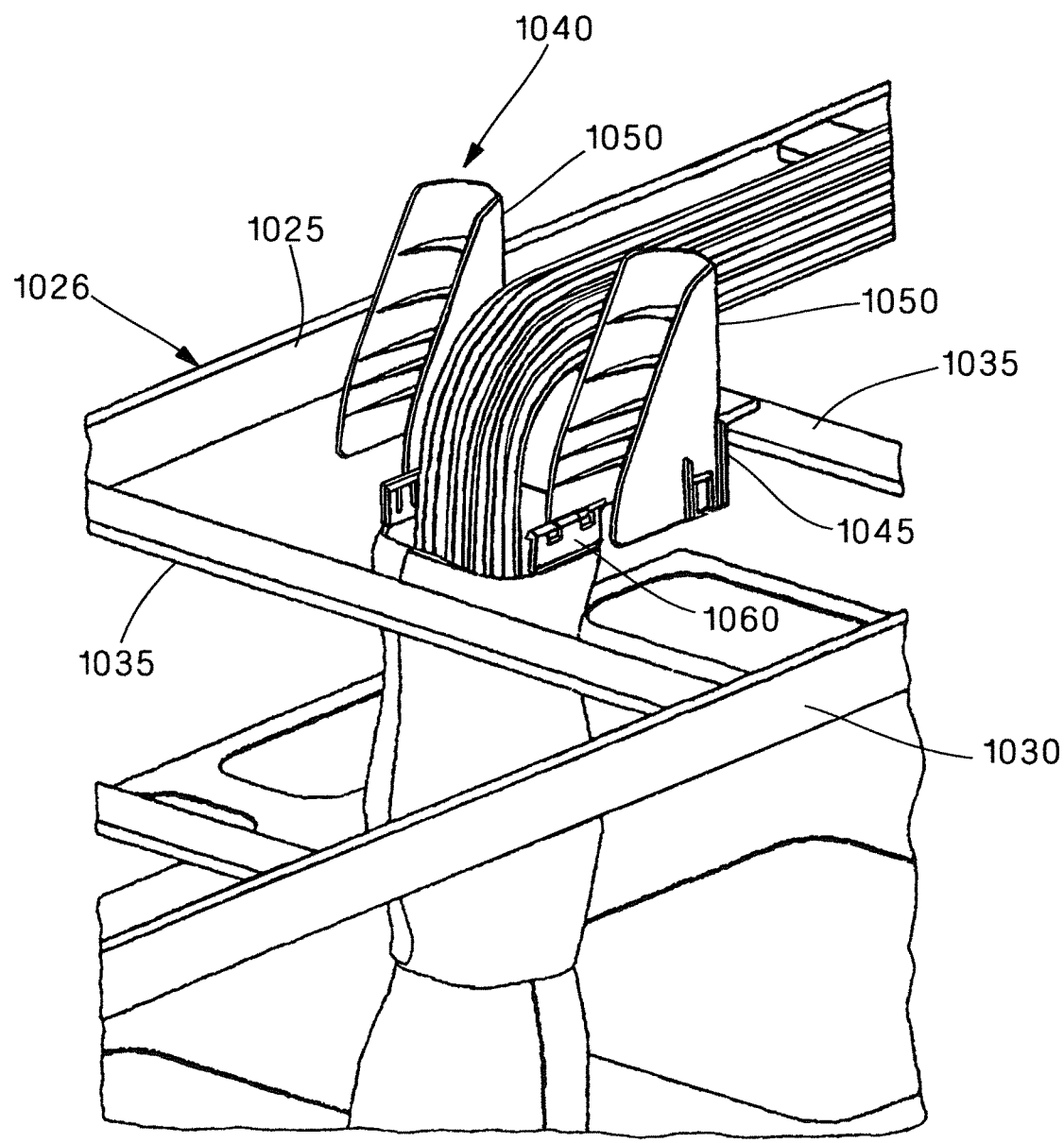
FIG. 24 is a rear perspective view of the cable drop system in accordance with another embodiment of the present invention.
Figure 25:
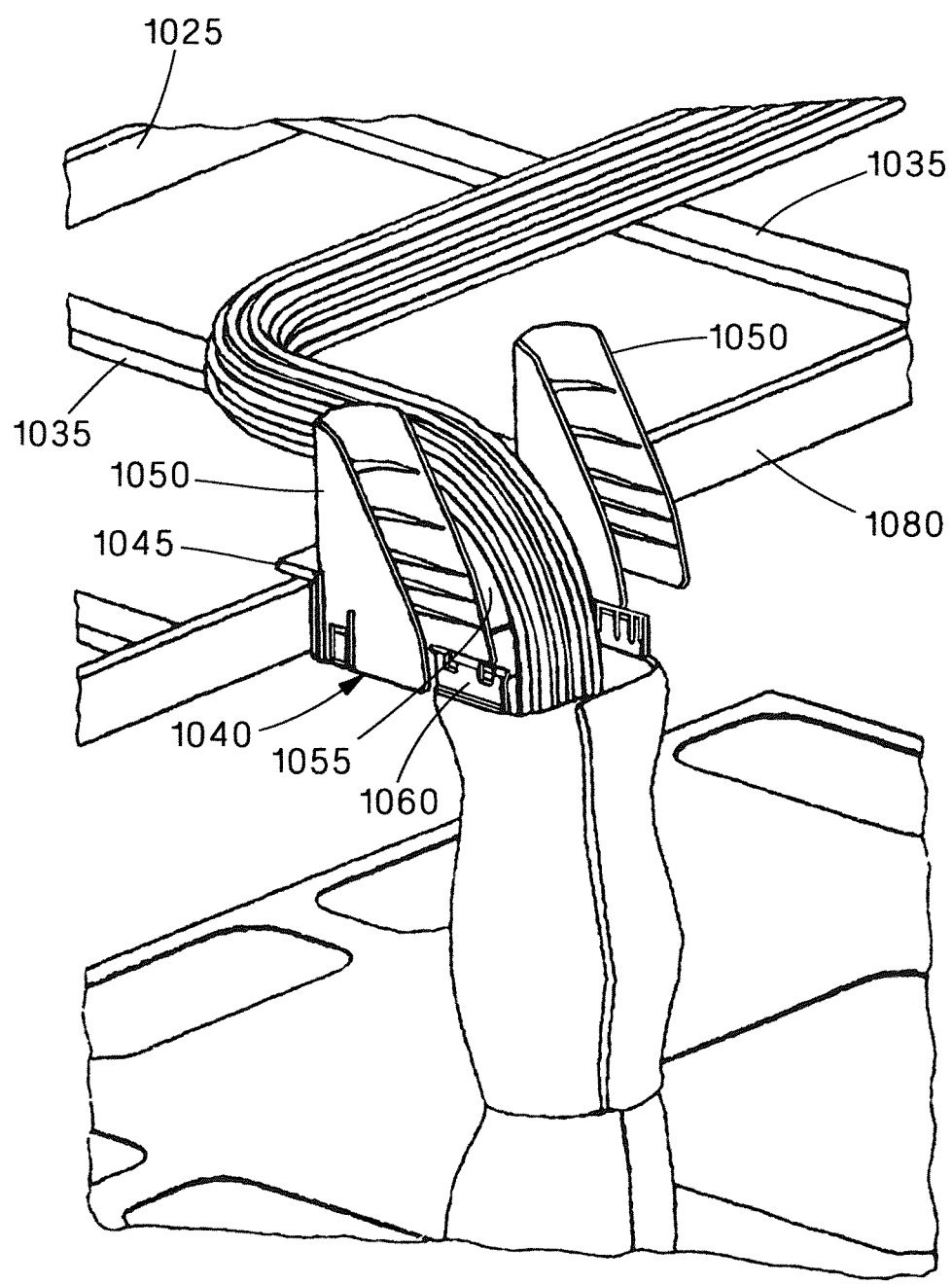
FIG. 25 is a rear perspective view of the cable drop system in accordance with another embodiment of the present invention.

Another example of a cable drop system 10 is shown in FIGS. 24 and 25. In this example, the cable drop system is shown connected to a portion of a ladder rack 1020, the ladder rack having two longitudinal support members 1025, 1030 and support rungs 1035. The cable drop system includes a cable guide assembly and sealing assembly as described above, as well as a waterfall fitting 1040. The waterfall fitting 1040 includes an attachment portion 1045 for attaching the waterfall fitting 1040 to one of the support rungs 1035 (FIG. 24) or one of the support members 1025, 1030 (FIG. 25) of the ladder rack 1020. The attachment portion 1045 may be formed integrally with the waterfall fitting 1040 or may be a separate piece attached to the waterfall fitting 1040. The attachment portion 1045 is connected to the support rung 1035 or support member 1025, 1030 via appropriate means such as screws.

The waterfall fitting 1040 also includes two wall surfaces 1050 and a bottom surface 1055. The wall surfaces 1050 and the bottom surface 1055 intersect to form an exit pathway for cables or wiring that is being run along the ladder rack 1020. The bottom surface 1055 is curved generally downward relative to the ladder rack 1020 providing a ninety degree transition to guide cable or wire in a direction that is generally downward and generally perpendicular to the ladder rack 1020. The wall surfaces 1050 are curved on a front portion thereof to provide a bend radius and a ninety degree transition for cables or wiring that are guided into the channel defined by the wall surfaces 1050 and the bottom surface 1055 from the ladder rack 1020, as seen in FIG. 25. The base of the waterfall fitting 1040 includes a connecting portion 1060 that is configured to connect to a sealing assembly or a cable guide assembly similar to the spillovers discussed above.

Figure 26:
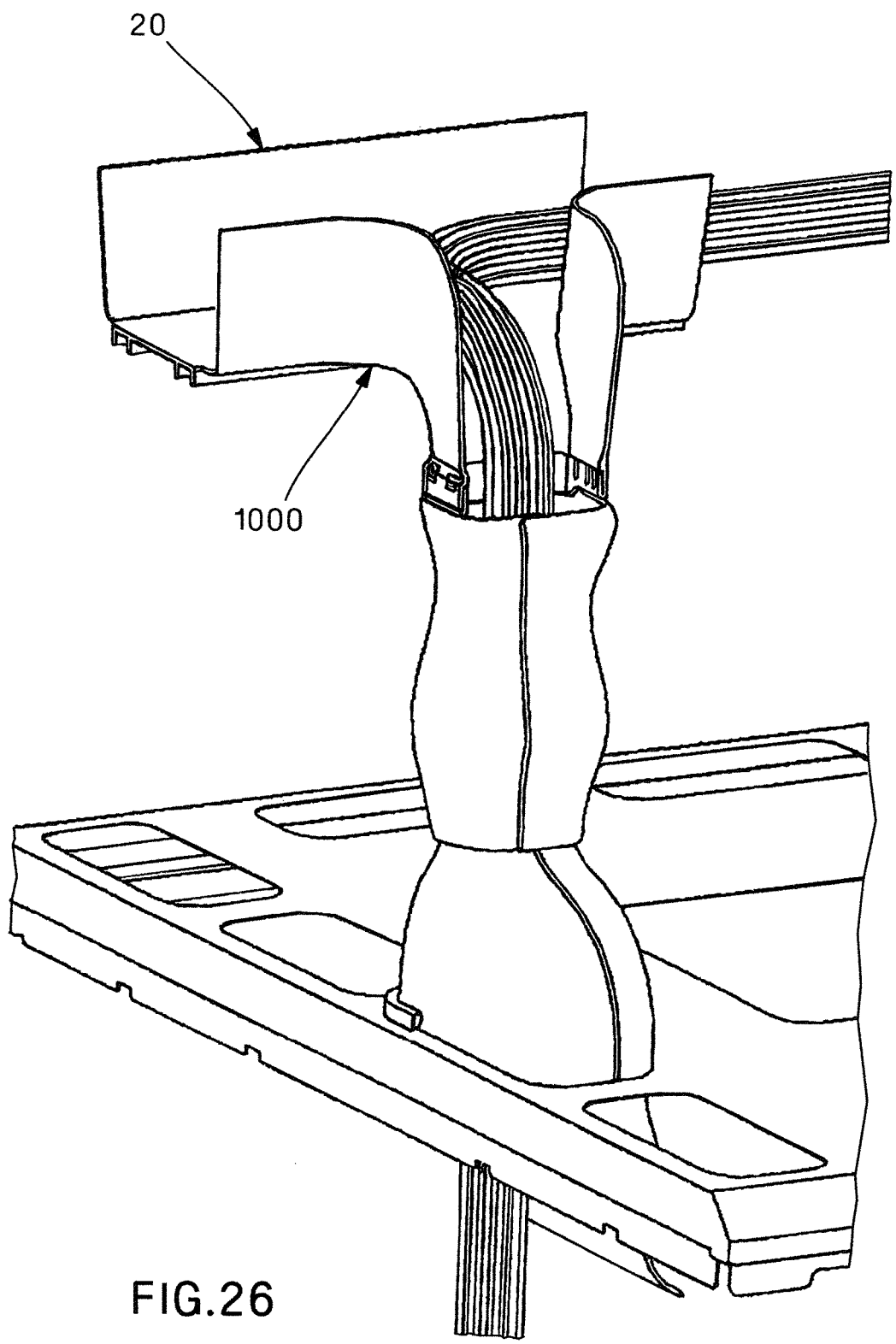
FIG. 26 is a rear perspective view of the cable drop system of FIG. 8 including a horizontal tee fitting with built-in spillout.
Figure 27:
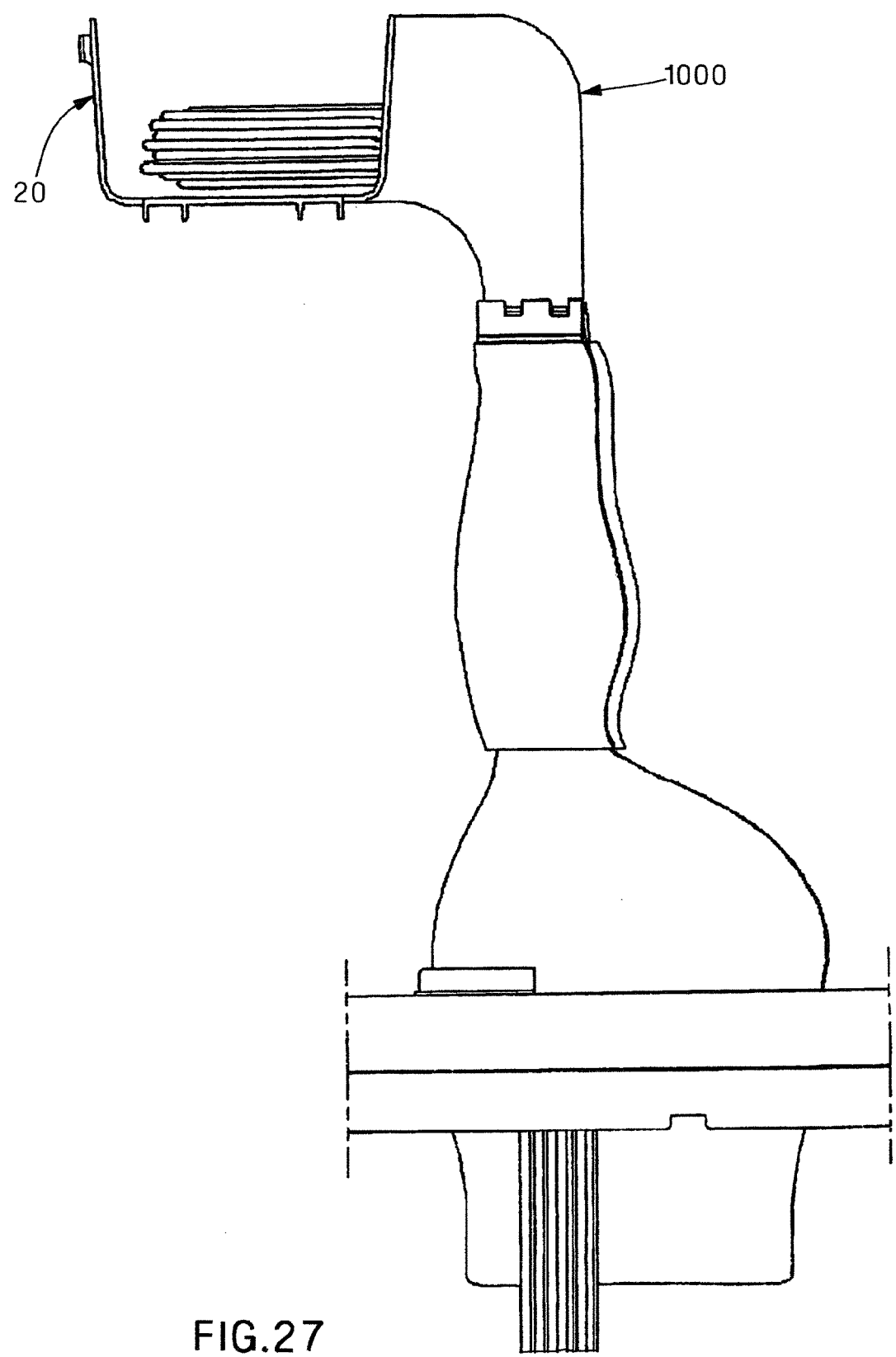
FIG. 27 is a side view of the cable drop system of FIG. 26.

The spillout 1000 can be formed integrally with the lateral trough 20 as shown in FIGS. 26 and 27, or as a separate piece that is attached to an opening in the side of the lateral trough 20.

FIGS. 28A-28F disclose another embodiment of a spillover 1100. Spillover 1100 is the same as spillover 100 except the containment members 1115 are formed separately from the spillover 1100 and connected by appropriate means. In this embodiment, the second portion 1125 has a snap feature 1135 (see FIG. 28C) that engages the snap arm 1140 (see FIG. 28D) to secure the second portion 1125 to the first portion 1120. The snap arm 1140 flexes to allow installation, and the first portion 1120 and the second portion 1125 are keyed to prevent rotation.

Figure 28A:
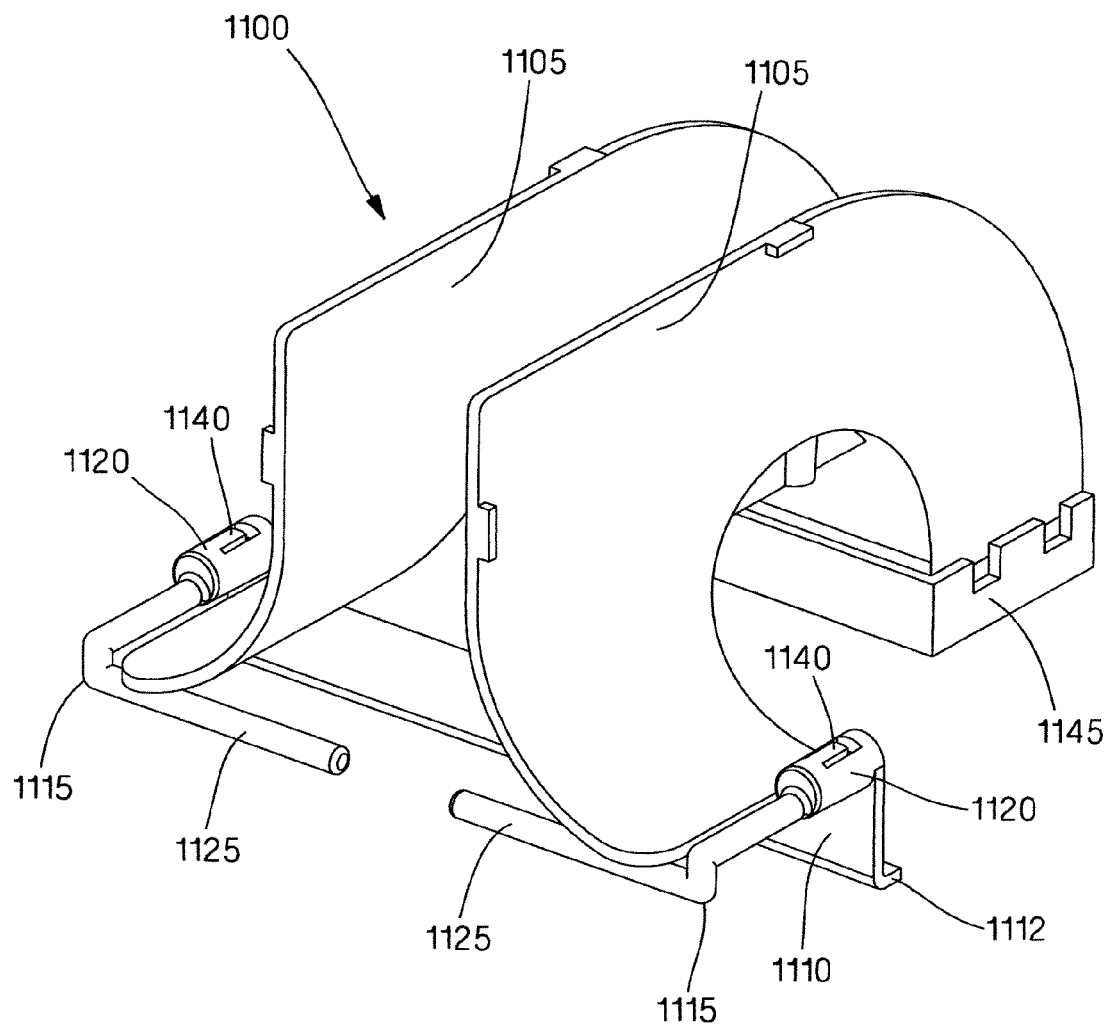
FIG. 28A is a front perspective view of another alternate embodiment of a spillover in accordance with the present invention.
Figure 28B:
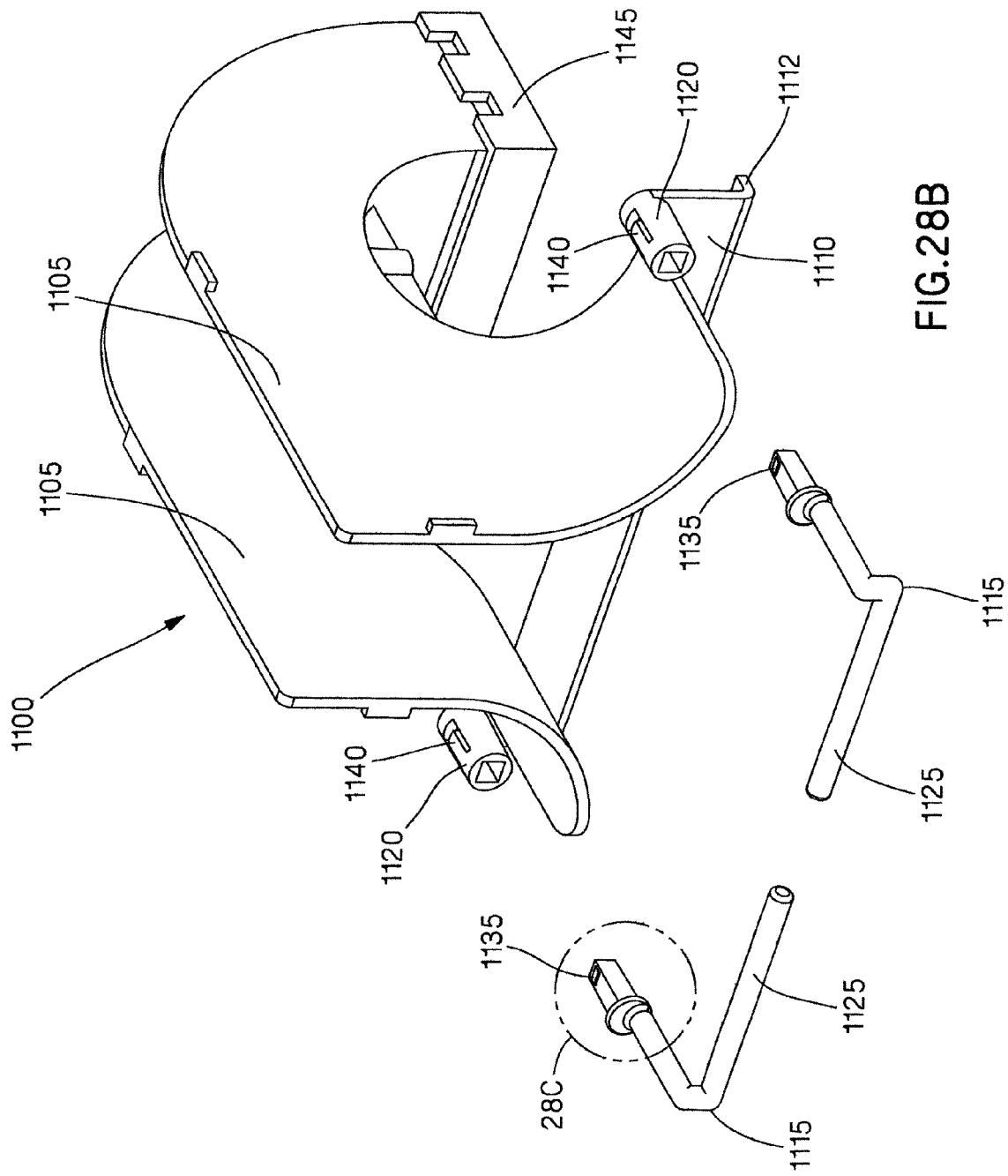
FIG. 28B is an exploded perspective view of the spillover of FIG. 28A.
Figure 28C:
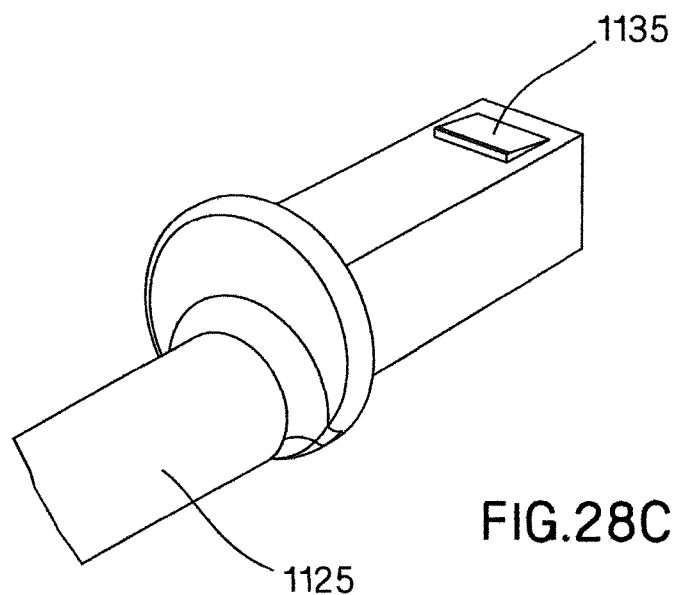
FIG. 28C is an enlarged perspective view of a portion of the spillover of FIG. 28B.
Figure 28D:
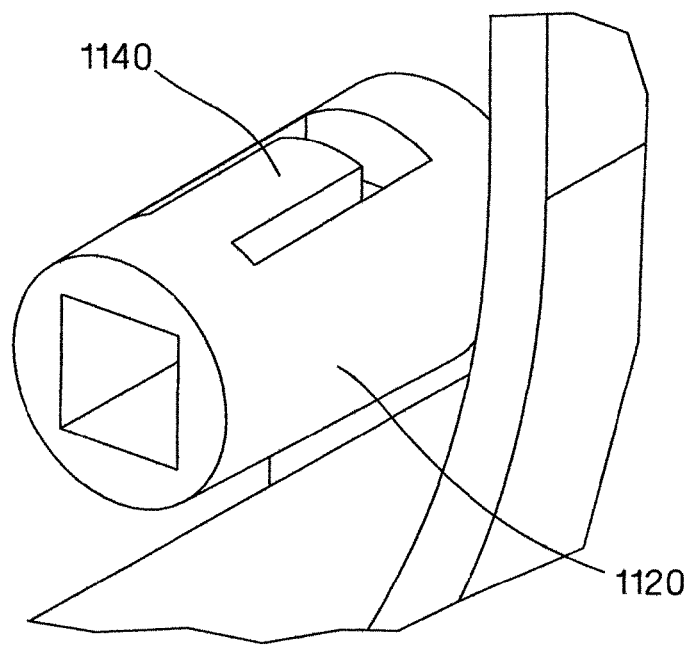
FIG. 28D is an enlarged perspective view of a portion of the spillover of FIG. 28B.
Figure 28E:
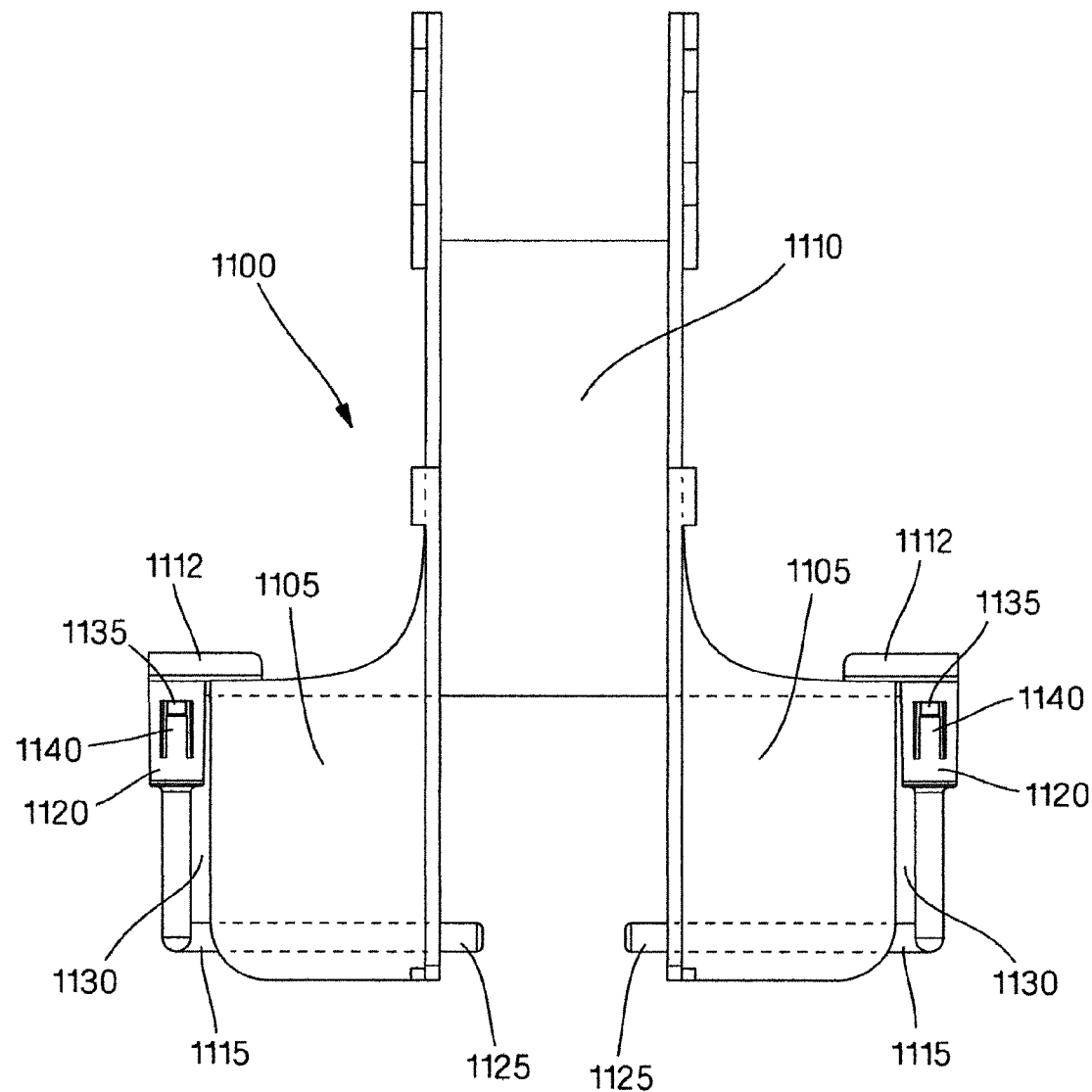
FIG. 28E is a top plan view of the spillover of FIG. 28A.
Figure 28F:
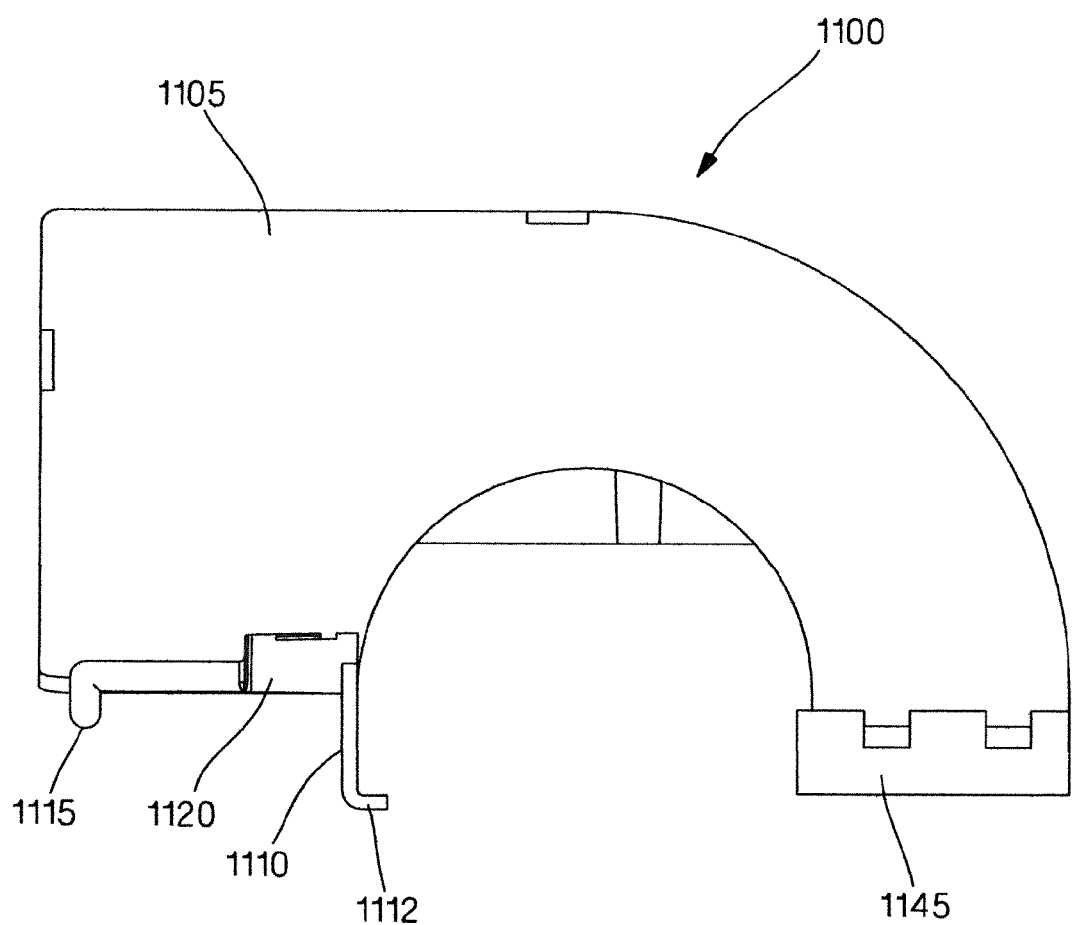
FIG. 28F is a side elevational view of the spillover of FIG. 28A.

As shown in FIGS. 28A, 28B and 28F, the spillover 1100 also includes integrated coupling features on the exit channel. In this embodiment, spillover 1100 includes a connecting portion 1145 identical to second connecting portion 525 of second curved fitting 507. Thus, spillover 1100 can be directly attached to upper sleeve 602, without requiring cable guide assembly 500.

Figure 29:
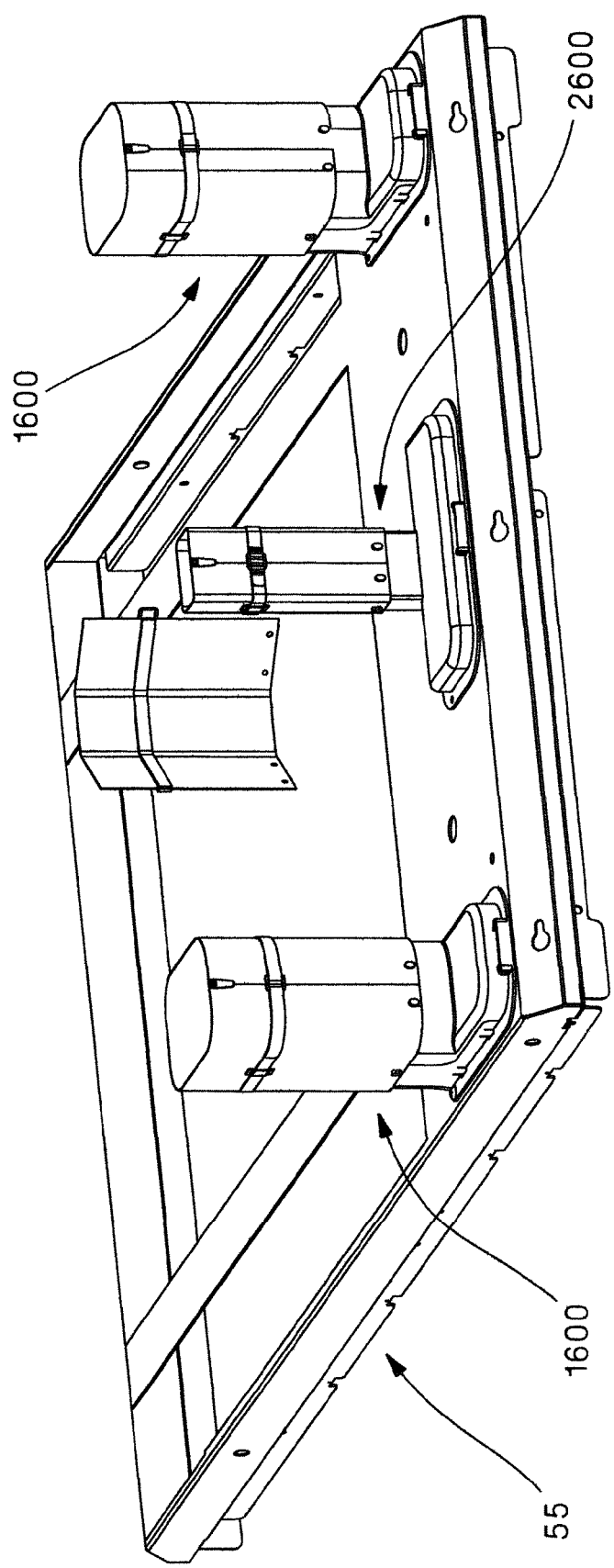
FIG. 29 is a front perspective view of an alternate embodiment of portions of two sealing assemblies in accordance with the present invention, shown after being connected to the network cabinet.
Figure 30:
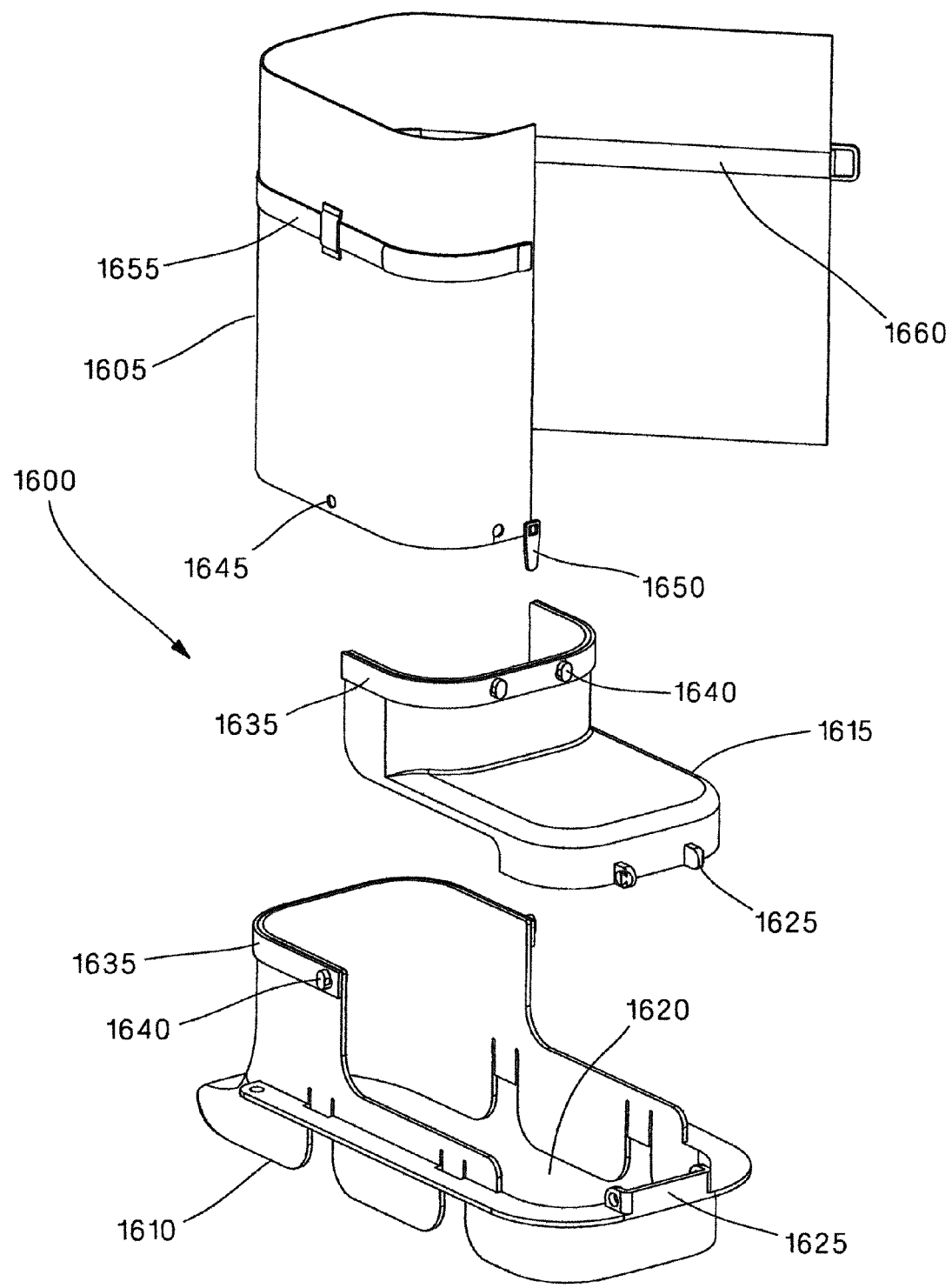
FIG. 30 is an exploded view of the portion of one of the sealing assemblies of FIG. 29.

FIGS. 29-40 illustrate alternate embodiments of the sealing assembly. Specifically, FIGS. 30-35 illustrate a sealing assembly 1600 installed to facilitate routing of copper cabling into the network cabinet 55 while preventing any airflow out of the cabinet openings, and FIGS. 36-40 illustrate a sealing assembly 2600 installed to facilitate routing of fiber optic cabling into the network cabinet 55 while preventing any airflow out of the cabinet openings. FIG. 29 shows the sealing assembly 1600 installed in the corner openings at the top of the network cabinet 55, and the sealing assembly 2600 installed in the center opening at the top of the network cabinet 55.

Figure 31:
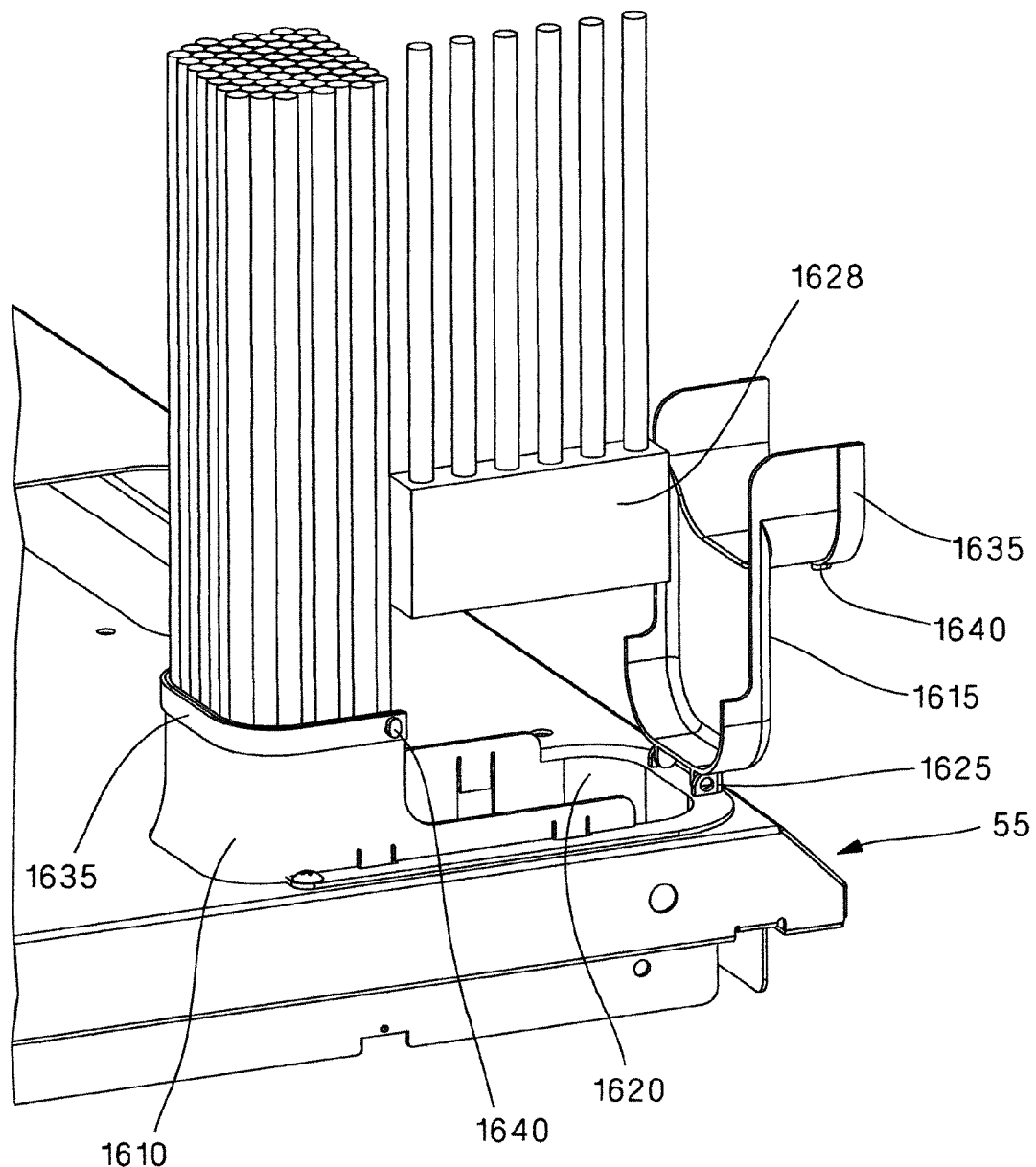
FIG. 31 is a side perspective view of the portion of the sealing assembly of FIG. 30, shown with a base cover hinged in the open position.
Figure 32:
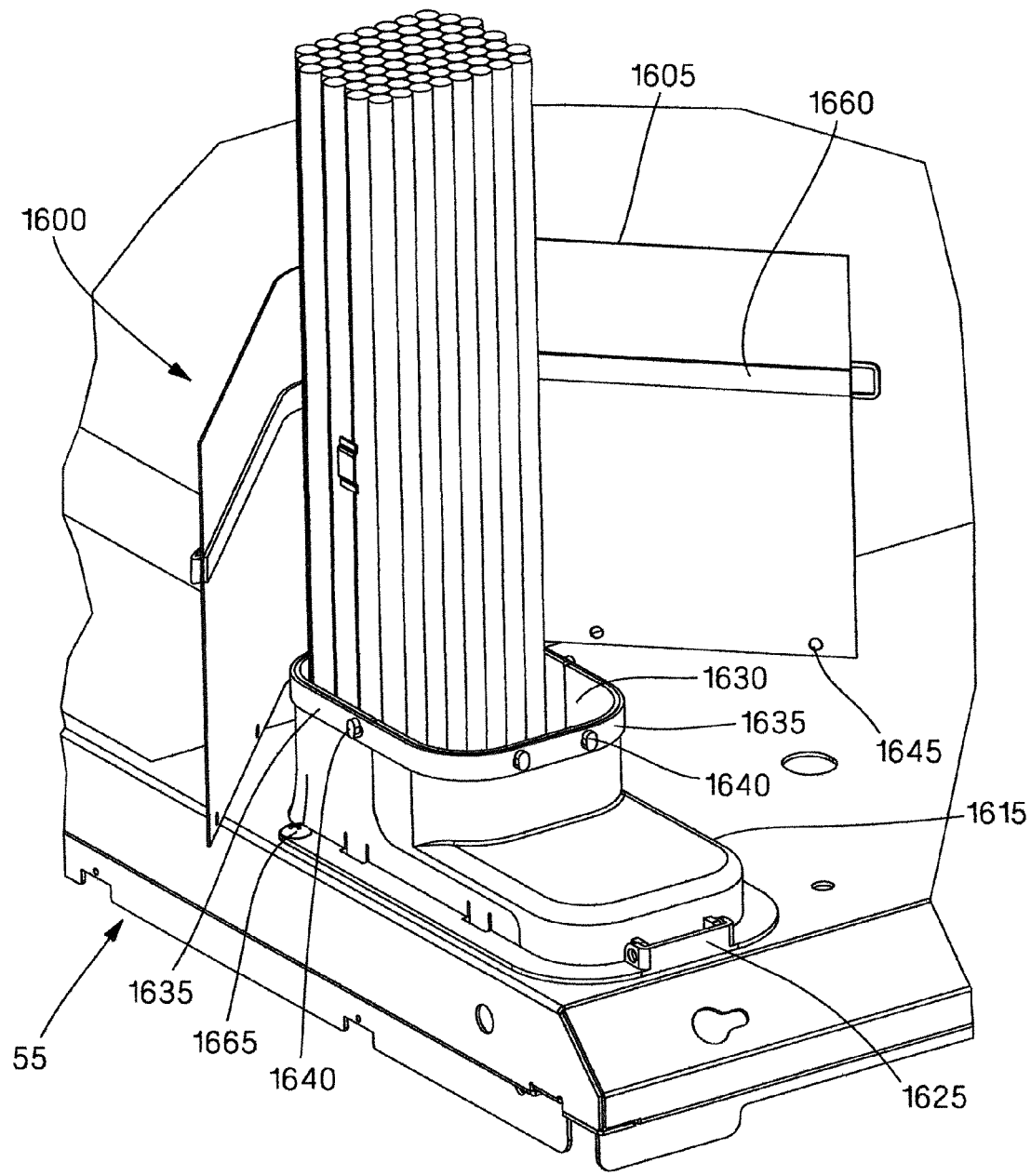
FIG. 32 is a front perspective view of the portion of the sealing assembly of FIG. 30, shown during installation on the network cabinet.
Figure 33:
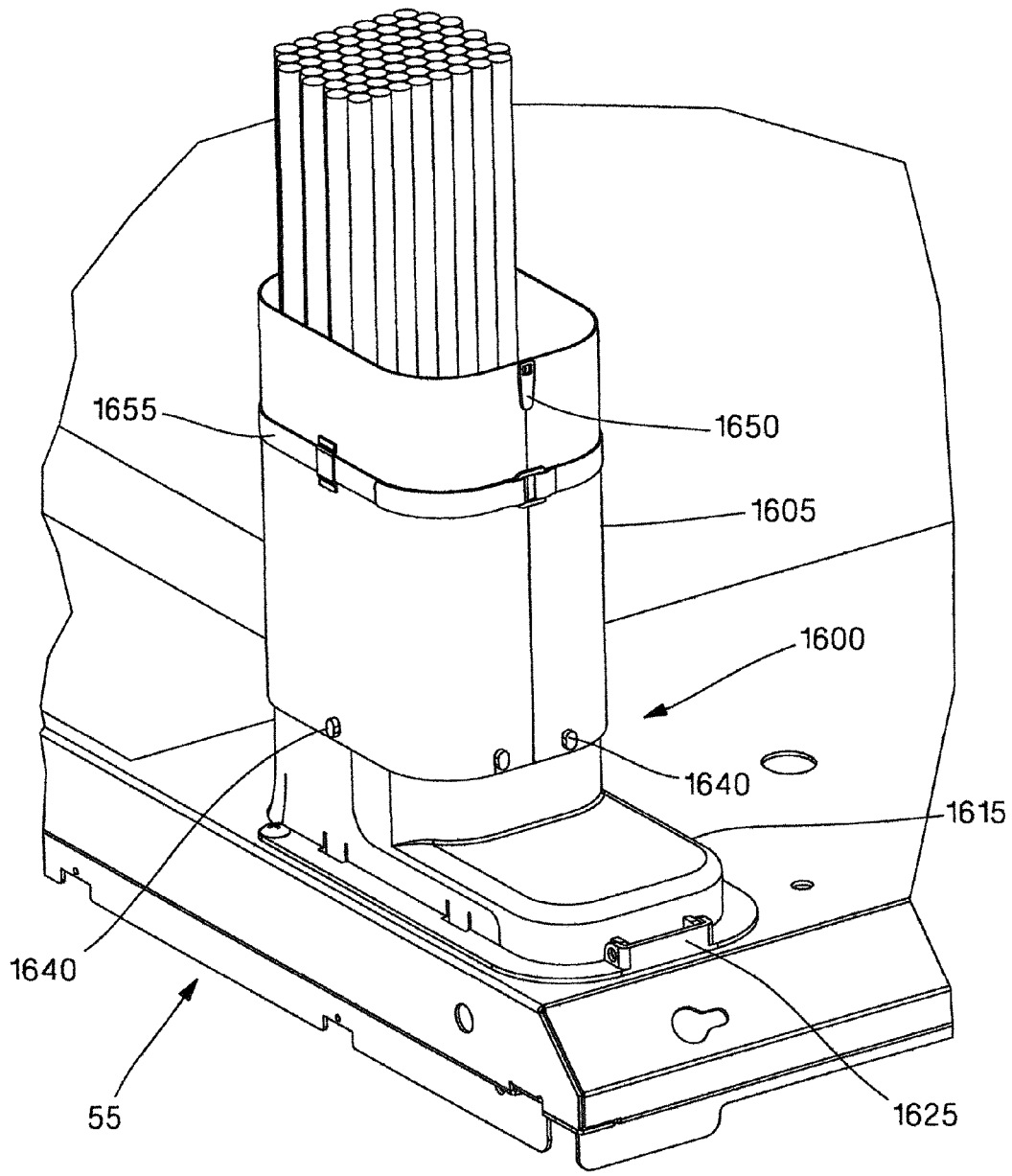
FIG. 33 is a front perspective view of the portion of the sealing assembly of FIG. 30, shown after installation on the network cabinet.

As can be seen from FIGS. 30-35, the sealing assembly 1600 has a base 1610, a cover 1615 and a lower sleeve 1605. Sealing assembly 1600 is mounted to the top of the network cabinet 55 and is secured around cable or wiring passing through the assembly 1600 and an opening in a top surface of the network cabinet 55. Base includes an opening 1620 that provides access to the full size of the network cabinet corner openings for passing items, such as cables or cassettes, therethrough. Cover 1615 is connected to the front of base 1610 by a hinge 1625 that allows cover 1615 to rotate from a closed to an open position, as shown in FIG. 31. When cover is in the open position, a copper cassette 1628 can be passed through the opening 1620 and into the network cabinet 55 without disturbing adjacent cabling. When cover 1615 is in the closed position as shown in FIG. 33, the top of the base 1610 and the cover 1615 form a smaller opening 1630 that more closely conforms to the cables entering the network cabinet 55. The top of the base 1610 and cover 1615 includes foam 1635 and mounting studs 1640. Lower sleeve 1605 is permanently attached to the back side of base 1610 using an appropriate method, such as adhesives, heat staking, welding or the mechanical means disclosed in Ser. No. 11/751,716. Lower sleeve 1605 can be releasably attached to the sides of base 1610 and the front of cover 1615 by engaging the grommet holes 1645 with the mounting studs 1640.

In the open position shown in FIG. 32, lower sleeve 1605 allows additional access to cabling. To allow access to the cables when the sealing assembly is fully assembled, the front and sides of lower sleeve 1605 can be removed from mounting studs 1640 in base 1610 and cover 1615.

FIG. 33 shows the sealing assembly 1600 assembled with lower sleeve 1605 secured to the mounting studs 1640 on base 1610 and cover 1615, which compresses the foam 1635 to create an airtight seal along the perimeter of the top of the base 1610 and cover 1615. Zipper 1650 has been engaged and pulled up to close lower sleeve 1605 around the cables. Finally, cinch tie 1655 can now be pulled to further close lower sleeve 1605 around the cables with the foam 1660 shown in FIG. 32 disposed on the inside of lower sleeve 1605 creating an airtight seal.

Figure 34:
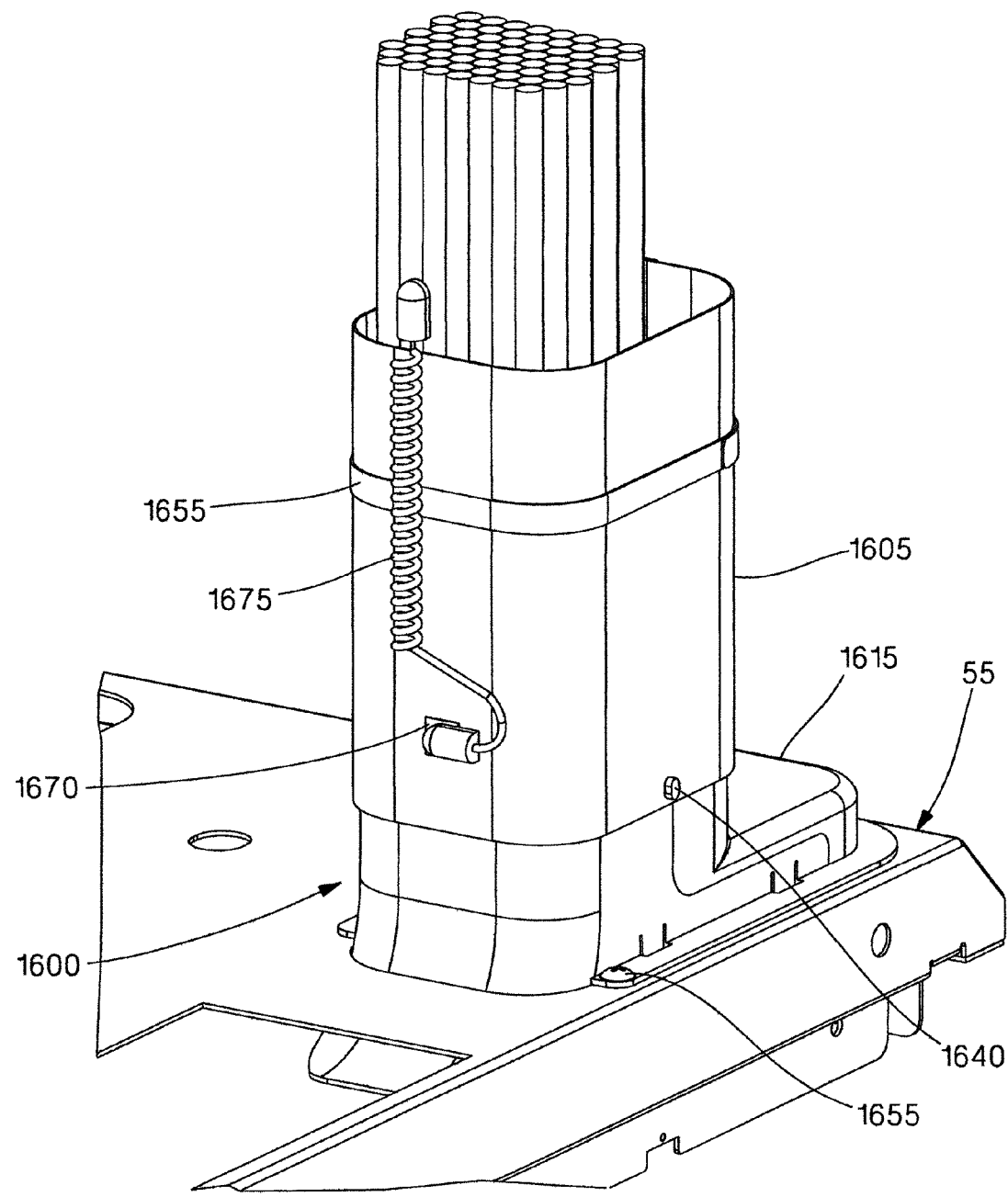
FIG. 34 is a rear perspective view of the portion of the sealing assembly of FIG. 30, shown after installation on the network cabinet.
Figure 35:
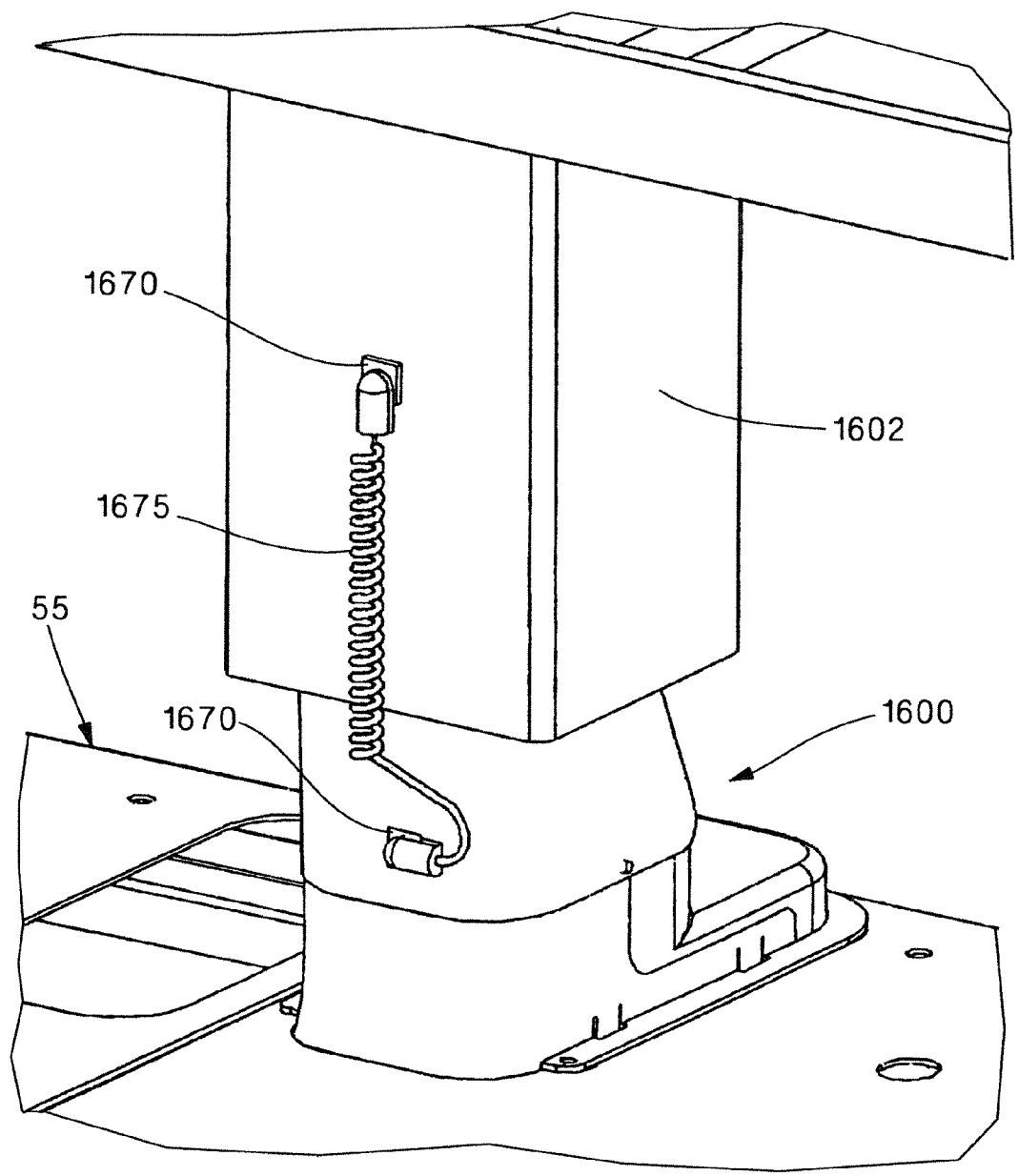
FIG. 35 is a rear perspective view of the portion of the sealing assembly of FIG. 34, including an upper sleeve.

As shown in FIG. 34, base 1610 is bonded to the network cabinet 55 using a grounding screw 1655. The sealing assembly 1600 may also be used with a hanging upper sleeve 1602 that drapes over the lower sleeve 1605 of sealing assembly 1600, as shown in FIG. 35. The sealing assembly 1600 and the upper sleeve materials are static dissipative. Lower sleeve 1605 and upper sleeve 1602 each include snaps 1670, which can be connected to each other with bonding wire 1675 to provide a ground path to dissipate any accumulated charge in lower sleeve 1605 and upper sleeve 1602 due to triboelectric effect.

FIGS. 36-40 disclose the sealing assembly 2600 installed to facilitate routing of fiber optic cabling into the network cabinet 55. The sealing assembly 2600 is mounted to the top of the network cabinet 55 and secured around cable or wiring passing through the sealing assembly 2600 and an opening in a top surface of the network cabinet 55.

Figure 36:
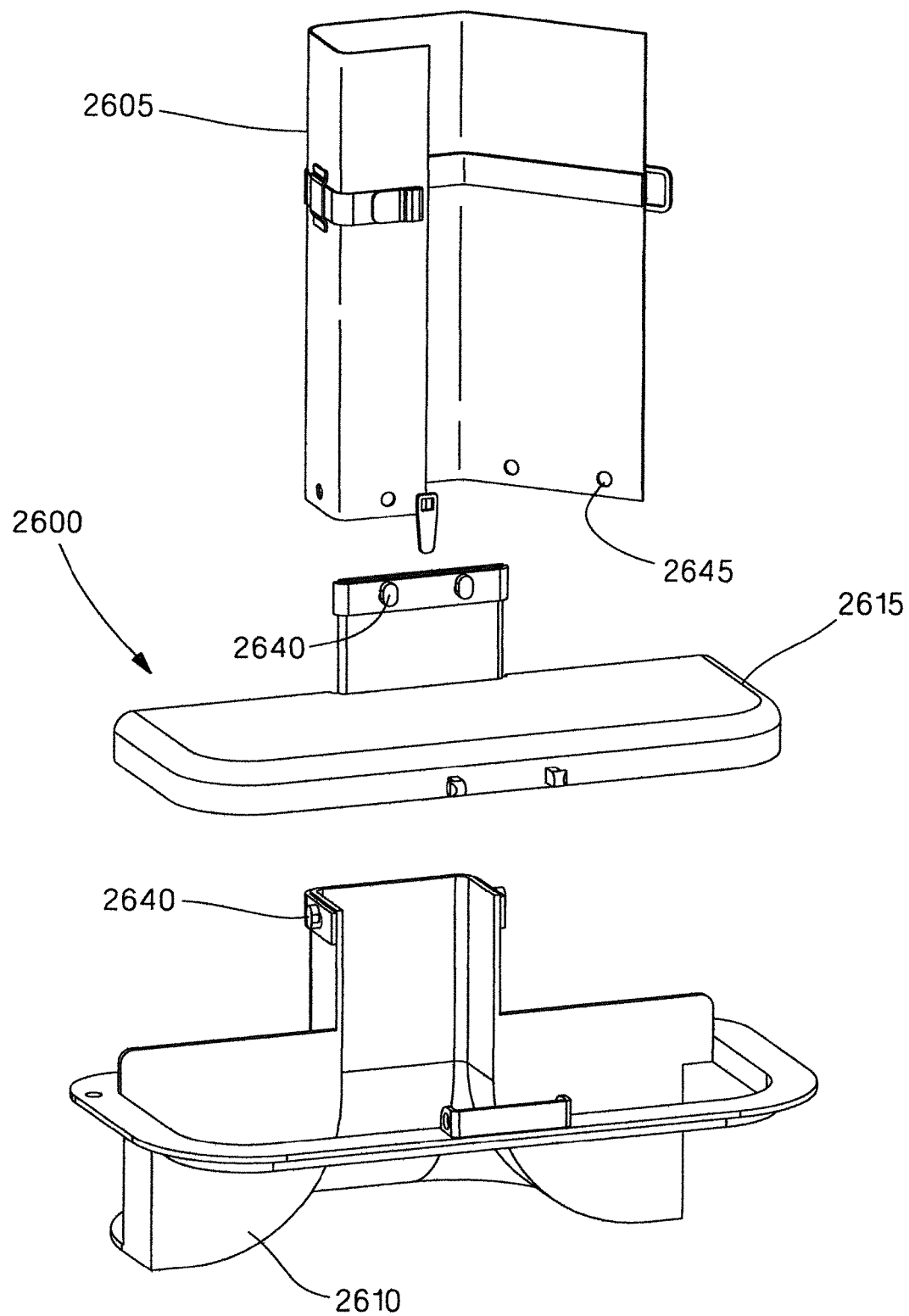
FIG. 36 is an exploded view of a portion of the other sealing assembly of FIG. 29.
Figure 37:
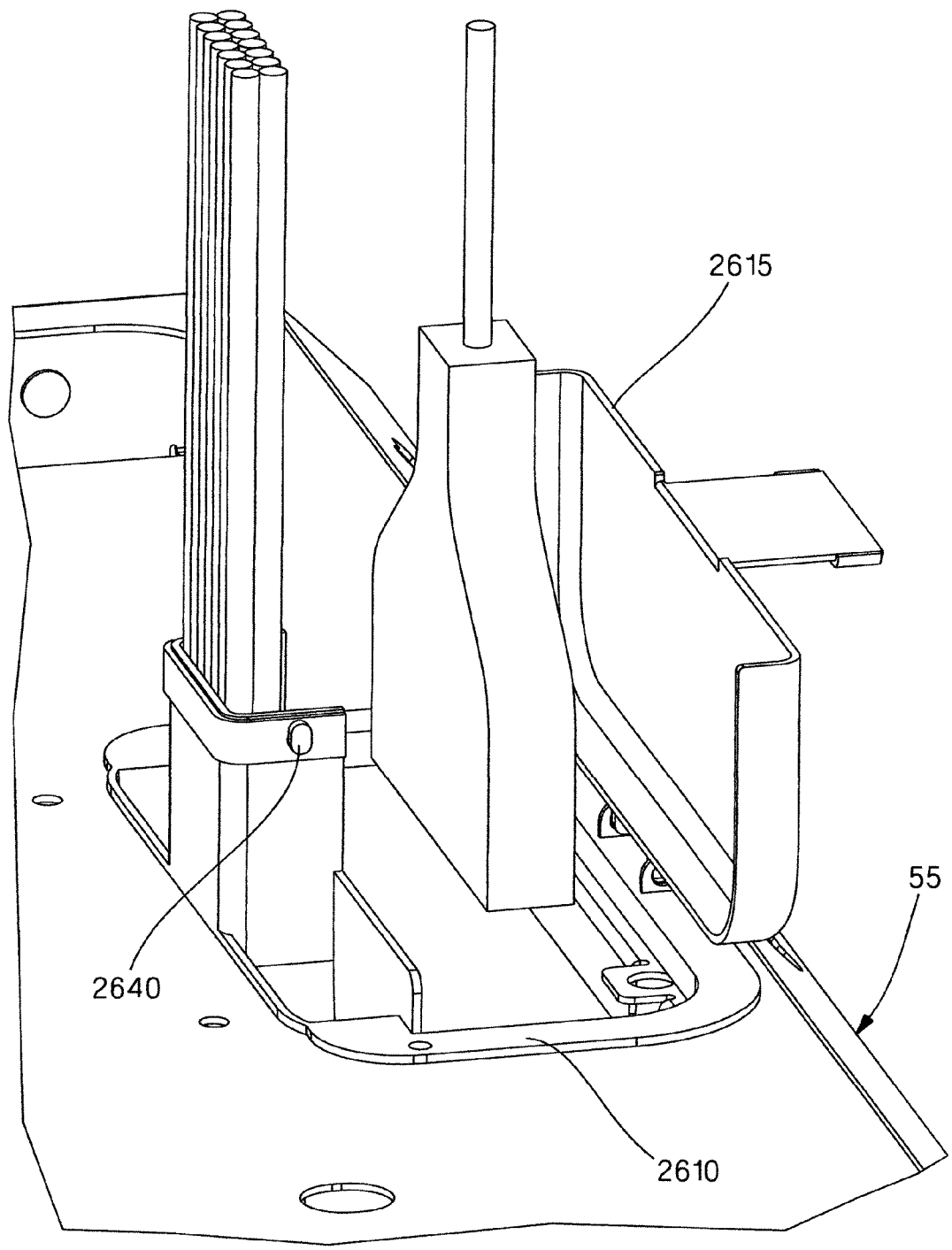
FIG. 37 is a side perspective view of the portion of the sealing assembly of FIG. 36, shown with a base cover hinged in the open position.
Figure 38:
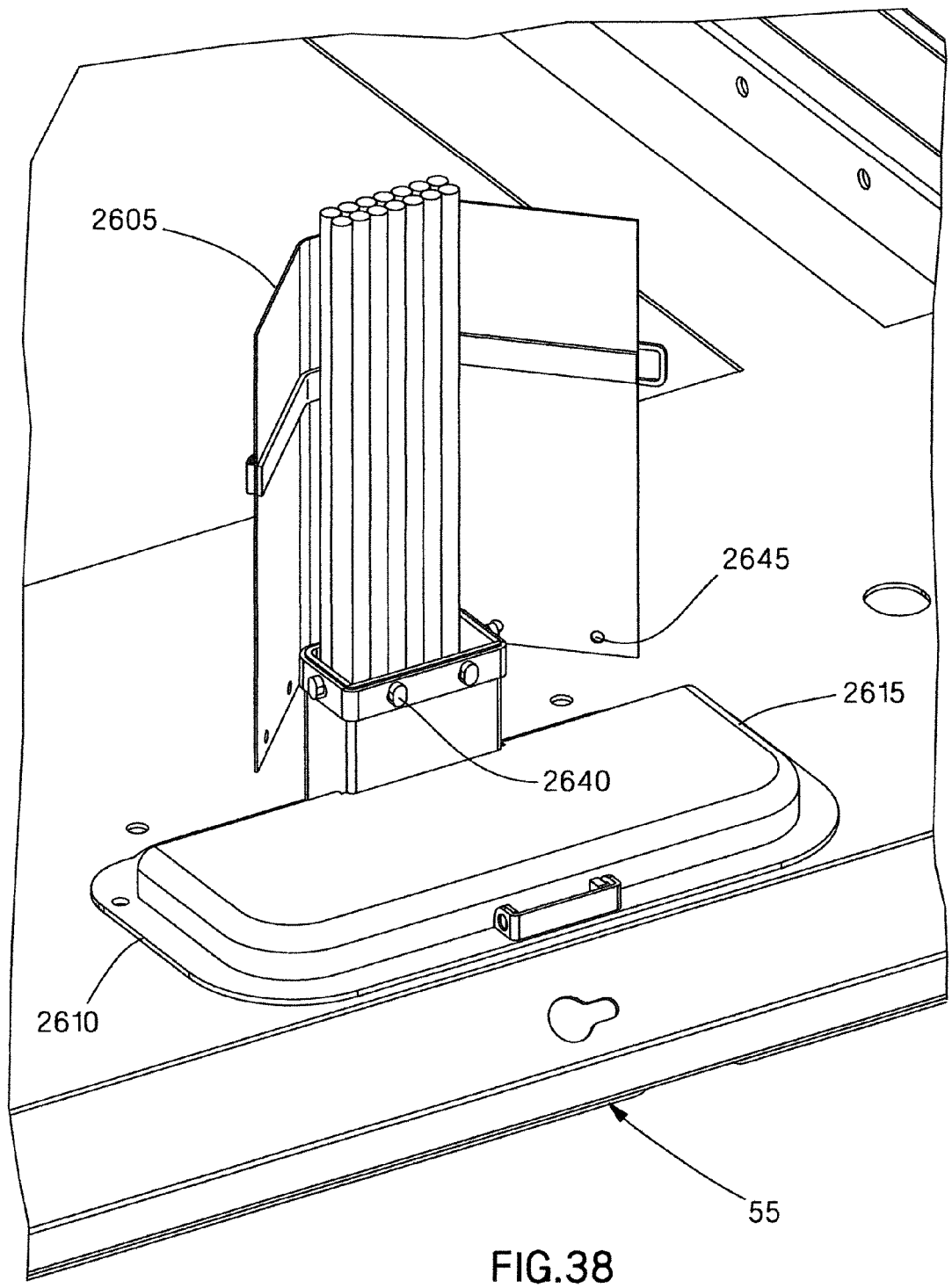
FIG. 38 is a front perspective view of the portion of the sealing assembly of FIG. 36, shown during installation on the network cabinet.
Figure 39:
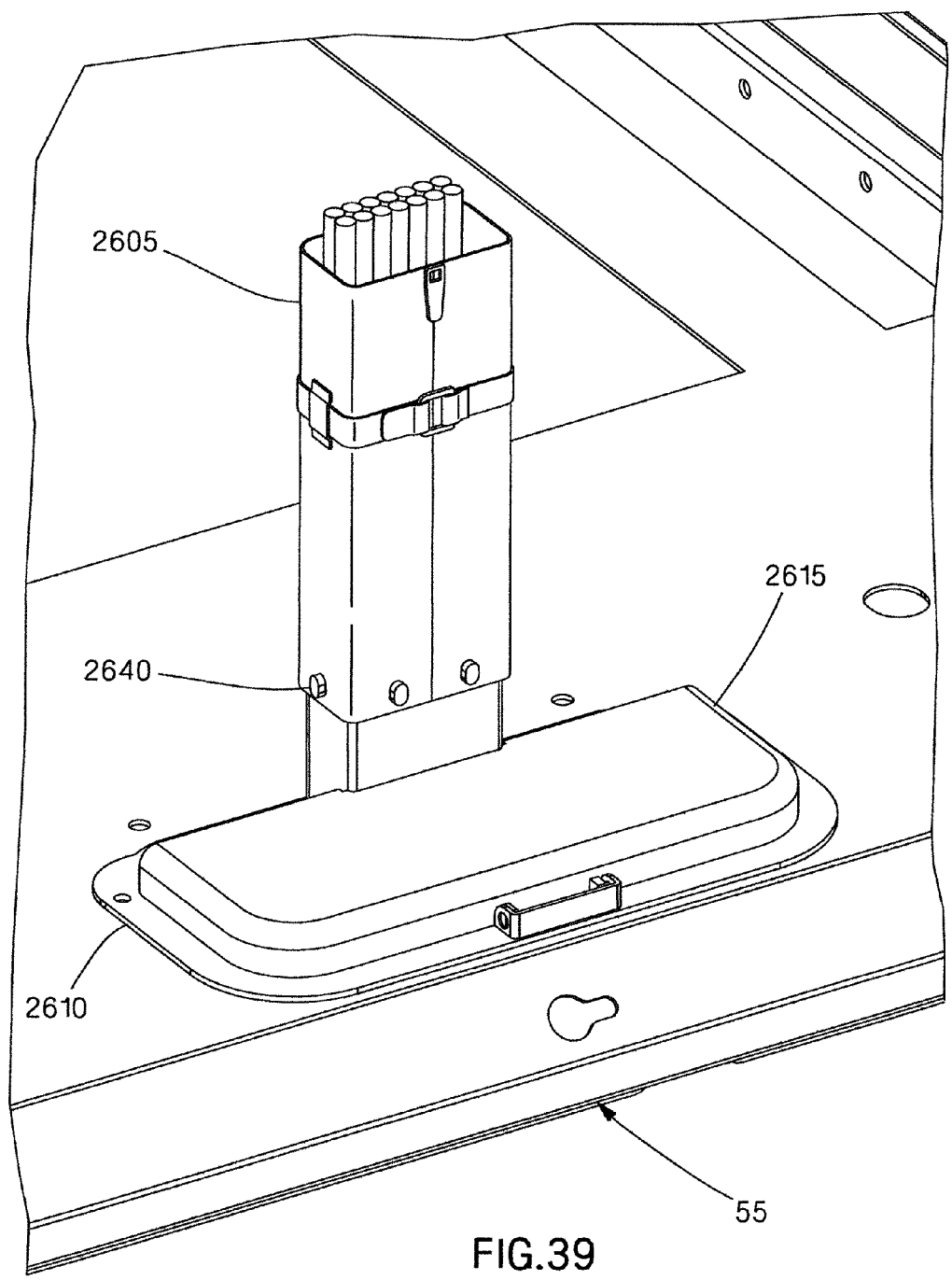
FIG. 39 is a front perspective view of the portion of the sealing assembly of FIG. 36, shown after installation on the network cabinet.
Figure 40:
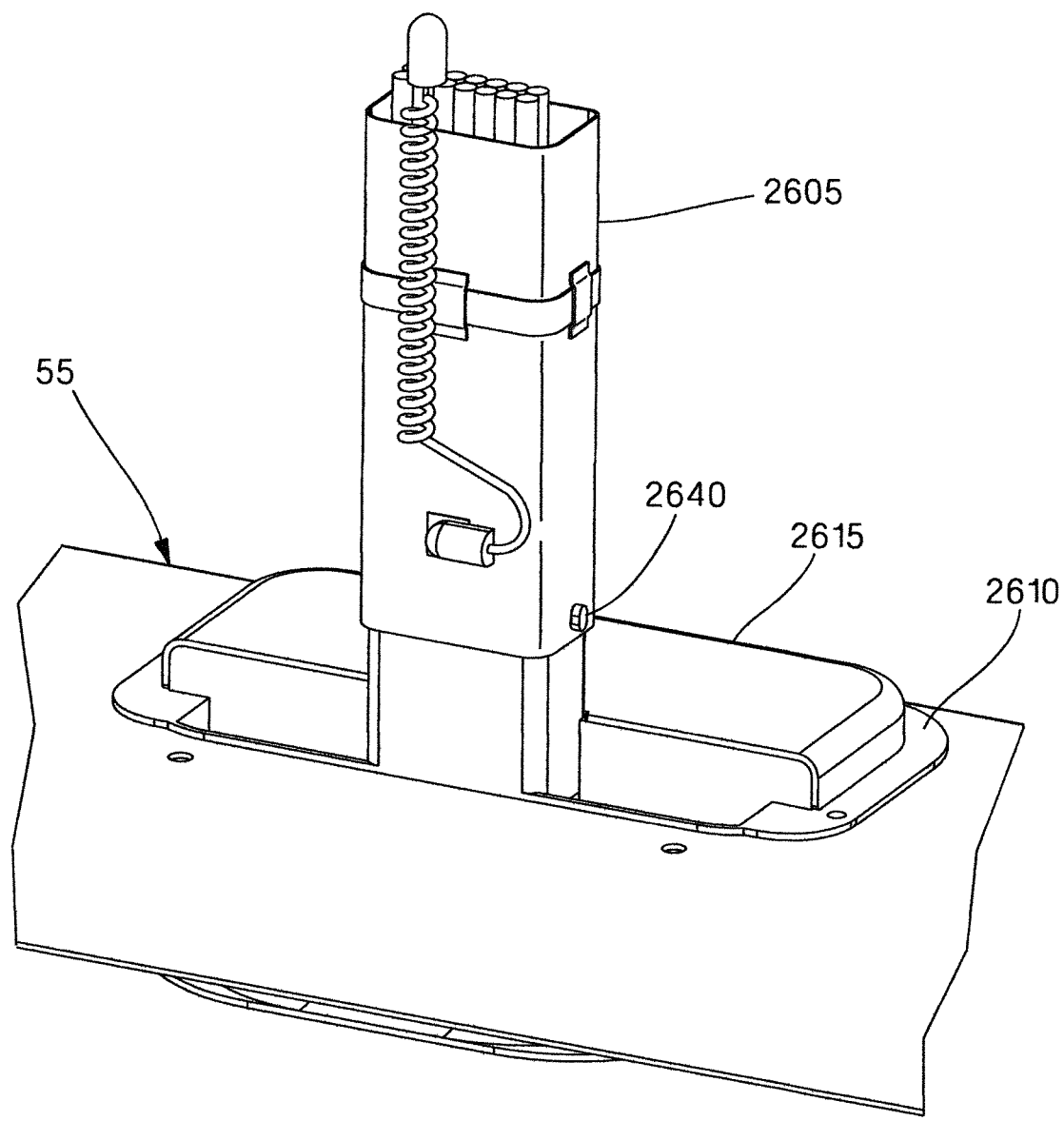
FIG. 40 is a rear perspective view of the portion of the sealing assembly of FIG. 36, shown after installation on the network cabinet.
Figure 41:
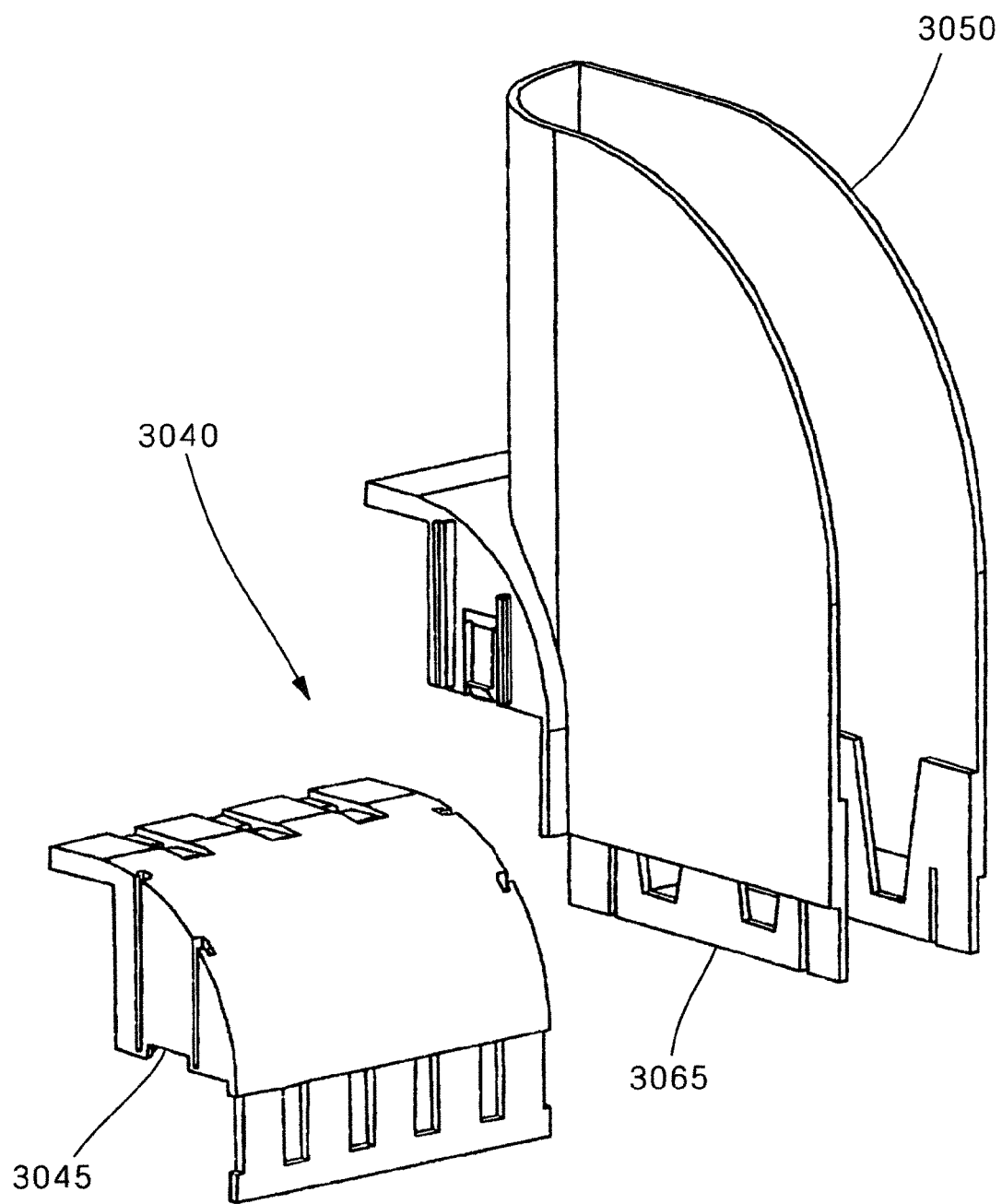
FIG. 41 is an exploded view of an alternate embodiment of a waterfall fitting in accordance with the present invention.
Figure 42:
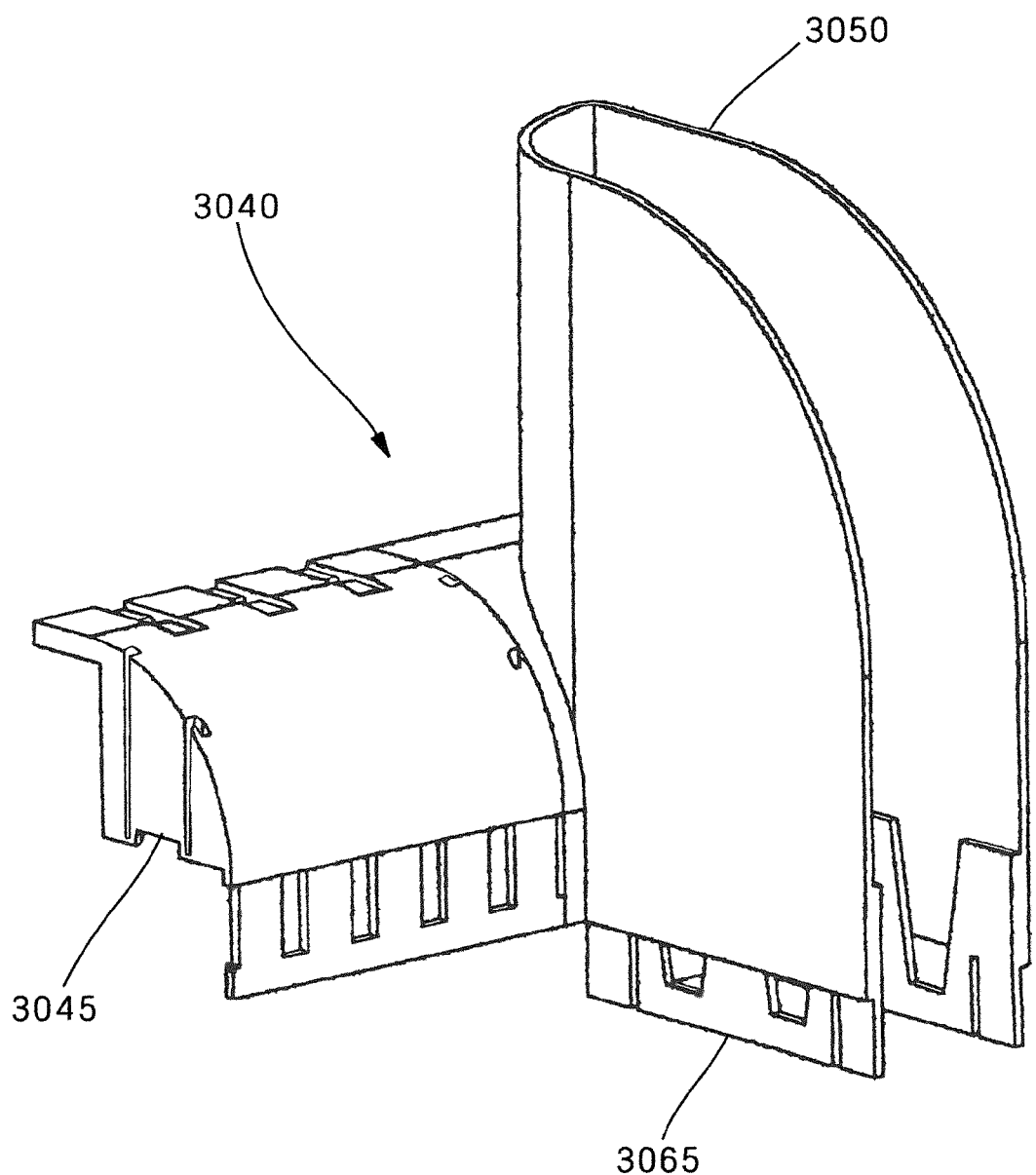
FIG. 42 is a perspective view of the waterfall fitting of FIG. 41, shown after the wing is connected to the base.

As best seen in FIG. 36, the sealing assembly 2600 has a base 2610, a cover 2615 and a sleeve 2605. The sizes and configurations of the base 2610, cover 2615 and sleeve 2605 have changed to correspond with the size of the center opening of the network cabinet 55. Although the location of the grommet holes 2645 on lower sleeve 2605 and the mounting studs 2640 on base 2610 and cover 2615 are different, sealing assembly 2600 functions substantially the same as sealing assembly 1600 shown in FIGS. 30-35.

FIGS. 41-54 illustrate an alternate embodiment of waterfall fitting 3040 and upper sleeve 3602. Waterfall fitting 3040 is similar to waterfall fitting 1040 shown in FIG. 24, except waterfall fitting 3040 has a 2" bend radius on the base 3045 and wing 3050 (instead of a 1" bend radius) and latching features for mating with upper sleeve 3602. Waterfall fitting 3040, in combination with other components of the cable drop system, provides full coverage of the cabling, allows more tolerance in aligning the cable drop with the cable entry opening in the network cabinet 55, and provides sealing of the cable entry opening to prevent loss of cooling air.

Figure 43:
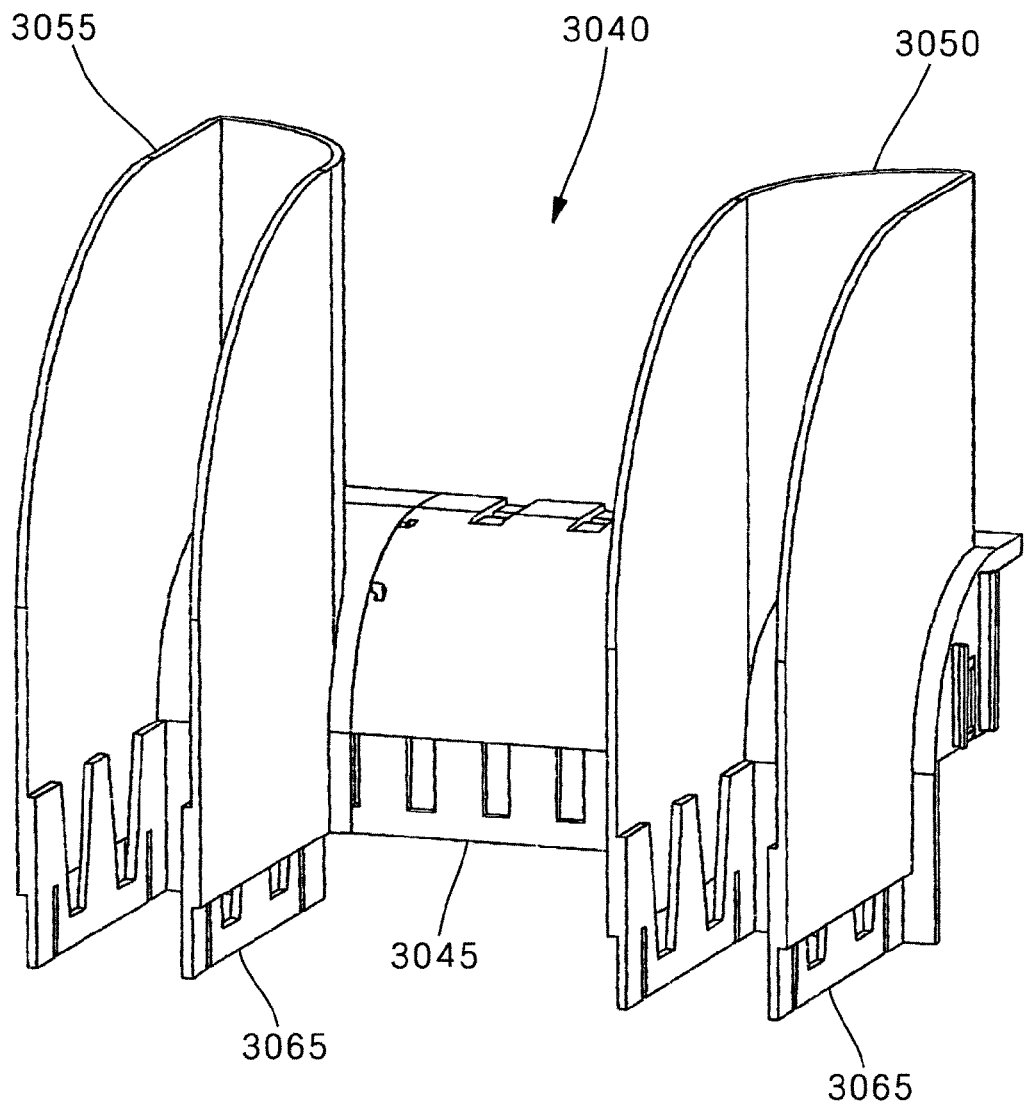
FIG. 43 is a perspective view of the waterfall fitting of FIG. 41, shown having two wings connected to the base.
Figure 44:
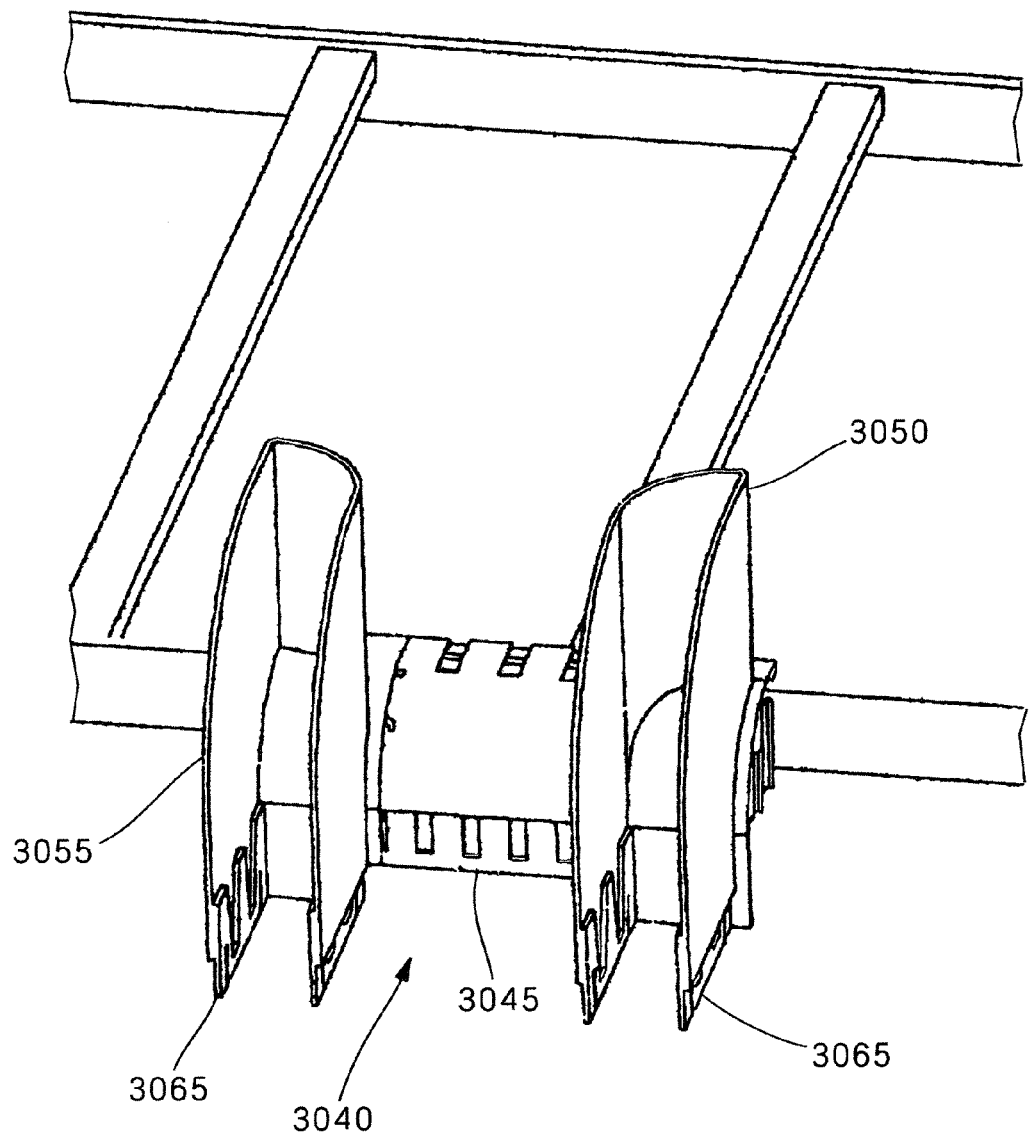
FIG. 44 is a perspective view of the waterfall fitting of FIG. 43, shown after being connected to a ladder rack.
Figure 45:
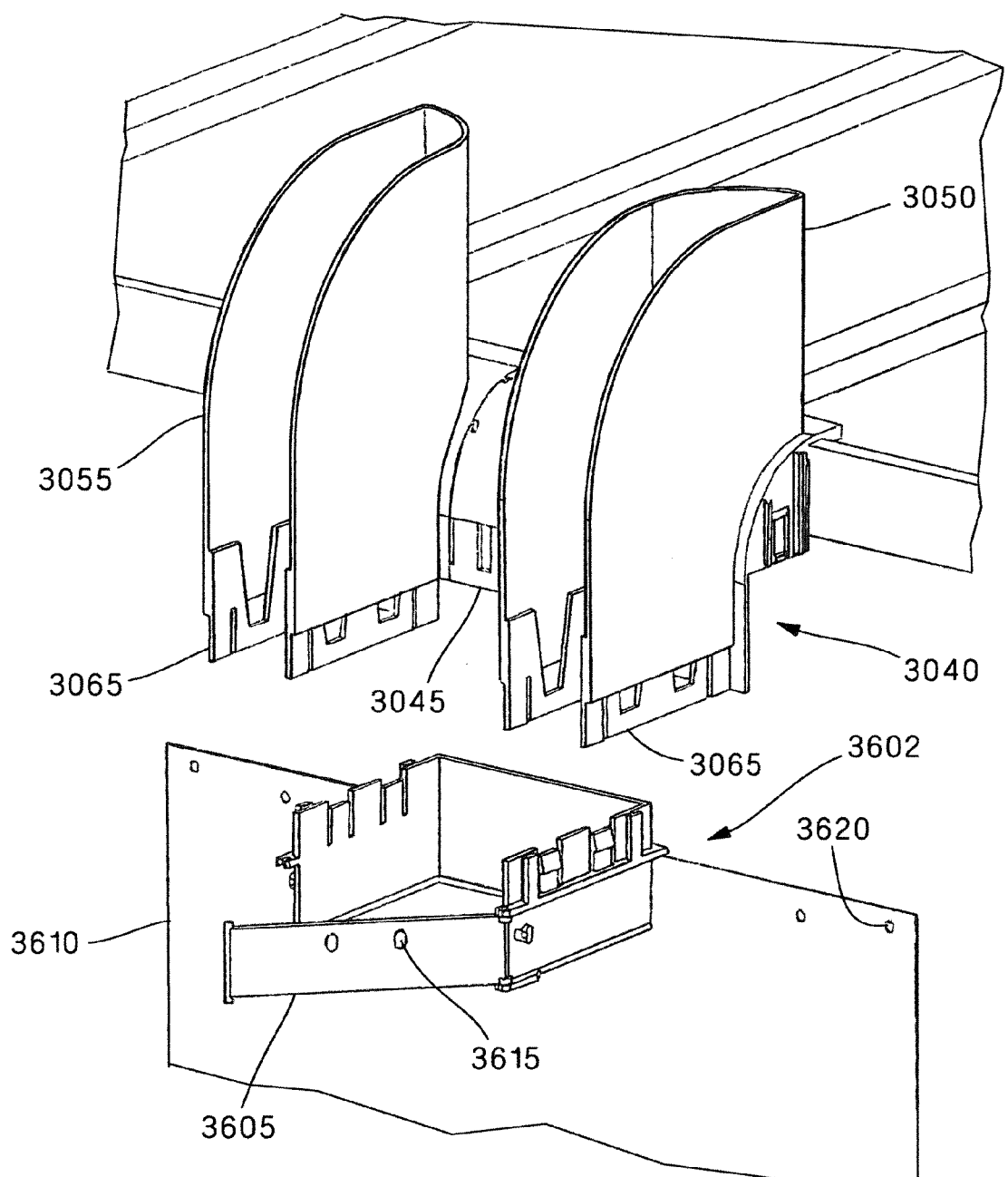
FIG. 45 is a perspective view of the waterfall fitting of FIG. 44, shown before being connected to a portion of a sealing assembly.
Figure 46:
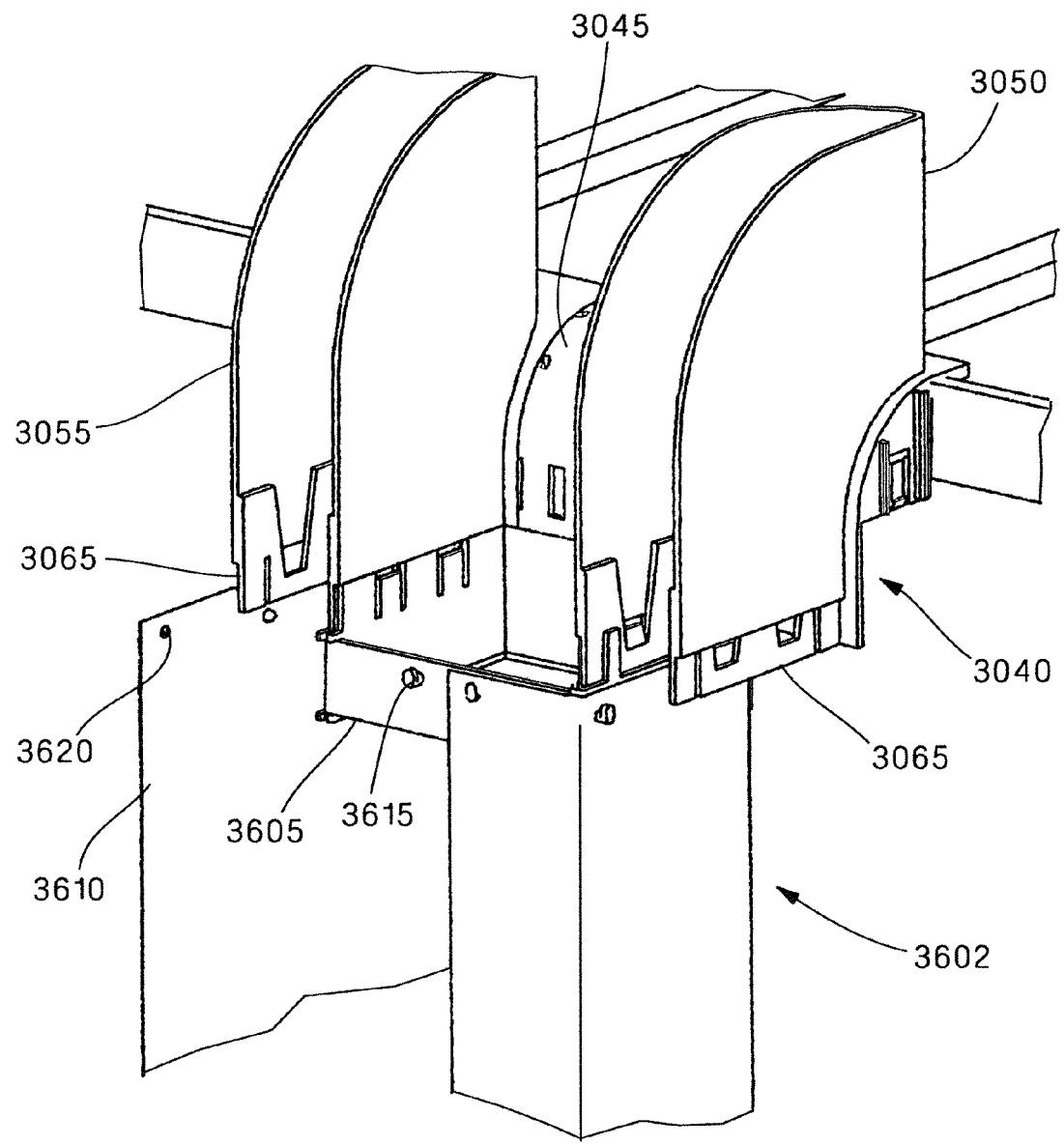
FIG. 46 is a perspective view of the waterfall fitting of FIG. 44, shown being connected to the portion of the sealing assembly.
Figure 53:
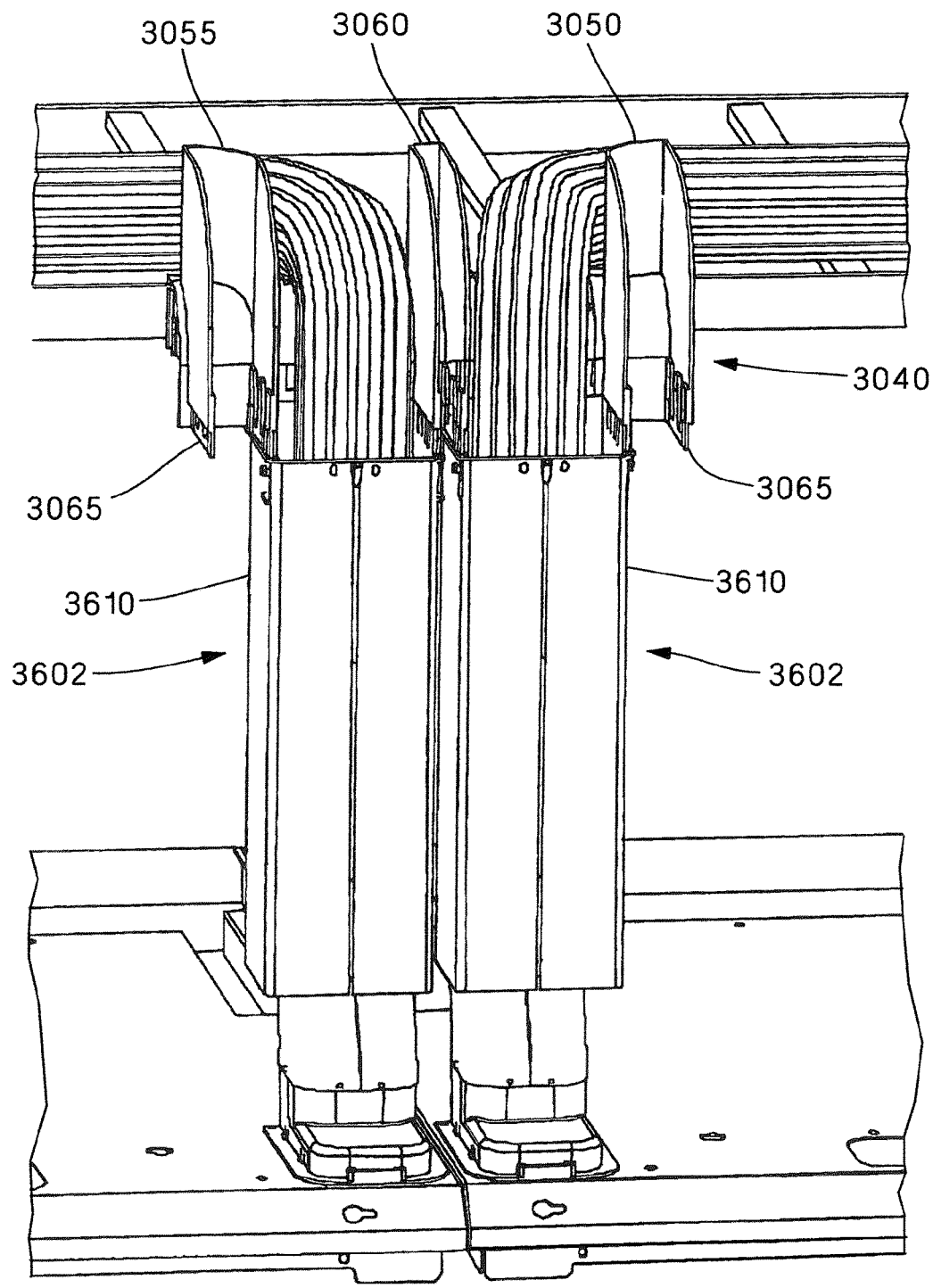
FIG. 53 is a perspective view of the waterfall fitting of FIG. 52, shown with a divider wall for positioning an adjacent waterfall fitting above an adjacent network cabinet opening.

Base 3045 of waterfall fitting 3040 controls bend radius for the vertical turn of the cables, and wing 3050 controls bend radius for the horizontal turn of the cables. The wing may be a right wing 3050 or a left wing 3055 as shown in FIGS. 43 and 44, or a center divider wall 3060 as shown in FIG. 53. The wings can be assembled to the left, center or right side of base 3045 to create unique assemblies for various applications. Thus, waterfall fitting 3040 may provide bend radius control for cables entering from either direction (right or left).

Figure 47:
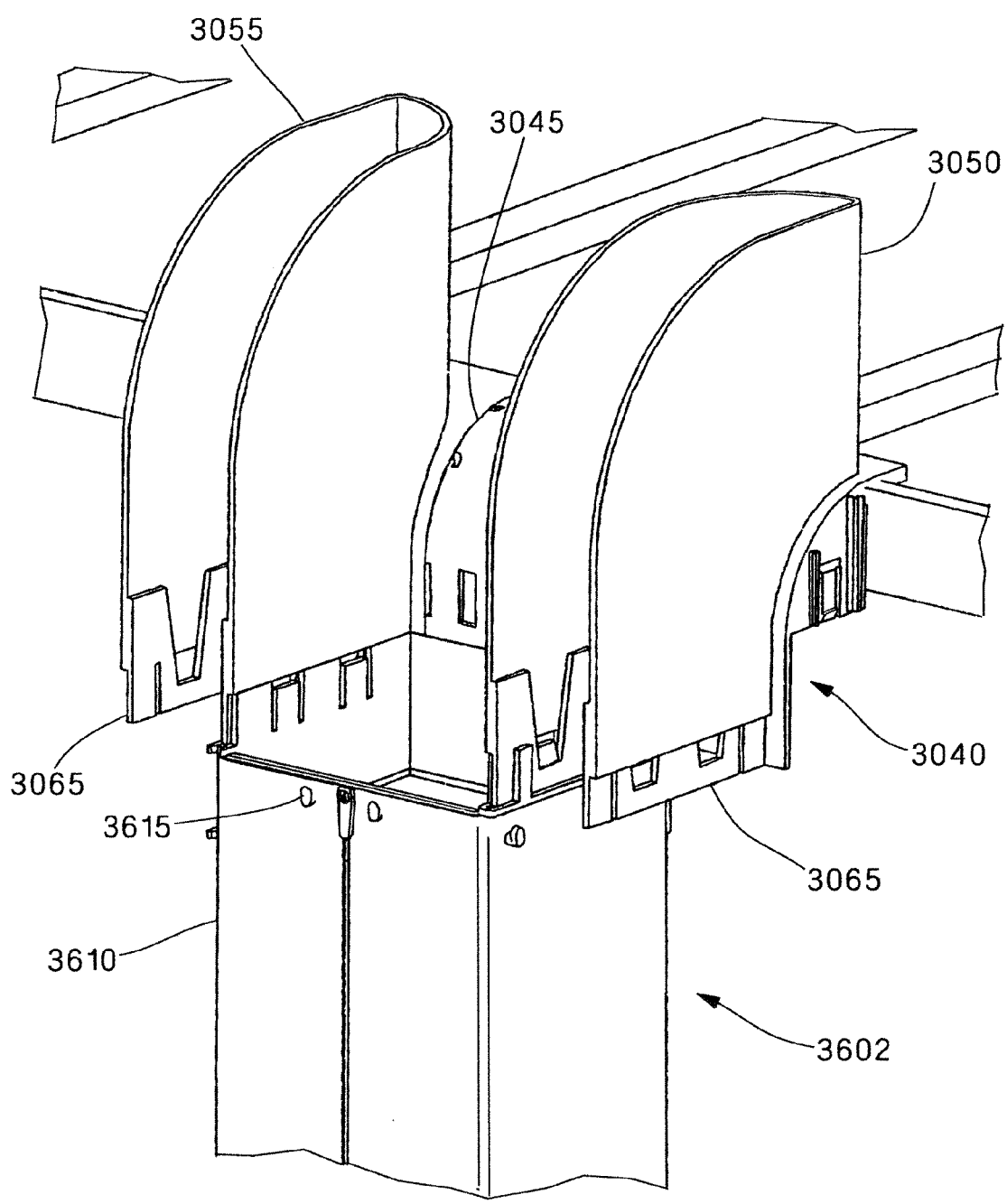
FIG. 47 is a perspective view of the waterfall fitting of FIG. 44, shown after being connected to the portion of the sealing assembly.
Figure 48:
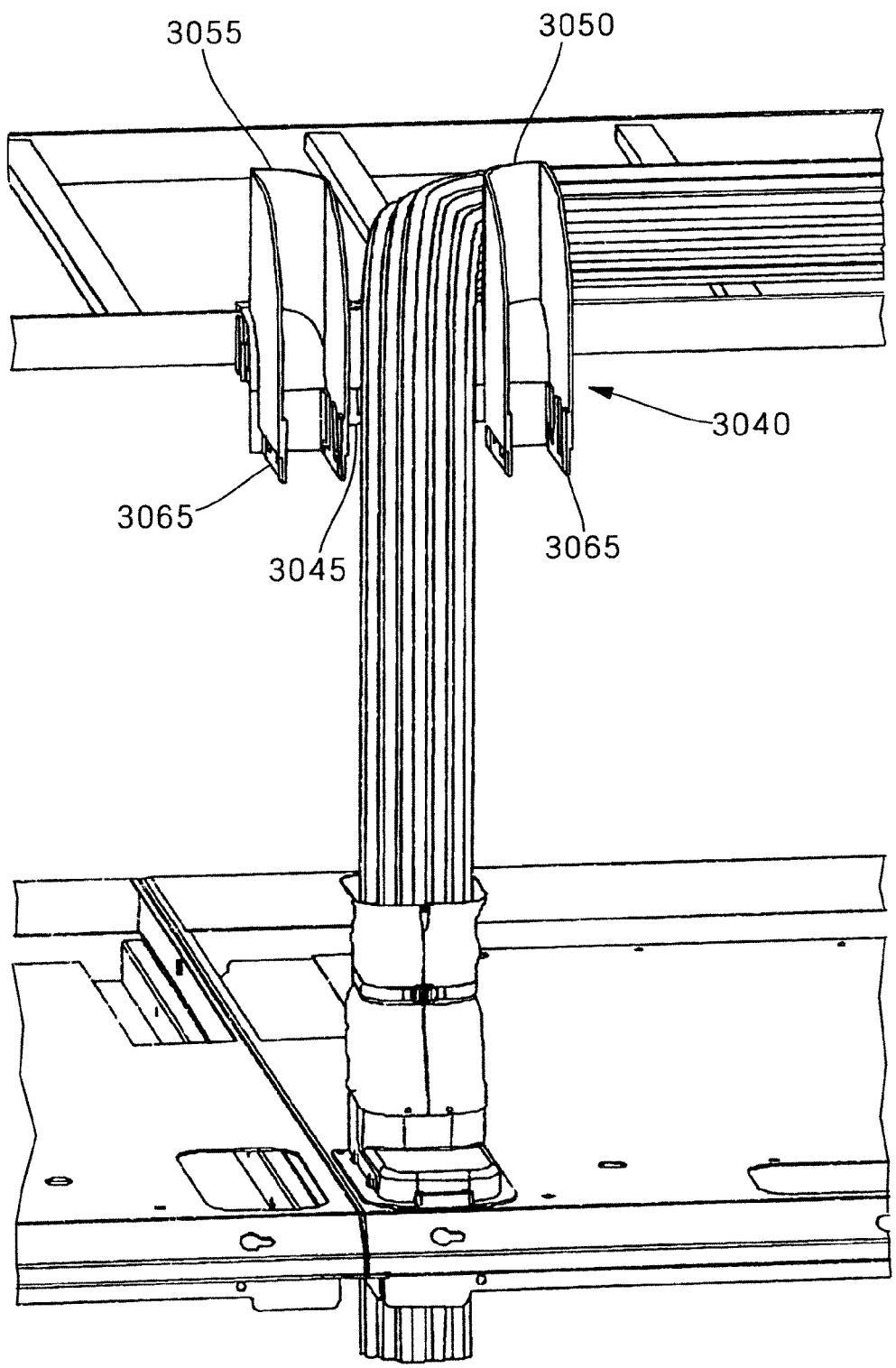
FIG. 48 is a perspective view of the waterfall fitting of FIG. 44, shown having cabling run down into the network cabinet.
Figure 49:
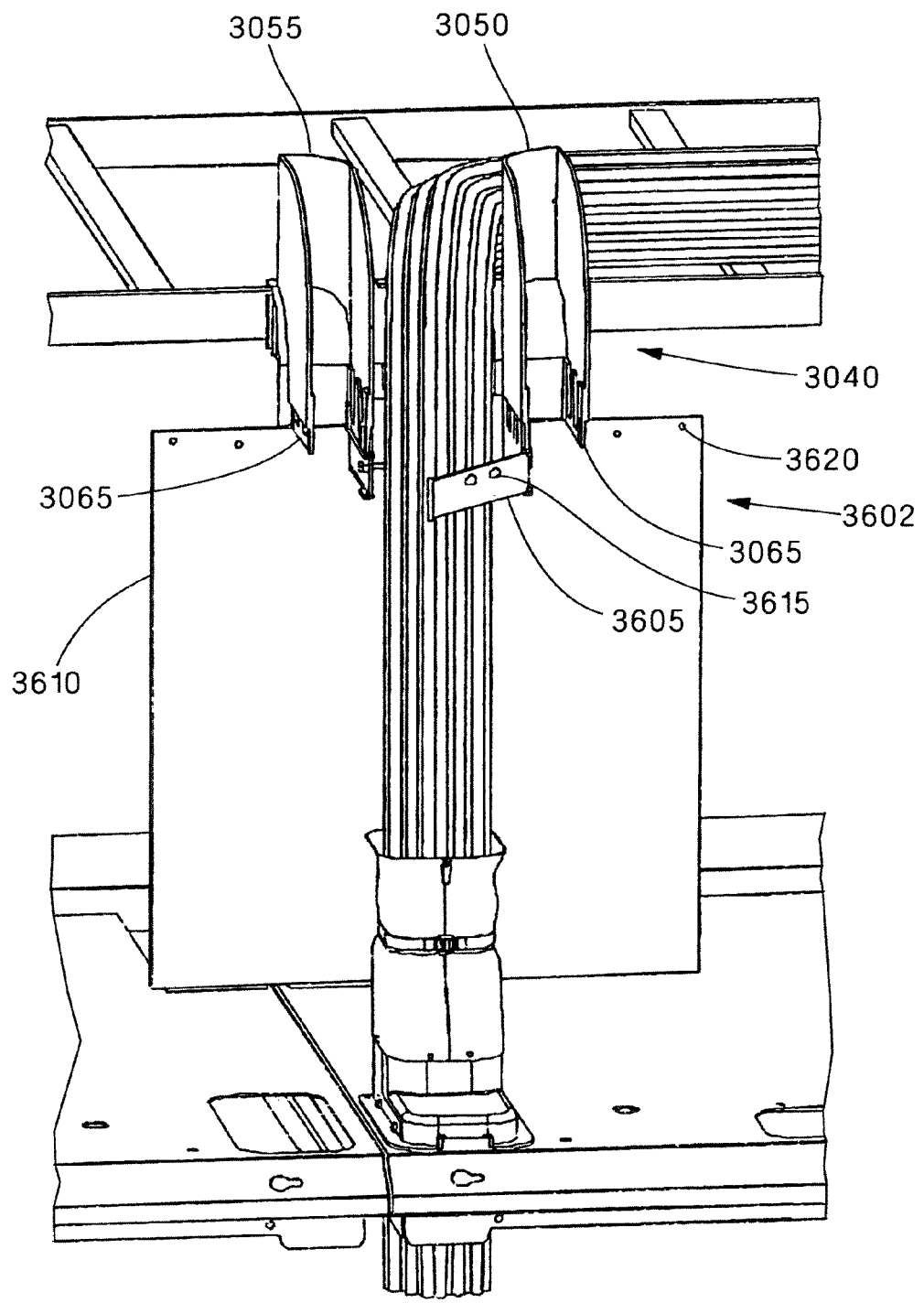
FIG. 49 is a perspective view of the waterfall fitting of FIG. 48, shown being connected to the portion of the sealing assembly.
Figure 50:
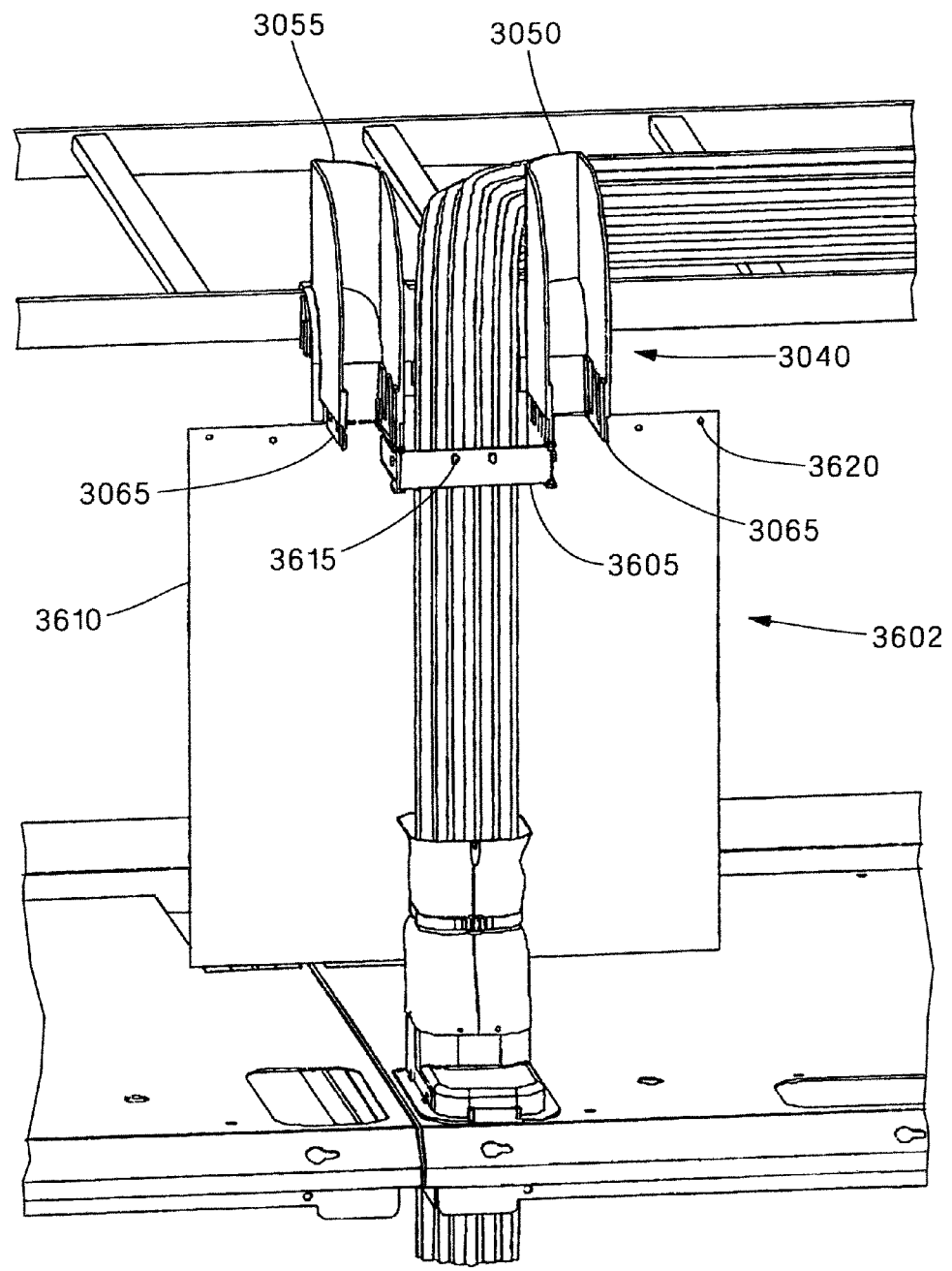
FIG. 50 is a perspective view of the waterfall fitting of FIG. 48, shown being connected to the portion of the sealing assembly.
Figure 51:
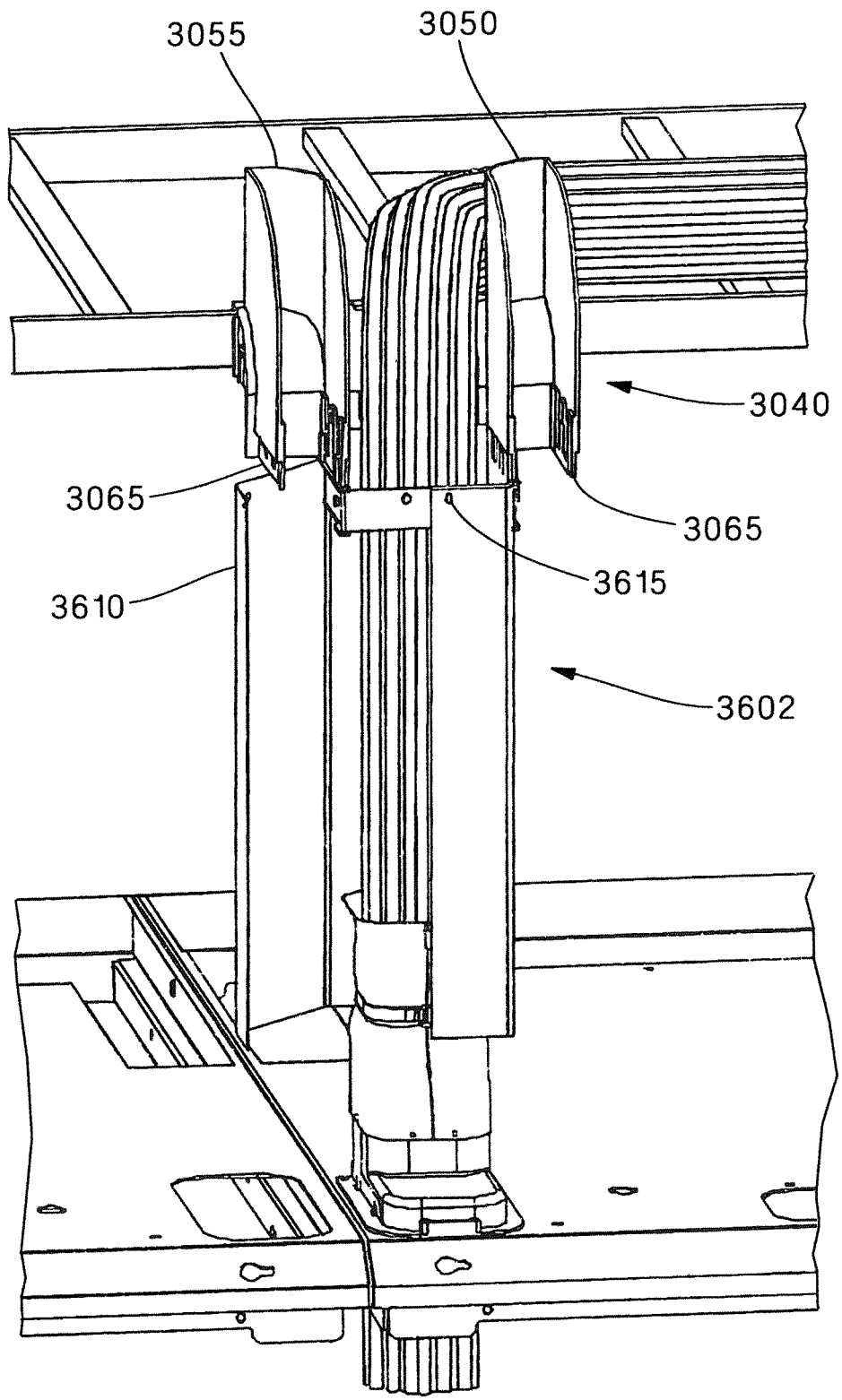
FIG. 51 is a perspective view of the waterfall fitting of FIG. 48, shown being connected to the portion of the sealing assembly.
Figure 52:
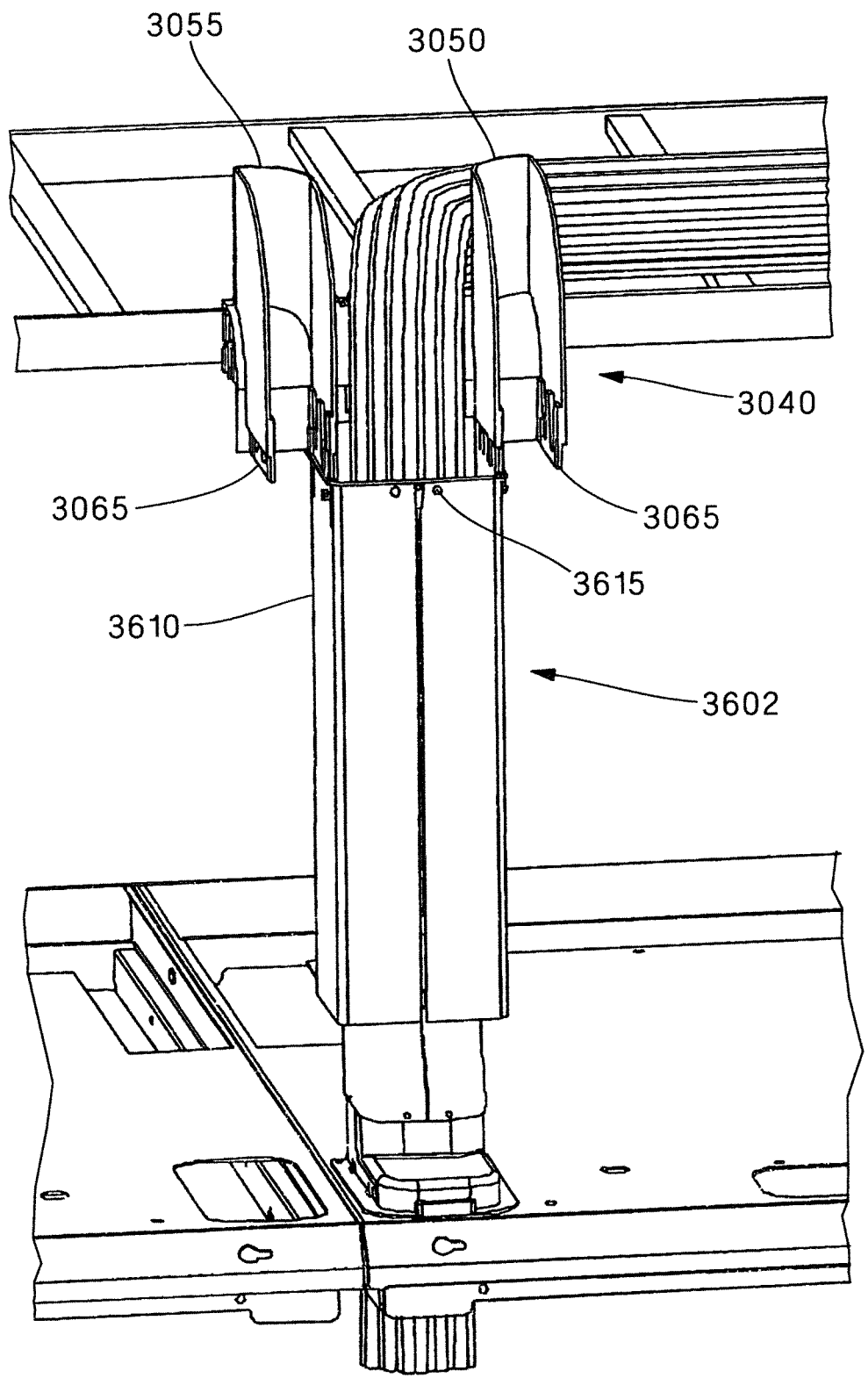
FIG. 52 is a perspective view of the waterfall fitting of FIG. 48, shown after being connected to the portion of the sealing assembly.

Waterfall fitting 3040 has latches 3065 that allow it to attach directly to upper sleeve 3602, and upper sleeve 3602 has the same mating geometry as upper sleeve 602 shown in FIG. 6. Upper sleeve 3602 has a rigid, hinged door 3605 that provides four-sided support for the flexible material 3610 when closed as shown in FIG. 47, but allows cables to be laid-in the front opening when hinged door 3605 is in the open position shown in FIG. 49. Hinged door 3605 also includes two mounting studs 3615 that mate with grommet holes 3620 in the flexible material 3610 to secure the material 3610 thereto.

Figure 54:
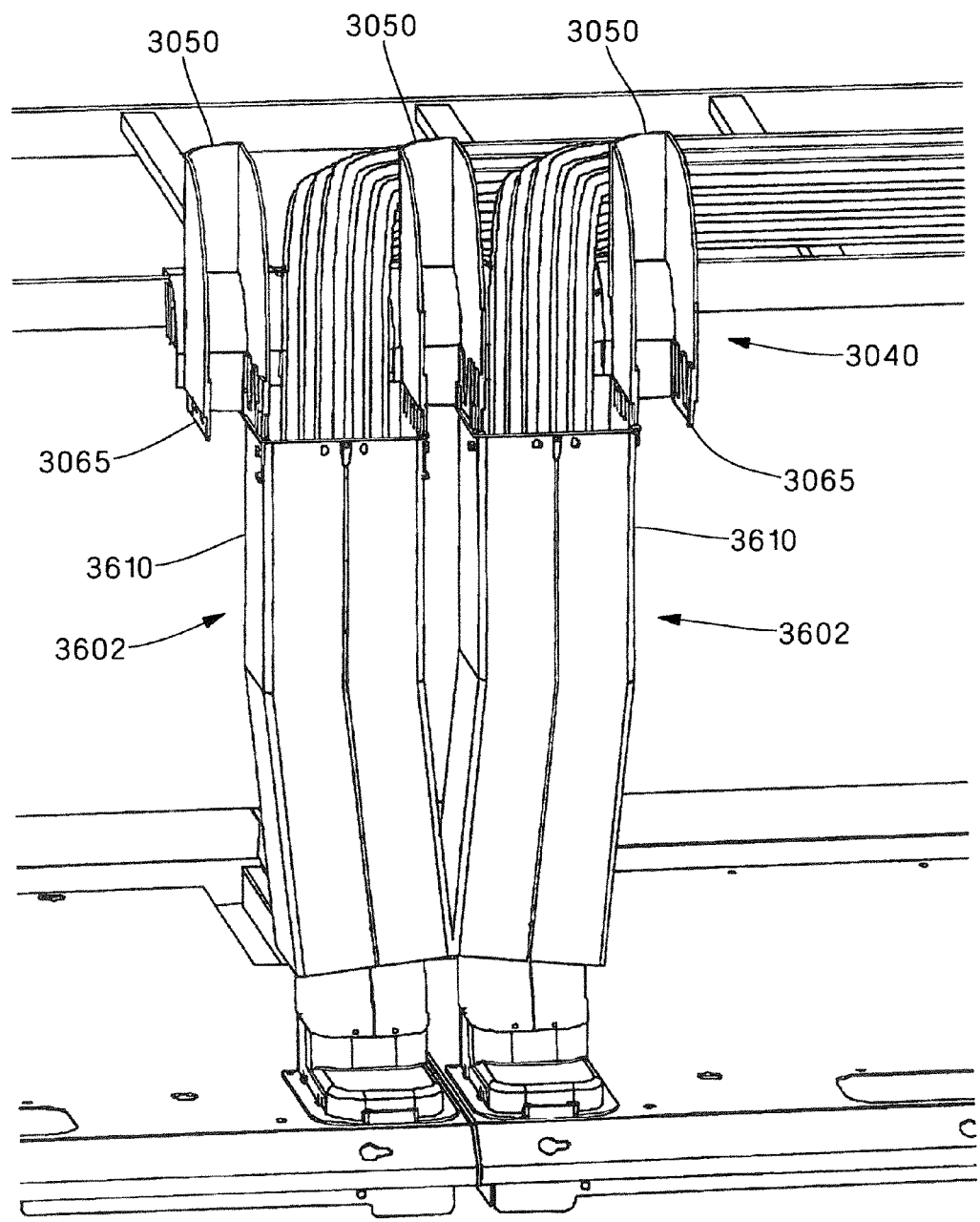
FIG. 54 is another alternate embodiment of a waterfall fitting in accordance with the present invention, shown with two cable drops entering adjacent network cabinet openings.

Waterfall fitting 3040 may be used to align two cable drops entering adjacent cable openings, as shown in FIG. 53. Waterfall fitting 3040 is configured with center divider wall 3060 to allow exact vertical positioning of the cable drop over the network cabinet openings. Center divider wall 3060 provides bend radius control for cables exiting in opposite directions. Alternatively, waterfall fitting 3040 may use a right-hand wing 3050 in the center to provide bend radius control for cables exiting to the right, as shown in FIG. 54. This configuration does not allow for exact vertical positioning of the cable drops over the network cabinet openings, so the upper sleeves 3602 may bend to accommodate the offset. Waterfall fitting 3040 may also use a left-hand wing 3055 in the center to provide bend radius control for cables exiting to the left.

Figure 55A:
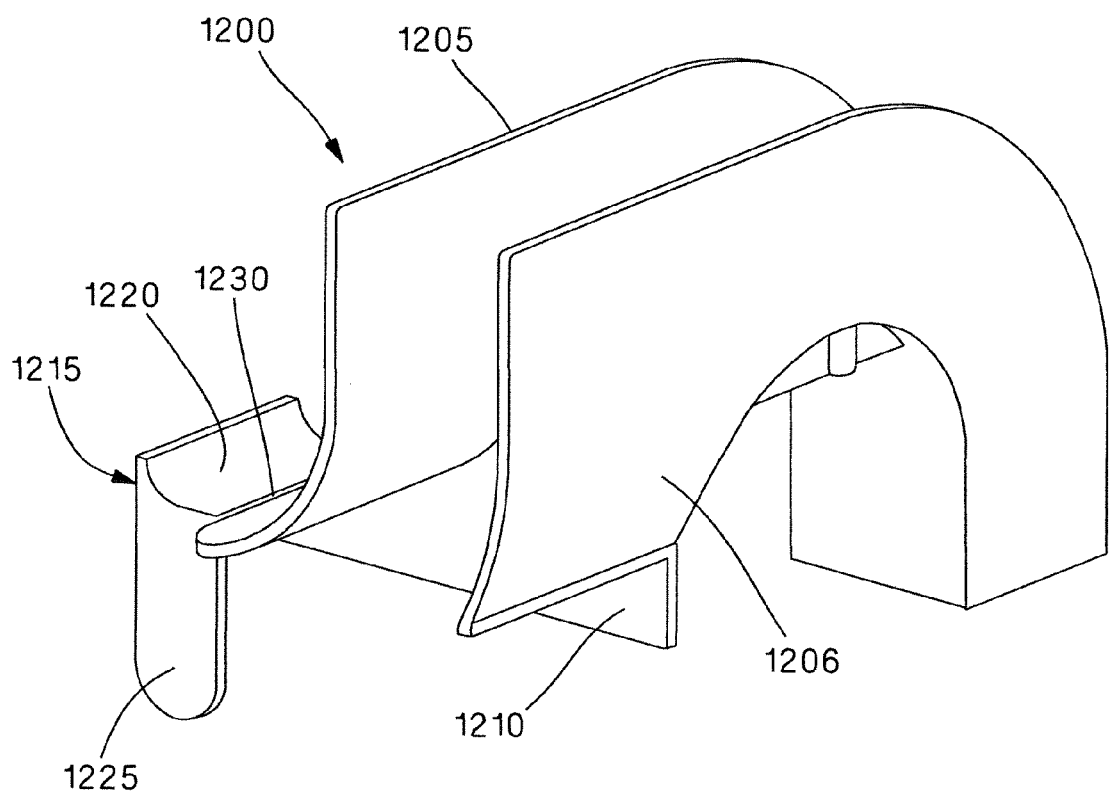
FIG. 55A is a right front perspective view of another alternate embodiment of a spillover in accordance with the present invention.
Figure 55B:
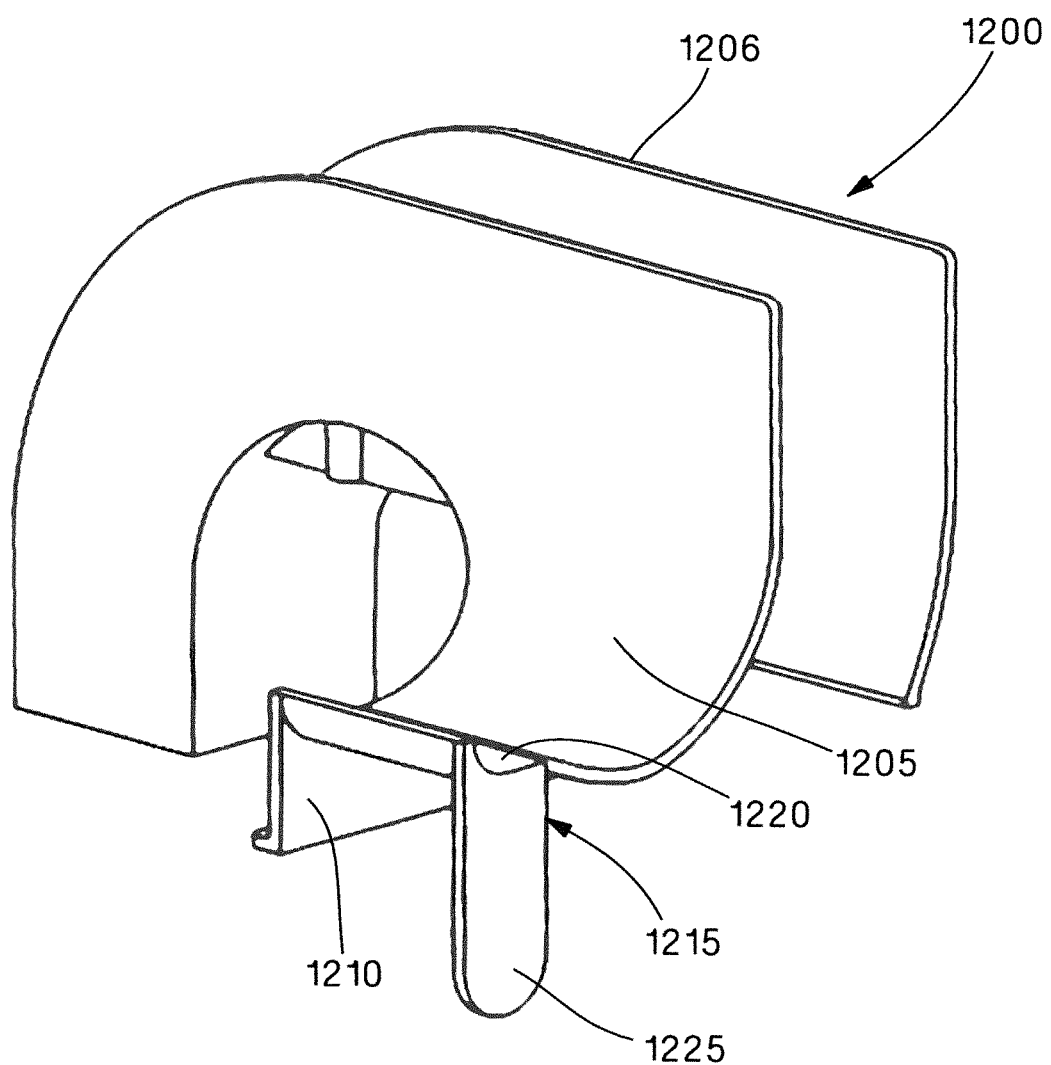
FIG. 55B is a left front perspective view of the spillover of FIG. 55A.
Figure 55C:
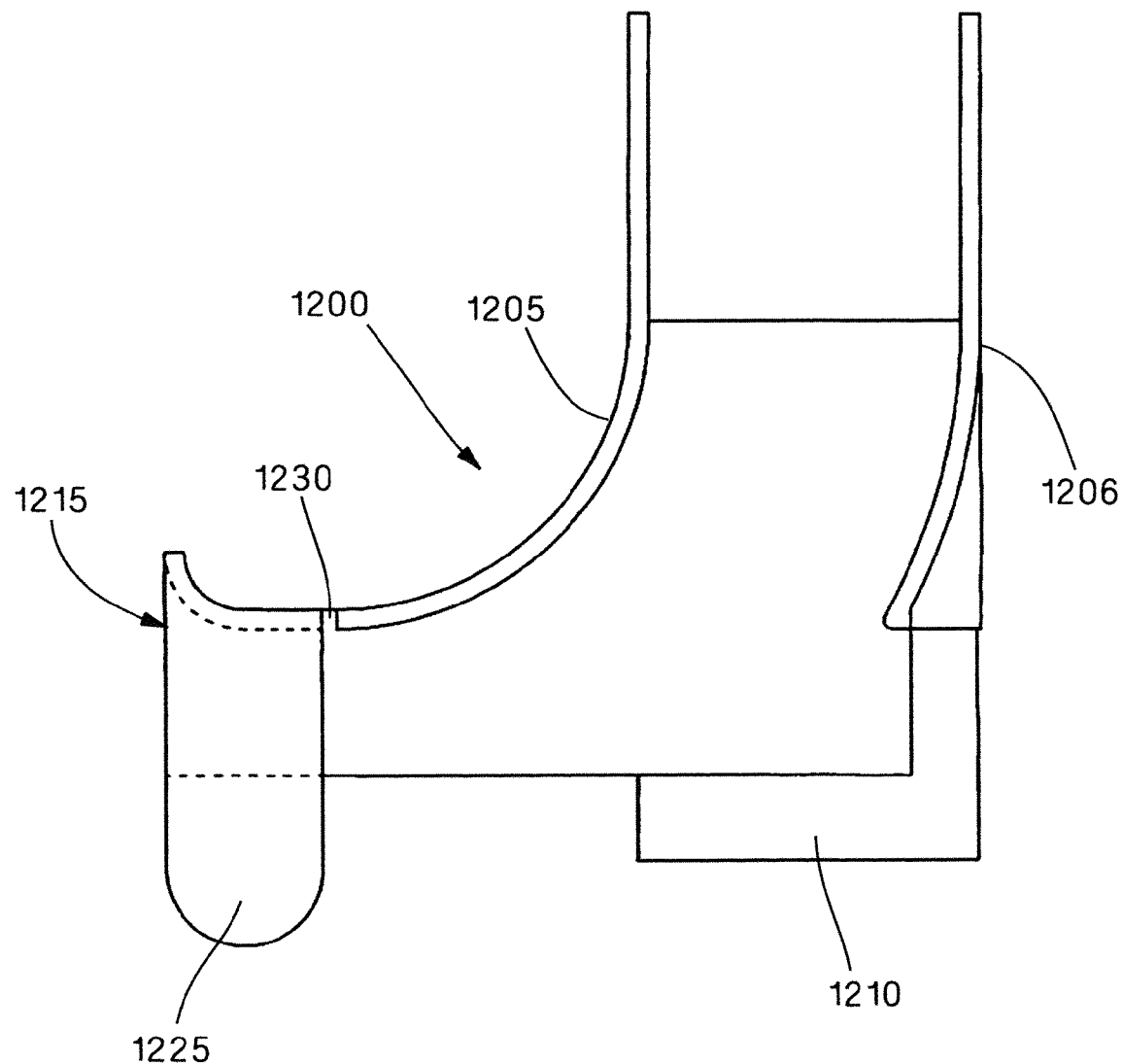
FIG. 55C is a front elevational view of the spillover of FIG. 55A.
Figure 56A:
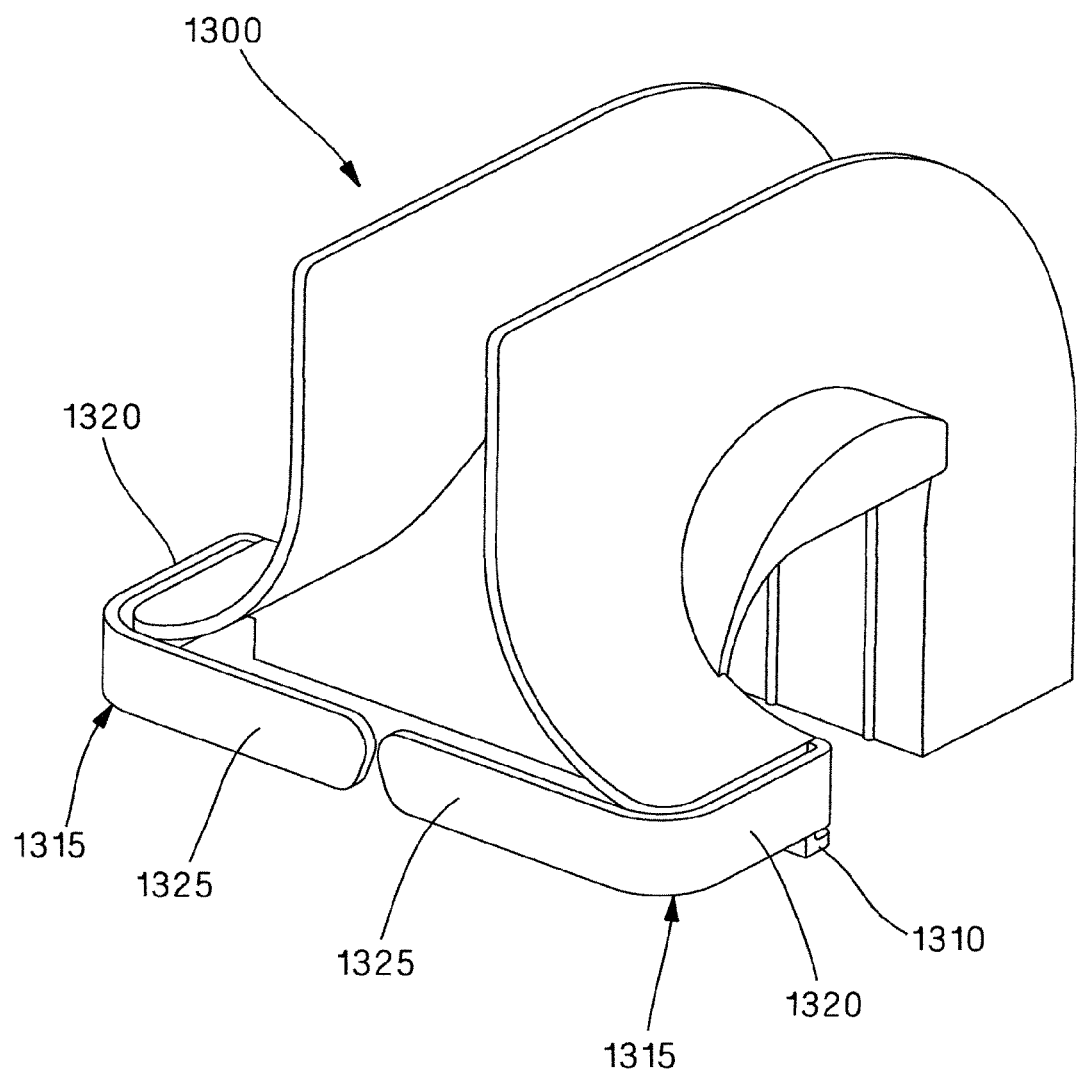
FIG. 56A is a front perspective view of another embodiment of a spillover in accordance with the present invention.
Figure 56B:
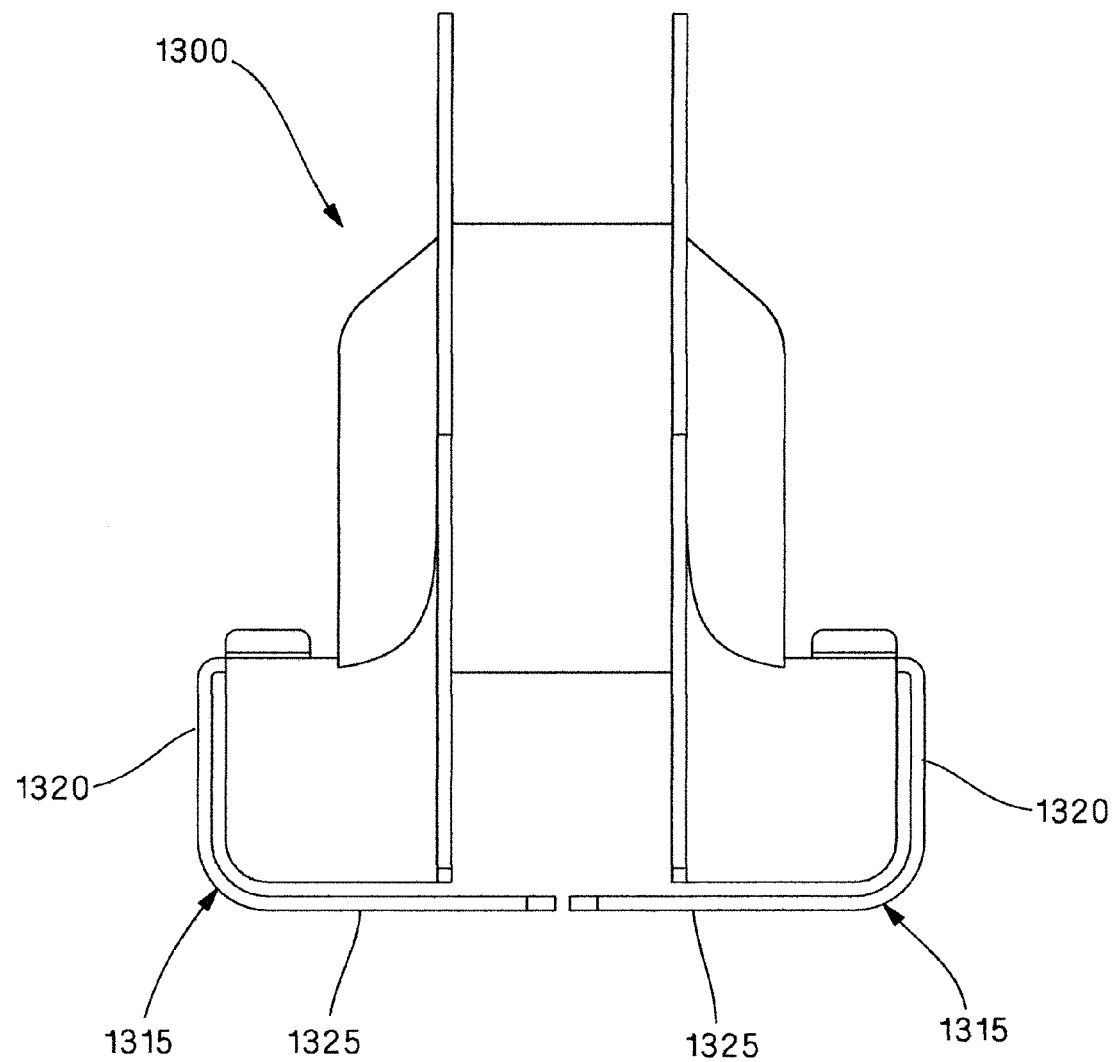
FIG. 56B is a top plan view of the spillover of FIG. 56A.
Figure 56C:
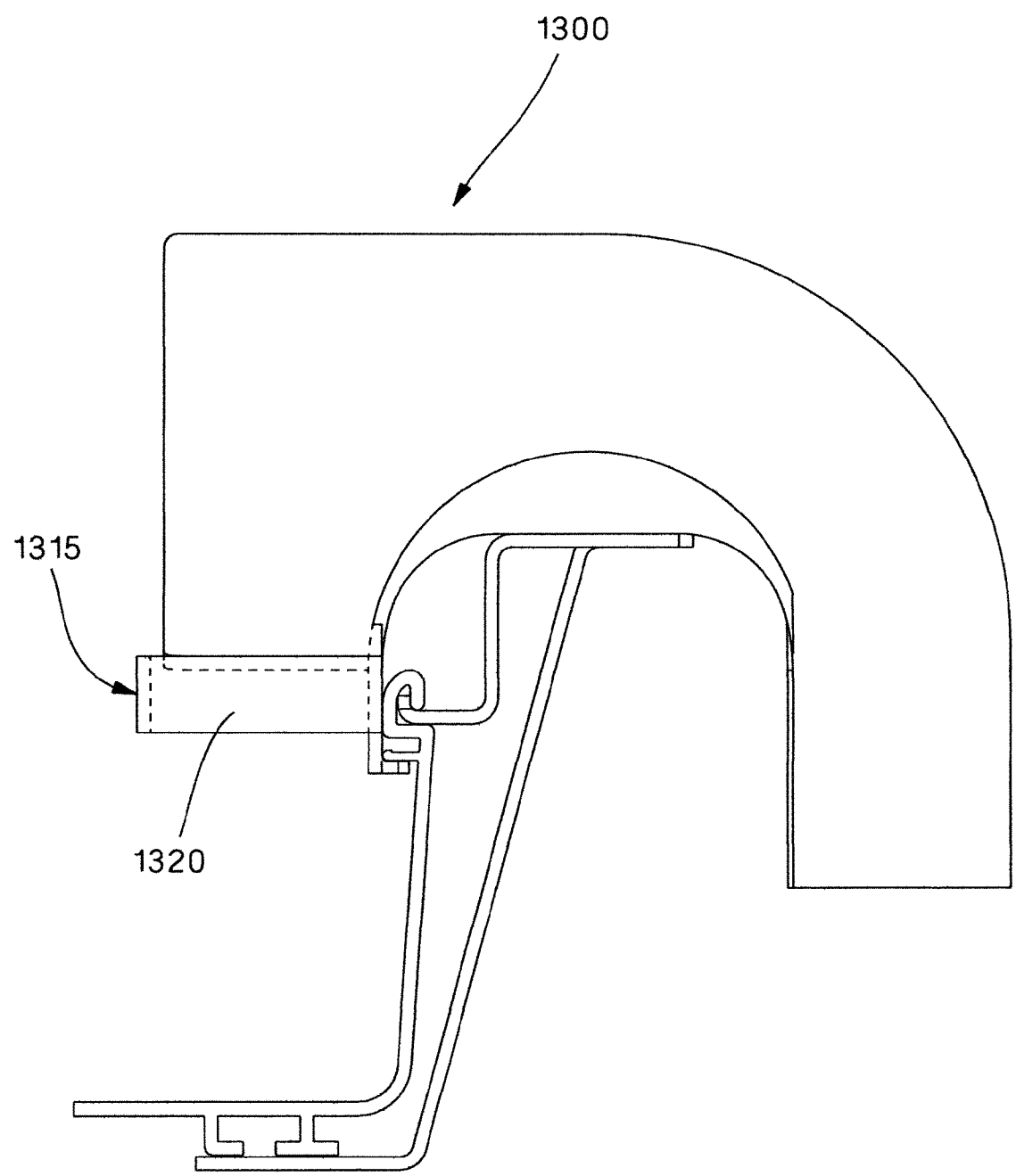
FIG. 56C is a side elevational view of the spillover of FIG. 56A, including a mounting bracket positioned for mounting to a lateral trough section.
Figure 56D:
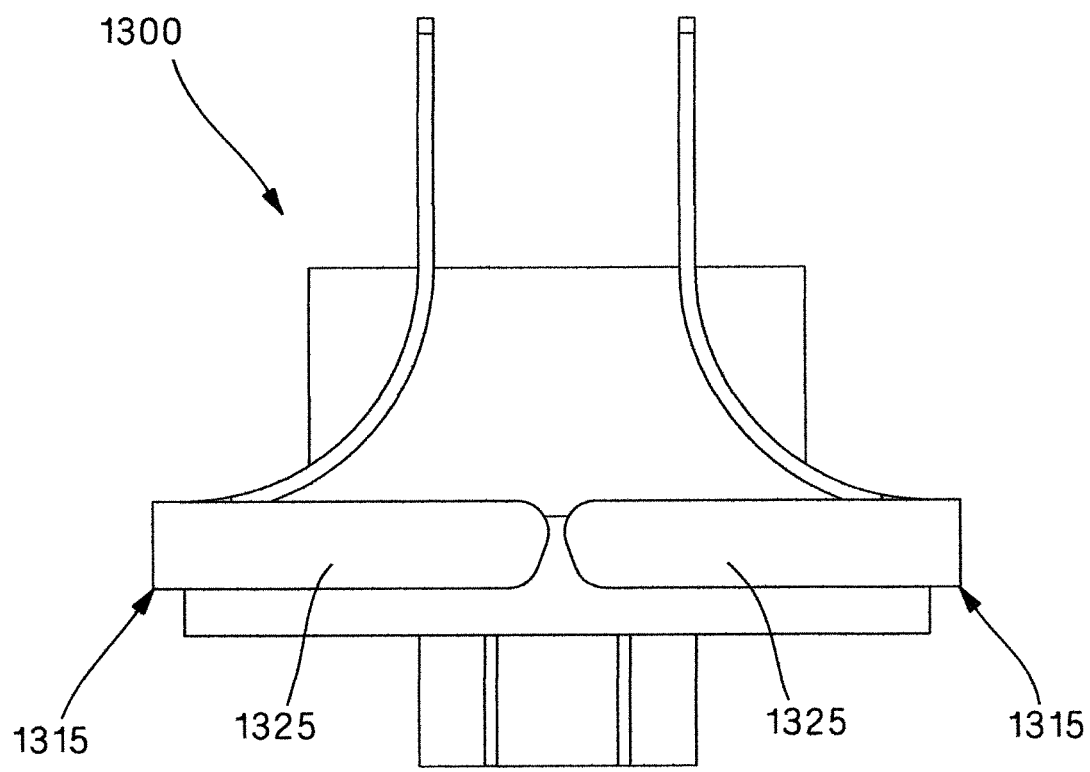
FIG. 56D is a front elevational view of the spillover of FIG. 56A.

FIGS. 55A-D disclose another embodiment of a spillover 1200. Spillover 1200 has a first wall 1205 and a second wall 1206. The spillover 1200 is constructed similarly to spillover 200 except that, because second wall 1206 does not include a curved extension portion oppositely directed to wall 1205, spillover 1200 provides a single directional exit path as opposed to a dual directional exit path provided by spillover 200. The single directional design of spillover 1200 allows for a smaller overall footprint as well as the ability to attach two spillovers 1200 to the lateral trough 20 side by side as seen in FIG. 55D, thus minimizing the distance between spillovers 1200. Also, the spillover 1200 includes only one containment member 1215. While the single directional spillover 1200 is described herein with similar containment means as spillover 200, it is understood that a single directional spillover can utilize similar containment means as those described with regard to spillovers 100, 300 and 1100.

FIGS. 56A-D disclose another embodiment of a spillover 1300. Spillover 1300 is the same as spillover 200 except for the configuration of the containment members 1315. In this embodiment, the first portion 1320 and the second portion 1325 of the containment members 1315 are generally flat. The first portion 1320 extends away from the floor 1310, and the second portion 1325 extends perpendicularly inward from the end of the first portion 1320.

Figure 57A:
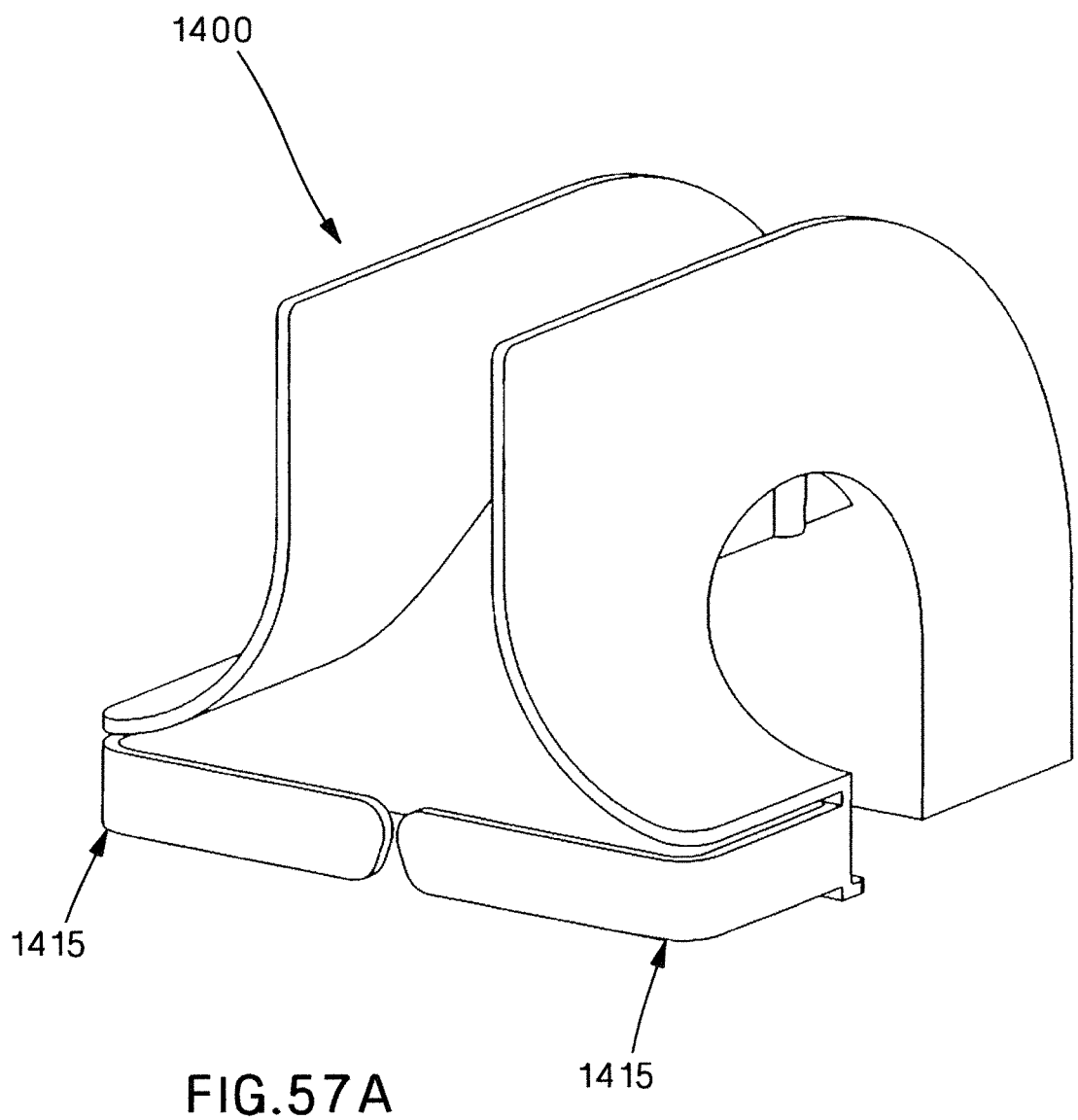
FIG. 57A is a front perspective view of another embodiment of a spillover in accordance with the present invention.
Figure 57B:
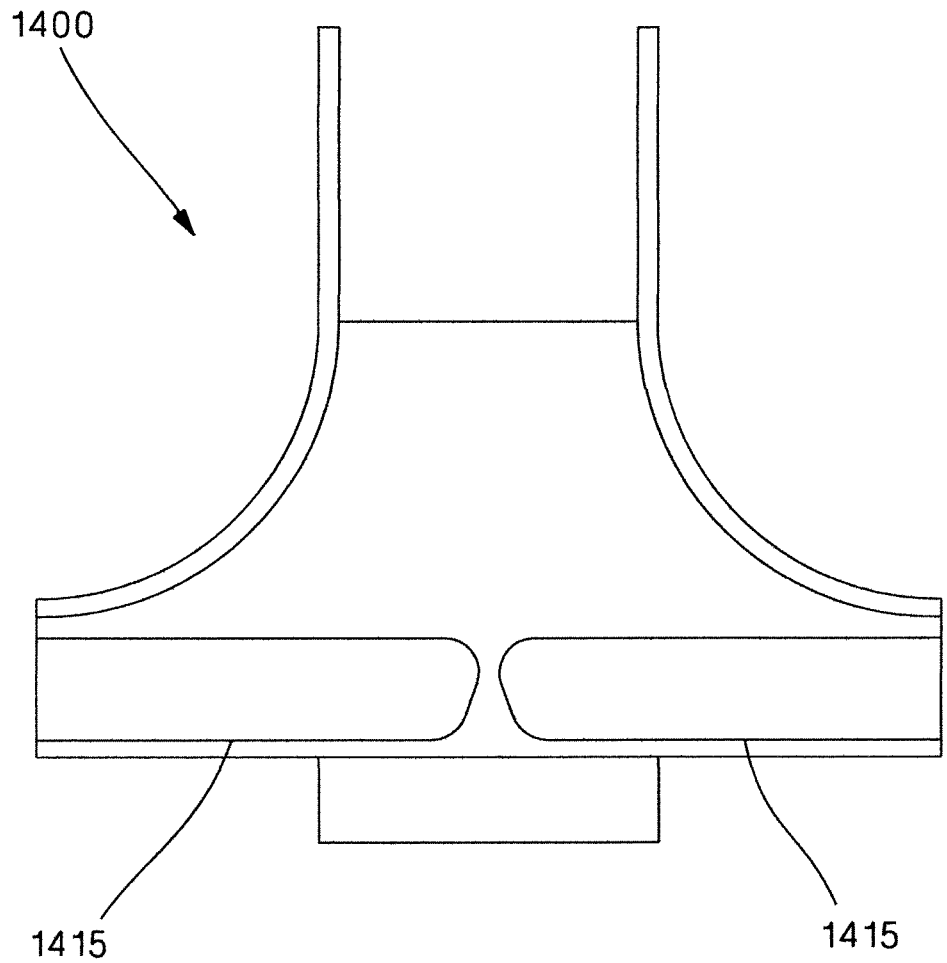
FIG. 57B is a front elevational view of the spillover of FIG. 57A.

FIGS. 57A-B disclose another embodiment of a spillover 1400. Spillover 1400 is the same as spillover 1300 except for the location of the containment members 1415. In this embodiment, the location of the containment members has been modified to help facilitate molding of the spillover 1400, as well as help to minimize the overall footprint of the spillover 1400.

The foregoing description of examples of the invention has been presented for purposes of illustration and description, and is not intended to be exhaustive or to limit the invention to the precise form disclosed. The description was selected to best explain the principles of the invention and its practical application to enable others skilled in the art to best utilize the invention in various embodiments and various modifications as are suited to the particular use contemplated. It is intended that the scope of the invention not be limited by the specification.

The invention claimed is:

1. A sealing assembly for protecting cables in a cable drop system, the sealing assembly comprising:
   a base mounted to a network cabinet and a cover hingedly connected to the base;
   a lower sleeve having a top portion and a bottom portion, wherein the bottom portion is connected to the base;
   an upper sleeve having a top edge, a bottom edge, a first edge and a second edge, wherein the upper sleeve is positioned around the top portion of the lower sleeve and the cables routed therein; and
   the upper sleeve further comprising a hinged door for providing support to the upper sleeve, wherein the hinged door having mounting studs that mate with grommet holes in the upper sleeve to secure the upper sleeve to the hinged door.

2. The sealing assembly of claim 1, wherein the base and the cover each include mounting studs; and
   the lower sleeve includes a plurality of holes, wherein the holes in the lower sleeve receive the mounting studs of the base and the cover for releasably attaching the lower sleeve to the base and cover.

3. The sealing assembly of claim 1, wherein the lower sleeve and the upper sleeve are formed from a flexible material.

4. The sealing assembly of claim 1, wherein the upper sleeve is a hanging sleeve that drapes over the lower sleeve.

5. The sealing assembly of claim 1, wherein the lower sleeve and the upper sleeve are static dissipative.

6. The sealing assembly of claim 1, wherein the lower sleeve and the upper sleeve include snaps, wherein the snaps are connected by a bonding wire for providing a ground path to dissipate any accumulated charge.

7. The sealing assembly of claim 1, wherein the upper sleeve is connected to a waterfall fitting, whereby the upper sleeve bends to accommodate offset cable drops over a cabinet opening.

8. A sealing assembly for protecting cables in a cable drop system, the sealing assembly comprising:
   a flexible sleeve for wrapping around cable passing through an opening in the cable drop system, the flexible sleeve having a top edge, a bottom edge, a first edge and a second edge, the flexible sleeve having a hinged door for providing support to the flexible sleeve, wherein the hinged door having mounting studs that mate with grommet holes in the flexible sleeve to secure the flexible sleeve to the hinged door; and
   a fastener secured along the first edge and second edge for fastening the flexible sleeve in a closed position.

9. The sealing assembly of claim 8, wherein the top edge of the flexible sleeve is connected to one of a coupler, a spillover fitting, and a waterfall fitting.

10. The sealing assembly of claim 8, wherein the fastener secured to the first edge and the second edge is a hook and loop fastener.

11. The sealing assembly of claim 8, wherein the flexible sleeve is a hanging sleeve.

12. The sealing assembly of claim 8, wherein the flexible sleeve is static dissipative.

13. The sealing assembly of claim 8, wherein the flexible sleeve further comprises a snap for connecting to a bonding wire to provide a ground path to dissipate any accumulated charge.

14. The sealing assembly of claim 8, wherein the flexible sleeve bends to accommodate offset cable drops over a cabinet opening.

15. A sealing assembly for protecting cables in a cable drop system, the sealing assembly comprising:
   a base mounted to a network cabinet and a cover hingedly connected to the base;
   a lower sleeve having a top portion and a bottom portion, wherein the bottom portion is connected to the base;
   an upper sleeve having a top edge, a bottom edge, a first edge and a second edge, wherein the upper sleeve is positioned around the top portion of the lower sleeve and the cables routed therein; and
   wherein the upper sleeve is connected to a waterfall fitting, whereby the upper sleeve bends to accommodate offset cable drops over a cabinet opening.

16. The sealing assembly of claim 15, wherein the base and the cover each include mounting studs; and the lower sleeve includes a plurality of holes, wherein the holes in the lower sleeve receive the mounting studs of the base and the cover for releasably attaching the lower sleeve to the base and cover.

17. The sealing assembly of claim 15, wherein the lower sleeve and the upper sleeve are formed from a flexible material.

18. The sealing assembly of claim 15, wherein the upper sleeve is a hanging sleeve that drapes over the lower sleeve.

19. The sealing assembly of claim 15, wherein the lower sleeve and the upper sleeve are static dissipative.

20. The sealing assembly of claim 15, wherein the lower sleeve and the upper sleeve include snaps, wherein the snaps are connected by a bonding wire for providing a ground path to dissipate any accumulated charge.

* * * * *